(12) United States Patent
Saeki

(10) Patent No.: US 9,424,325 B2
(45) Date of Patent: Aug. 23, 2016

(54) RECORDING MEDIUM, DISTRIBUTION CONTROLLING METHOD, AND INFORMATION PROCESSING DEVICE

(75) Inventor: Toshiaki Saeki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/594,991

(22) Filed: Aug. 27, 2012

(65) Prior Publication Data

US 2013/0060815 A1 Mar. 7, 2013

(30) Foreign Application Priority Data

Sep. 2, 2011 (JP) ................................. 2011-191957

(51) Int. Cl.
G06F 17/30 (2006.01)

(52) U.S. Cl.
CPC ................................ G06F 17/30575 (2013.01)

(58) Field of Classification Search
CPC .......................... G06F 17/30194; G06F 15/177
See application file for complete search history.

(56) References Cited

U.S. PATENT DOCUMENTS

| | | | |
|---|---|---|---|
| 7,895,468 B2 | 2/2011 | Kitamura et al. | |
| 2002/0023150 A1* | 2/2002 | Osafune et al. | 709/221 |
| 2008/0107043 A1* | 5/2008 | Smith et al. | 370/255 |
| 2009/0282048 A1* | 11/2009 | Ransom et al. | 707/10 |
| 2010/0080141 A1 | 4/2010 | Nakamura | |
| 2012/0290582 A1* | 11/2012 | Oikarinen | 707/741 |
| 2013/0332613 A1* | 12/2013 | Yevmenkin et al. | 709/226 |

FOREIGN PATENT DOCUMENTS

| | | |
|---|---|---|
| EP | 1802070 A1 | 6/2007 |
| JP | 11-313101 A | 11/1999 |
| JP | 2002-16622 A | 1/2002 |
| JP | 2002-185464 A | 6/2002 |
| JP | 2004-72603 A | 3/2004 |
| JP | 2006-197400 A | 7/2006 |
| JP | 2007-174672 A | 7/2007 |
| JP | 2008-234445 A | 10/2008 |
| JP | 2009-25965 | 2/2009 |
| JP | 2009-187141 A | 8/2009 |
| JP | 2009-295127 | 12/2009 |
| JP | 2010-86046 A | 4/2010 |

OTHER PUBLICATIONS

Partial English-language Translation of Shudo, Kazuyuki, "Scale-Out Technology," http://www.shudo.net/article/200904-UNIX-magazine-scaleout/, 2009, 27 pages. (previously submitted).
Guiseppe Decandia, et al. "Dynamo: Amazon's Highly Available Key-value Store," SOSP (Symposium on Operating Systems Principles) 2007 (http://www.allthingsdistributed.com/files/amazon-dynamo-sosp2007.pdf> pp. 205-220.
"The Apache Cassandra Project," 2009, http://cassandra.apache.org/.
Kazuyuki Shudo, "Scale-Out Technology," http://www.shudo.net/article/200904-UNIX-magazine-scaleout/, 2009.
Japanese Office Action mailed on Jan. 27, 2015 for corresponding Japanese Patent Application No. 2011-191957, with Partial English Translation, 7 pages.

\* cited by examiner

*Primary Examiner* — Khanh Pham
(74) *Attorney, Agent, or Firm* — Fujitsu Patent Center

(57) ABSTRACT

A computer acquires a particular entry(ies) from a database that includes plural entries for each of which a key is determined; stores the particular entry(ies) into a memory provided in the computer and used as one of memories that store the database in a distributed manner; and associates a particular piece of communication endpoint information with a network interface of the computer. Each key for each particular entry belongs to a particular subset among mutually disjoint subsets of a domain of keys. The particular piece of the communication endpoint information is one of a predetermined number of pieces of the communication endpoint information and is associated with the particular subset. Each piece of the communication endpoint information logically identifies one communication endpoint, is dynamically associated with one network interface which provides access to one of the memories, and is statically associated with one of the subsets.

14 Claims, 22 Drawing Sheets

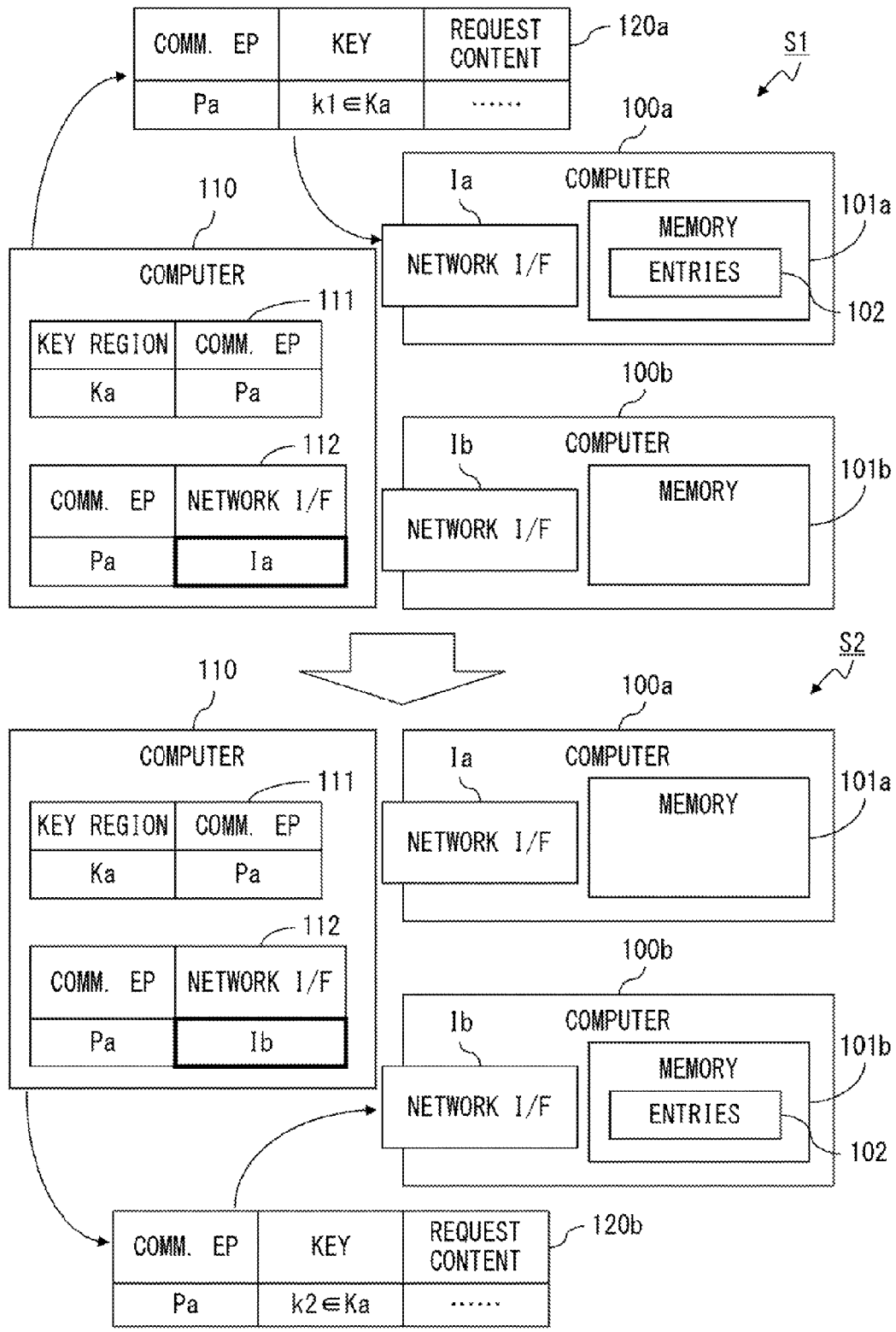
F I G. 1

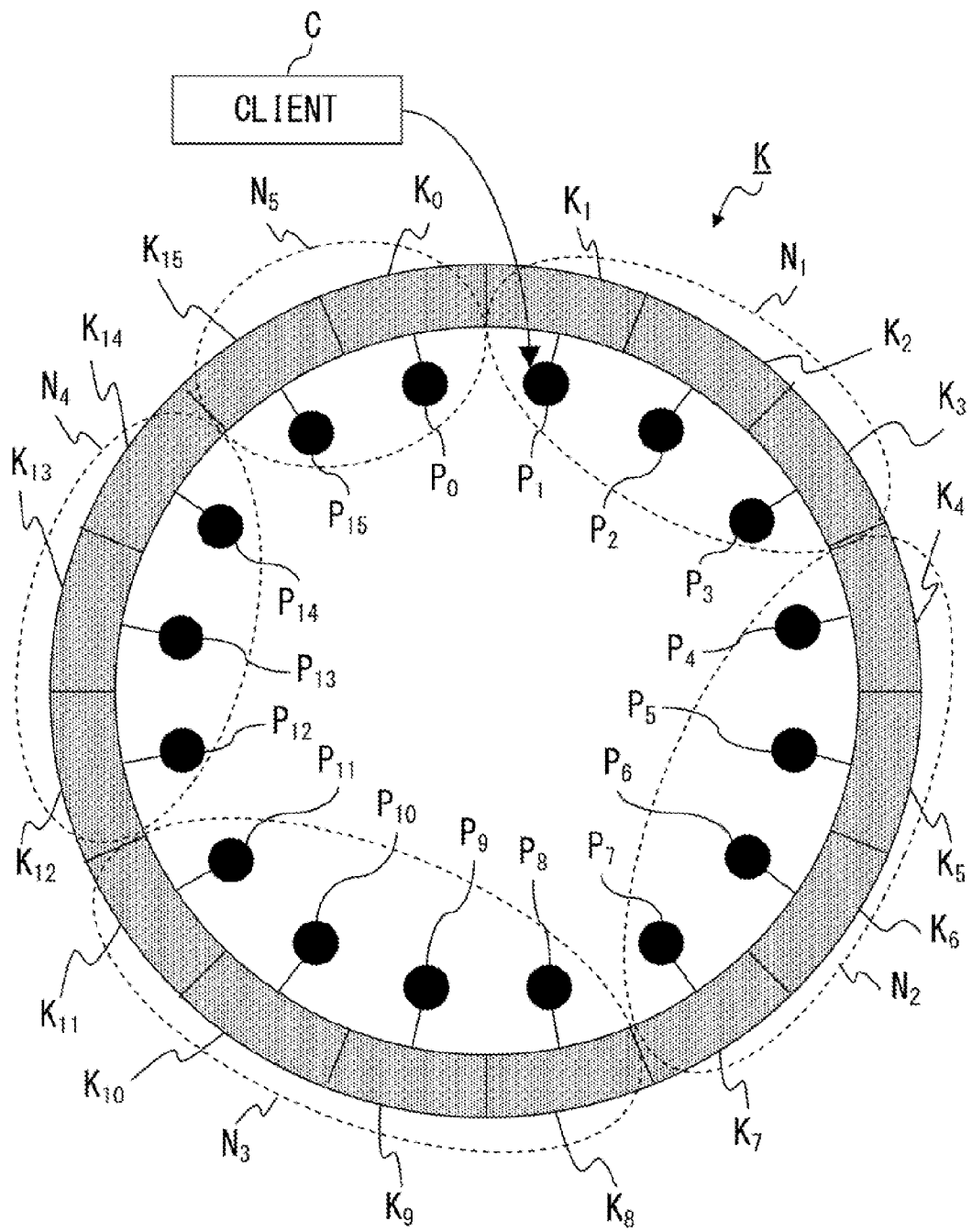
F I G. 2

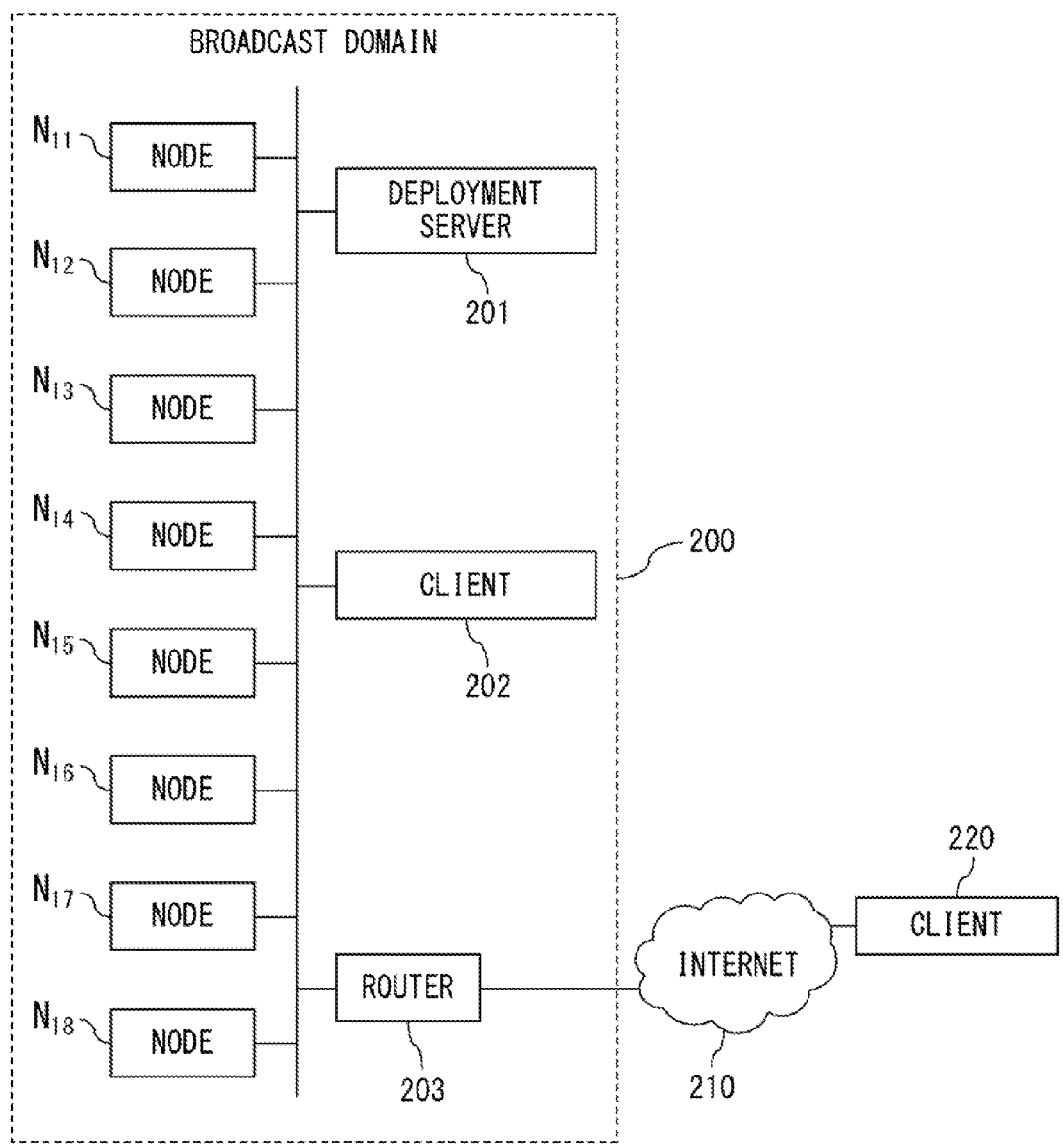
F I G. 3

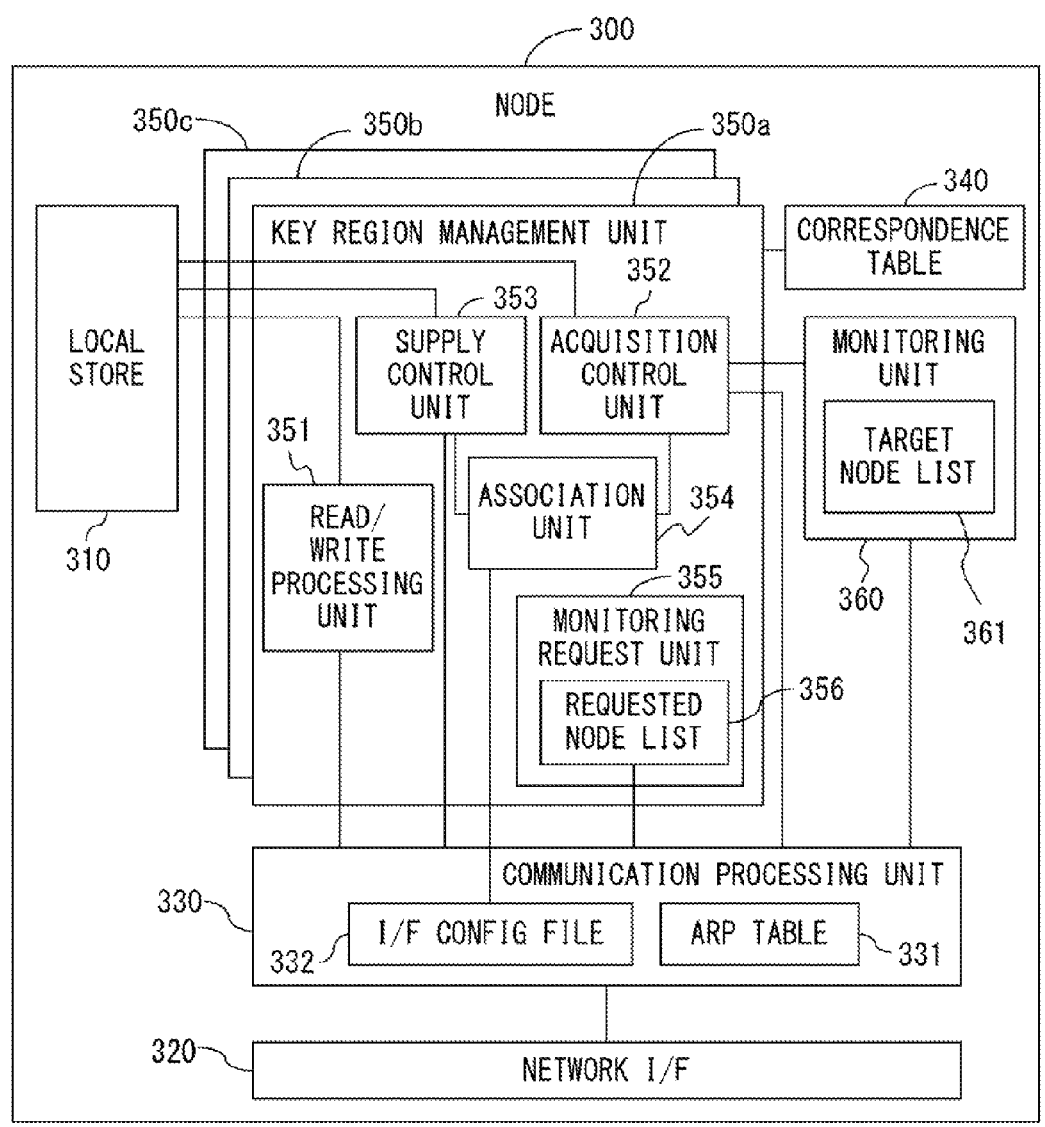
F I G. 5

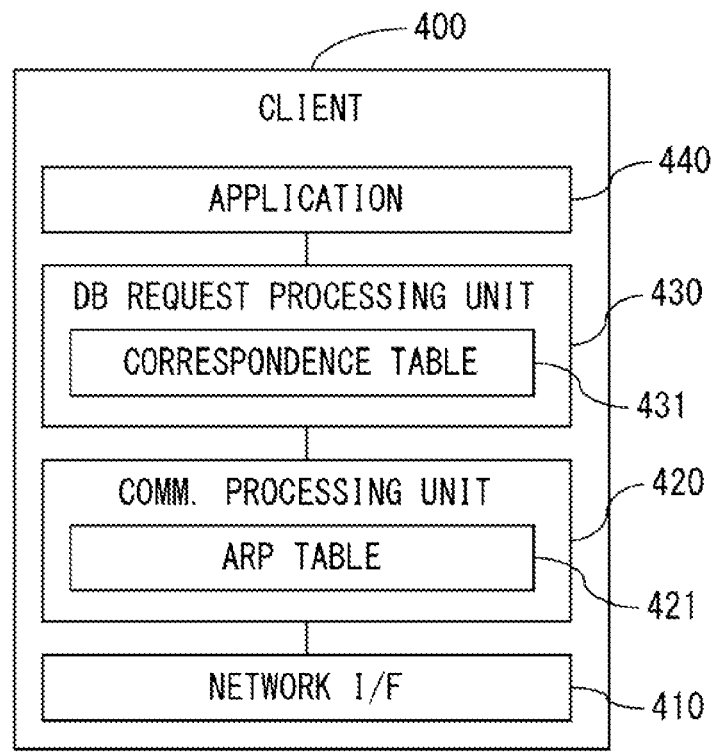
F I G. 6

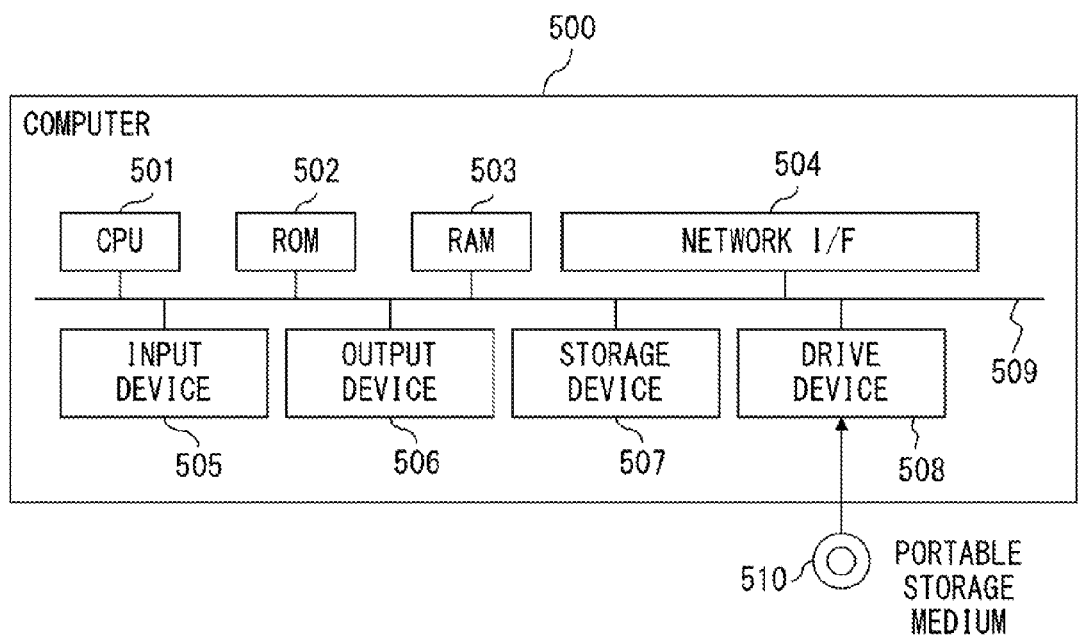
F I G. 7

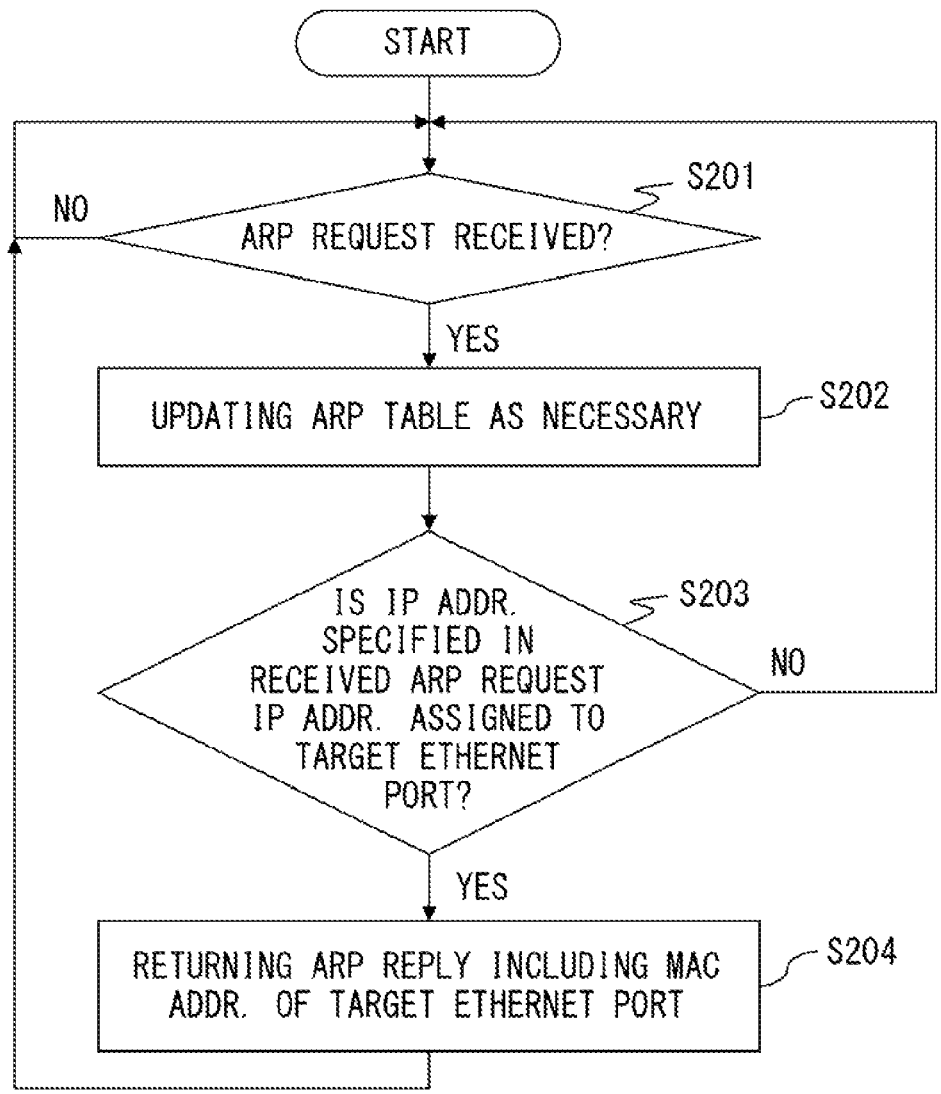
F I G. 1 0

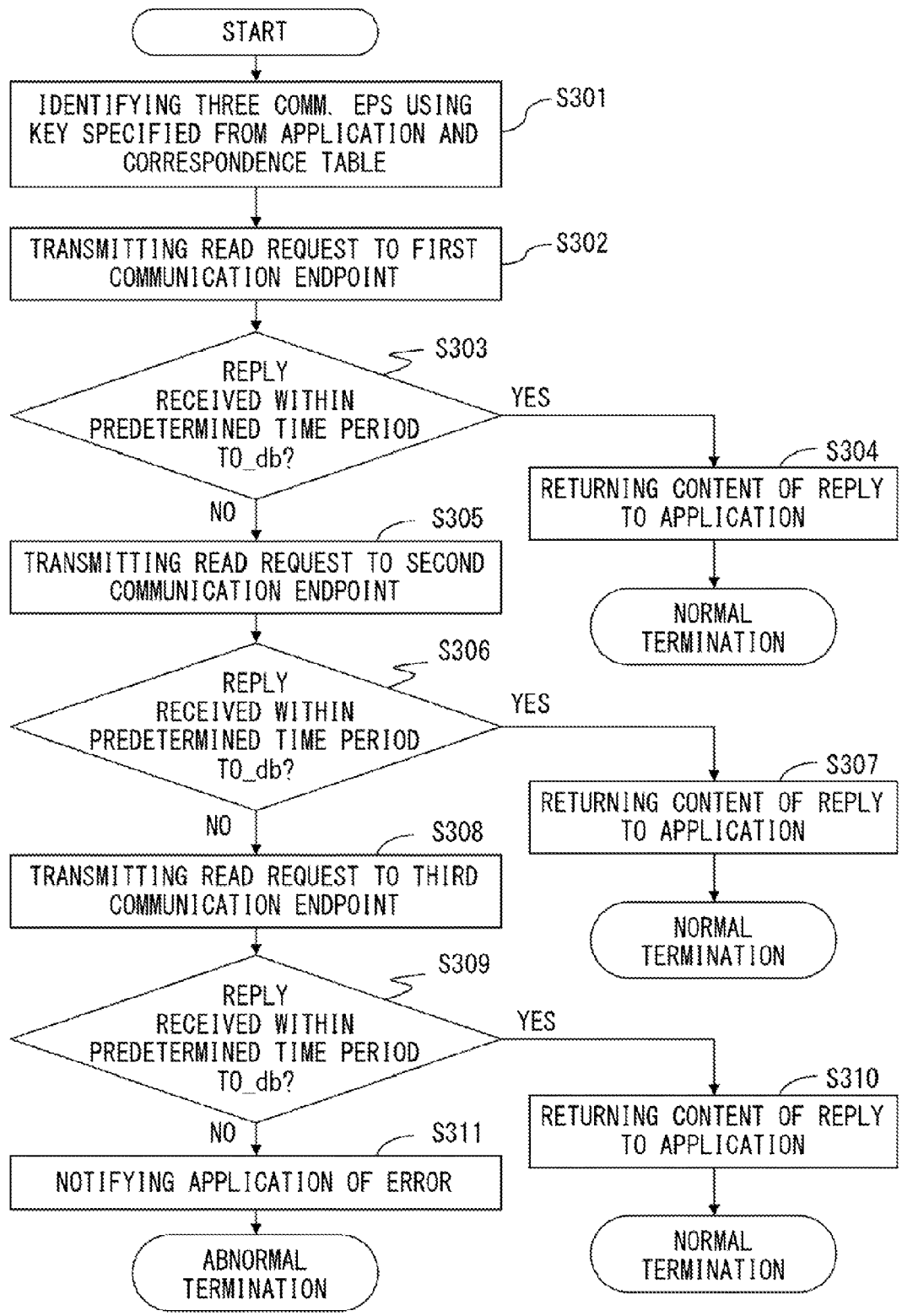
F I G. 1 1

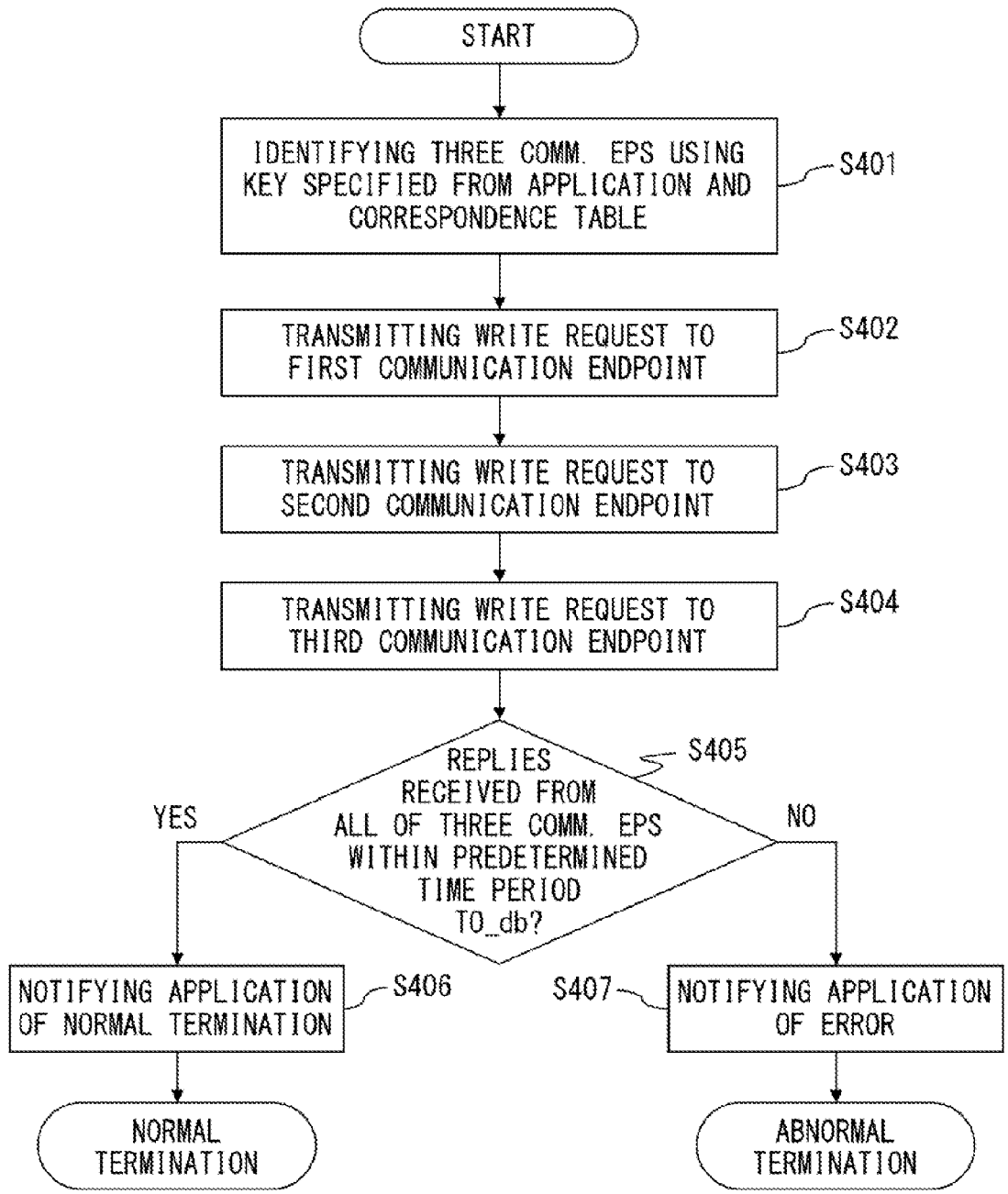
F I G. 1 2

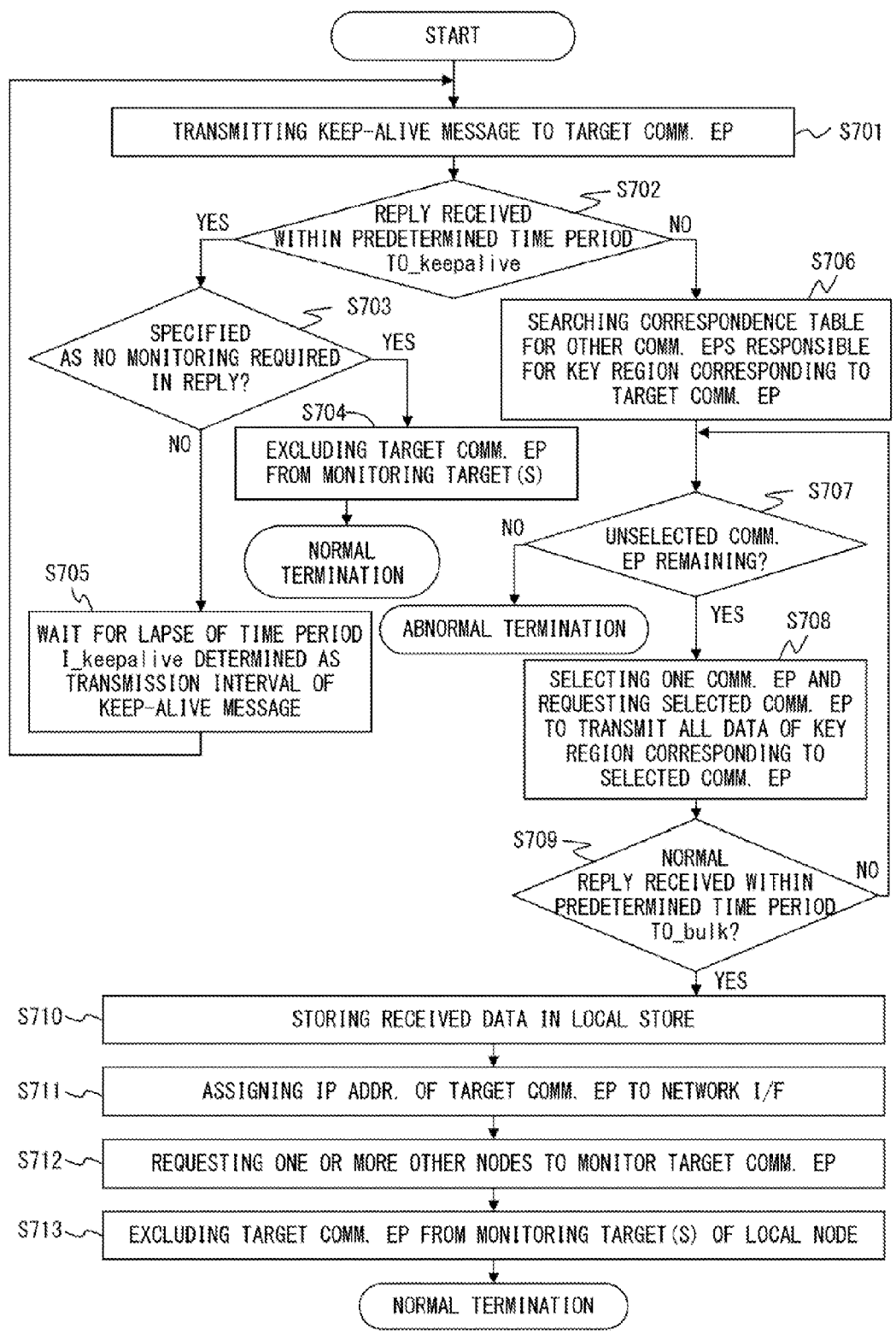
F I G. 1 5

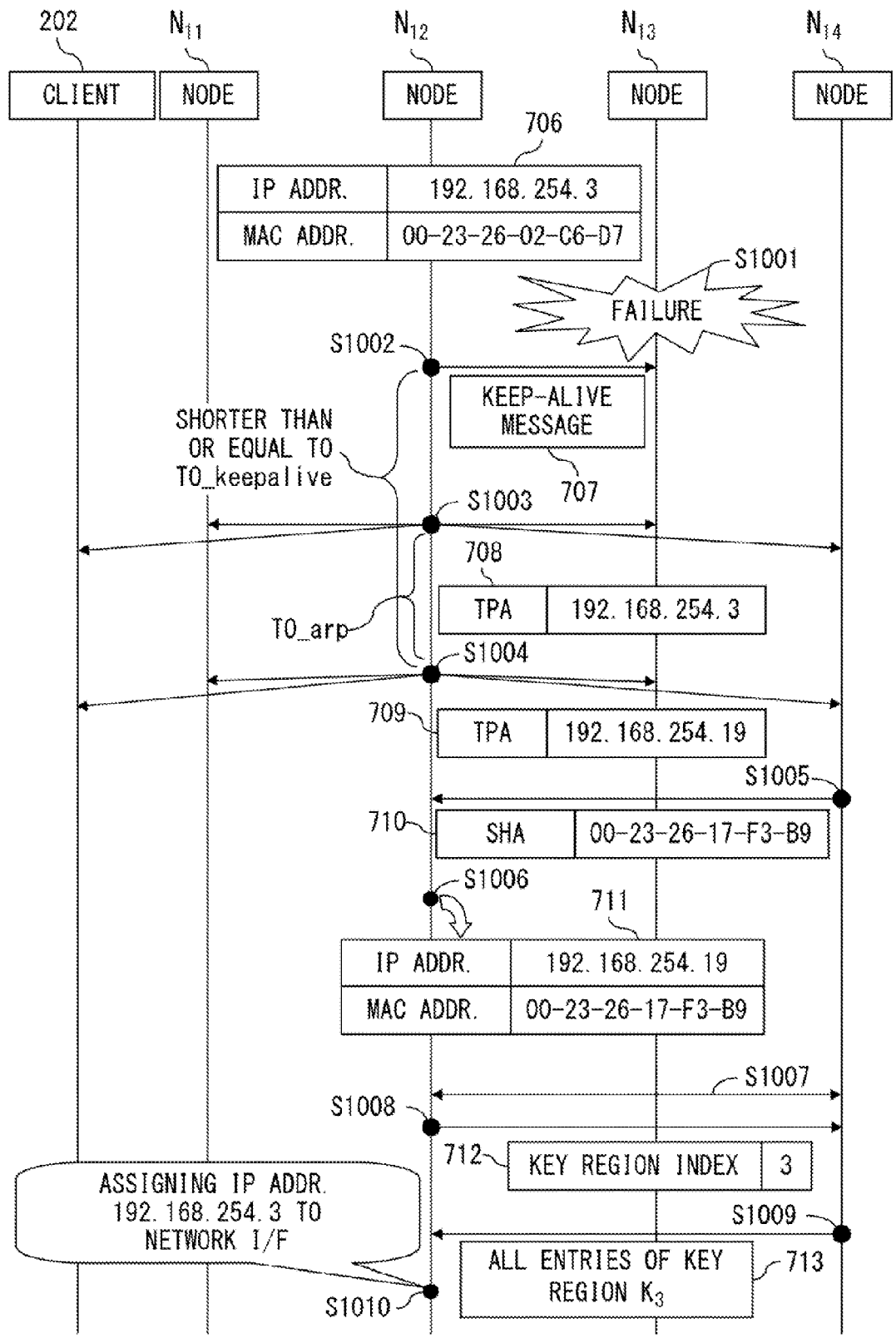
F I G. 1 8

RECORDING MEDIUM, DISTRIBUTION CONTROLLING METHOD, AND INFORMATION PROCESSING DEVICE

CROSS-REFERENCE TO RELATED APPLICATION

This application is based upon and claims the benefit of priority of the prior Japanese Patent Application No. 2011-191957, filed on Sep. 2, 2011, the entire contents of which are incorporated herein by reference.

FIELD

The embodiments discussed herein are related to distribution control for a distributed database.

BACKGROUND

A database may be a traditional relational database (RDB), or may be any of other types such as a key-value store (KVS) etc. Both of the RDB and KVS are compatible with distribution to a plurality of nodes. For example, Oracle RAC (Oracle real application cluster) etc. are known as examples of a distributed RDB, and Dynamo, Cassandra, etc. are known as examples of a distributed KVS.

In addition, there are various types of distributed database systems. For example, some distributed database systems use a distributed hash table (DHT). The DHT is a technique also used in a peer-to-peer (P2P) data delivery system, and various studies have been made on the DHT.

For example, the following distributed data management system is proposed to equally distribute the loads to nodes in a DHT data management mechanism shared among many users.

In the distributed data management system, a management unit sets up virtual nodes, and allocates the process of accessing data stored in the data management system to each virtual node. Furthermore, a mapping unit associates the virtual node with a node in the data management system. It is possible to adjust the load of each node by adjusting the number of virtual nodes, and adjusting the mapping between a virtual node and a node.

Although the distributed database system and the network-attached storage (NAS) are different techniques, they are similar in that pieces of data are stored in nodes which are connected over a network. Furthermore, a system including a plurality of nodes such as a distributed database system, NAS, etc. may be configured redundantly in preparation for a failure in any node. One of the themes of the study on a redundant system is a failover function.

For example, relating to the NAS, the following computer system is proposed to realize the optimum failover.

The computer system includes first through third computers and a storage device connected to a plurality of computers including the first through third computers over a network. When receiving, from a client computer connected to the plurality of computers, a request for access to the storage device, the first computer executes the requested access, and transmits a response to the access request to the client computer. The second computer judges whether or not a failure has occurred in the first computer, acquires the load information about the second computer, and acquires, from the third computer, the load information about the third computer. When the acquired load information fulfills a prescribed condition, the second computer transmits a change request to the third computer. When the third computer receives the change request from the second computer, the third computer judges whether or not a failure has occurred in the first computer.

Some documents such as those in the following list are known.

Japanese Laid-open Patent Publication No. 2009-295127

Japanese Laid-open Patent Publication No. 2009-25965

Guiseppe DeCandia, Deniz Hastorun, Madan Jampani, Gunavardhan Kakulapati, Avinash Lakshman, Alex Pilchin, Swaminathan Sivasubramanian, Peter Vosshall and Werner Vogels, "Dynamo: Amazon's Highly Available Key-value Store", SOSP (Symposium on Operating Systems Principles) 2007 (also published at www.allthings-distributed.com/files/amazon-dynamo-sosp2007.pdf and retrieved on Jul. 28, 2011)

"The Apache Cassandra Project" (published at cassandra.apache.org and retrieved on Jul. 28, 2011)

Kazuyuki Shudo, "Scale-Out Technology" in "*Cloud Technology*" edited by Fujio Maruyama and Kazuyuki Shudo, published by ASCII Media Works, Nov. 6, 2009, pp. 88-101, (also published at www.shudo.net/articlae/UNIX-magazine-200904-scaleout/and retrieved on Jul. 28, 2011)

Kazuyuki Shudo, "Scale-Out Technology", *UNIX magazine*, published by ASCII Media Works, April issue in 2009, pp. 78-91 (also published at www.shudo.net/article/UNIX-magazine-200904-scaleout/and retrieved on Jul. 28, 2011)

SUMMARY

According to an aspect of an embodiment, a computer-readable recording medium having stored therein a program for causing a computer to execute a distribution controlling process is provided.

The distribution controlling process includes acquiring one or more particular entries from a database that includes a plurality of entries for each of which a key is determined. The distribution controlling process also includes storing the acquired one or more particular entries into a memory that is provided in the computer and that is used as one of a plurality of memories that store the database in a distributed manner. The distribution controlling process further includes associating a particular piece of communication endpoint information with a network interface of the computer.

Each key for each of the one or more particular entries belongs to a particular subset among a plurality of mutually disjoint subsets of a domain of keys. Each key for each of the plurality of entries belongs to the domain. The particular piece of the communication endpoint information is one of a predetermined number of pieces of the communication endpoint information and is associated with the particular subset. The predetermined number is two or more.

Each piece of the predetermined number of pieces of communication endpoint information logically identifies one of communication endpoints which are as many as the predetermined number. In addition, each piece of the predetermined number of pieces of communication endpoint information is dynamically associated with one network interface which provides access to one of the plurality of memories. Furthermore, each piece of the predetermined number of pieces of communication endpoint information is statically associated with one of the plurality of subsets.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a change in state in a distributed database system and the outline of the operation depending on the change;

FIG. 2 illustrates an example of the association among a key region, a communication endpoint, and a node;

FIG. 3 illustrates a first example of a network configuration;

FIG. 5 is a block diagram that illustrates a configuration of a node;

FIG. 6 is a block diagram that illustrates a configuration of a client;

FIG. 7 illustrates a hardware configuration of a computer;

FIG. 10 is a flowchart of an ARP reply;

FIG. 11 is a flowchart of a reading operation performed by a client;

FIG. 12 is a flowchart of a writing operation performed by a client;

FIG. 15 is a flowchart of a process in which a node monitors another node, and performs a takeover when the monitoring target becomes faulty;

FIG. 18 is a sequence diagram that illustrates a failure in a node and a takeover;

DESCRIPTION OF EMBODIMENTS

Figure 4:
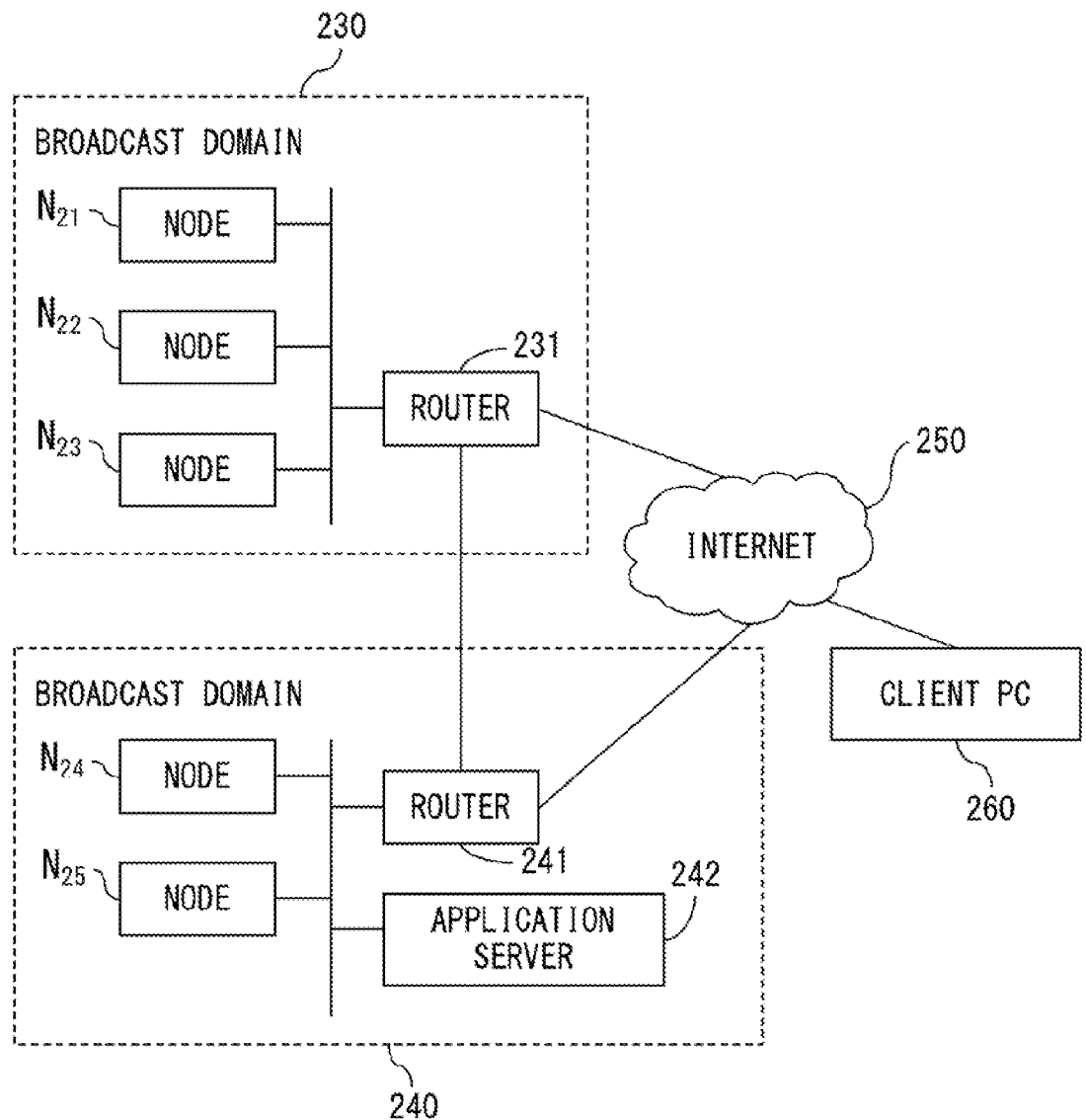
FIG. 4 illustrates a second example of a network configuration.

The embodiments are described below with reference to the attached drawings. Specifically, the outline of the present embodiment is first described with reference to FIGS. 1 and 2. Next, examples of a configuration of a network to which the present embodiment is applied are described with reference to FIGS. 3 and 4. Then, the configurations of the devices used according to the present embodiment are described with reference to FIGS. 5 through 7, and examples of data used according to the present embodiment are described with reference to FIG. 8. Then, some processes performed by individual devices are described with reference to the flowcharts in FIGS. 9 through 16, and examples of a system operation are described with reference to the sequence diagrams in FIGS. 17 through 22. Finally, some modifications are described.

FIG. 1 illustrates a change in state in a distributed database system and the outline of the operation depending on the change. Hereafter, a "database" is referred to as a "DB" for short.

When a DB is distributed to a plurality of nodes, there may arise any change in state while the DB is in service. For example, any of the plurality of nodes may become faulty, or the number of nodes may be changed by adding a new node.

In a distributed DB system of a certain type in which a DB is distributed to and stored in memories, each of which is included in each of a plurality of nodes, the nodes may exchange a kind of control information with one another to follow (i.e., to track) the change in state. A protocol used in exchanging the control information tends to be complicated, in particular when the protocol is designed with the scalability taken into account so that a large number of nodes are allowed.

In addition, a protocol used in exchanging the control information among nodes for following the change in state tends to be implemented in the application layer depending on the design of a distributed DB system. Thus, implementation of the above-mentioned protocol may call for complicated programming in the application layer, thereby imposing a heavy load on a programmer.

On the other hand, most devices having a communication function are implemented with a communication protocol for enabling communications to be appropriately performed even when the association between a communication endpoint and a network interface dynamically changes. Since a device having a communication function may be used for various purposes, the communication protocol tends to be implemented in a layer lower than the application layer.

As described below in detail, according to the present embodiment, the mechanism in the application layer for following the change in state that may occur in a case where a DB is distributed to a plurality of nodes is simplified by using the existence of a communication protocol implemented in a layer lower than the application layer.

FIG. 1 exemplifies two nodes and one client in a distributed DB system in which pieces of data are distributed to and stored in the memories of a plurality of nodes. Each node of the distributed DB system operates as a server to a client. In addition, each node is specifically a computer (that is, an information processing device), and each client is also a computer.

In the example in FIG. 1, computers 100a and 100b are two nodes in a plurality of nodes, and a computer 110 is a client. The computers 100a, 100b, and 110 are connected to one another over a network not illustrated in FIG. 1.

The computer 100a includes a memory 101a and a network interface Ia. The computer 100b has a memory 101b and a network interface Ib. Each of the memories 101a and 101b may be primary storage such as a RAM (random access memory) or may be secondary storage such as a hard disk device. Due to space limitations, the words "interface", "communication", and "endpoint" may be respectively abbreviated to "I/F", "comm.", and "EP" in some figures.

It is preferable that each of the memories 101a and 101b is specifically a RAM, to which high-speed access is enabled. However, in an embodiment having no problem even when the latency in DB access is somewhat long, each of the memories 101a and 101b may be an external storage device such as a hard disk device.

Each of the network interfaces Ia and Ib may be, for example, an on-board network adapter, or a NIC (network interface card) attached externally. Each of the network interfaces Ia and Ib may be realized by hardware circuits such as a processing circuit of the physical layer and a processing circuit of the MAC (media access control) sublayer. The physical layer and the MAC sublayer herein are those in the OSI (Open Systems Interconnection) reference model.

In FIG. 1, for convenience of explanation, pieces of information for respectively identifying the network interfaces Ia and Ib are expressed as "Ia" and "Ib" using the respective reference signs of the network interfaces Ia and Ib themselves. A specific example of each piece of the information for identifying each of the network interfaces Ia and Ib is a physical address (also referred to as a hardware address) such as a MAC address.

The DB in the distributed DB system in FIG. 1 includes a plurality of entries, and is distributed to and stored in the memories of the plurality of nodes. For each entry, a key corresponding to the entry itself is determined.

For example, the DB may specifically be a KVS. An entry in the KVS is a pair of a key and a value. That is, the "key corresponding to the entry" is the key included in the entry.

Otherwise, the DB may be an RDB. The RDB includes one or more tables, and an entry of each table is a tuple of one or more fields. One particular field in each table is predetermined to be a field used as a key for the table. That is, the key corresponding to an entry is the data of the particular field in the entry itself.

When a key corresponding to each entry is determined as described above, distribution of the DB is possible based on the horizontal partitioning according to the value of the key. That is, the distribution based on the horizontal partitioning is applicable to both of the KVS and the RDB. In addition, when a hash value is used as a key, it is possible to regard the DB as a DHT.

Let K be the domain of keys. For example, when 16-bit unsigned integers are used as keys, the domain K is a set of integers from 0 to $2^{16}-1$. As another example, when any character strings, each of whose length is one or longer, are allowed to be used as keys, the domain K is a set of any character strings, each of whose length is one or longer.

Let M be a predetermined integer being two or larger, and assume that a subset $K_j$ of the domain K is appropriately defined for each j where $0 \le j \le M-1$. Also assume that each subset is defined so that subsets $K_i$ and $K_j$ are mutually disjoint for any i and j where $i \ne j$. In other words, assume that each subset is defined so that $K_i \cap K_j$ is the empty set for any i and j where $i \ne j$.

In addition, assume that the domain K is the union of the subsets $K_0$ to $K_{M-1}$ as indicated by formula (1).

$$K = \bigcup_{j=0}^{M-1} K_j \quad (1)$$

The details of how each subset $K_j$ is defined are arbitrary depending on the embodiments. The value of M is also arbitrary depending on the embodiments. That is, so far as the domain K is partitioned into M subsets $K_0$ to $K_{M-1}$ that are mutually exclusive and collectively exhaustive, it does not matter how the subsets $K_0$ to $K_{M-1}$ are specifically defined.

For example, when the domain K is a set whose elements are integers, each subset $K_j$ may be defined by formula (2).

The function mod (x, y) in formula (2) is a modulo function for calculating a remainder obtained when dividing x by y.

$\forall 0 \le j \le M-1,$ $$K_j = \{k | k \in K \wedge \mathrm{mod}(k,M)=j\} \quad (2)$$

As another example, using an appropriate hash function hash(x) for calculation of the hash value of an argument x, each subset $K_j$ may be defined by formula (3). The definition of formula (3) is applicable regardless of which kind of a set the domain K is.

$\forall 0 \le j \le M-1,$ $$K_j = \{k | k \in K \wedge \mathrm{mod}(\mathrm{hash}(k),M)=j\} \quad (3)$$

As the hash function hash (x) in formula (3), any hash function is available, but it is preferable that the hash function hash(x) is a cryptographic hash function because the cryptographic hash function results in a highly uniform distribution of hash values.

If the uniformity of distribution of hash values is high, it is expected that the horizontal partitioning according to the value of the key is well balanced. The well-balanced partitioning means efficient distribution. Therefore, it is preferable that the hash function hash(x) is a cryptographic hash function. For example, an example of a cryptographic hash function is SHA-1 (secure hash algorithm 1), which outputs a 160-bit hash value.

As another example, each subset $K_j$ may be defined by formula (4) or (5) if $M=2^B$ holds true, where B is an integer equal to or larger than one. The function ext(x, y, z) in formulas (4) and (5) is a function to extract the y-th through the z-th bits in the bit string x. It is assumed that the 0-th bit is the most significant bit.

$\forall 0 \le j \le 2^B-1,$ $$K_j = \{k | k \in K \wedge \mathrm{ext}(k,L,L+B-1)=j\} \quad (4)$$

$\forall 0 \le j \le 2^B-1,$ $$K_j = \{k | k \in K \wedge \mathrm{ext}(\mathrm{hash}(k),L,L+B-1)=j\} \quad (5)$$

For example, according to formula (4), B bits (namely, the L-th through the (L+B−1)-th bits) in the bit string that indicates the key k are extracted. Then, the key region to which the key k belongs is determined by the number expressed by the extracted B bits (namely, the number equal to or exceeding zero and equal to or less than ($2^B-1$)). Instead of extracting B bits from the bit string itself expressing the key k as in formula (4), formula (5) indicates extracting B bits from the bit string itself expressing the hash value of the key k.

The function ext(x, y, z) is an example of a function to extract bits at plural particular positions from the input bit string. Instead of the function to extract consecutive (z−y+1) bits such as the function ext(x, y, z), a function to extract bits at plural inconsecutive positions such as the second, fifth, and eighth bits may be used.

Each subset $K_j$ may be defined as indicated by formula (6). The function f in formula (6) is any mapping from the set K to a set X which satisfies formula (7). In formulas (6) and (7), let $T_j$ be a threshold that is an appropriately selected real number for any j where $0 \le j \le M$, and assume that $T_j < T_{j+1}$ holds true for any j where $0 \le j \le M-1$.

$\forall 0 \le j \le M-1,$ $$K_j = \{k | k \in K \wedge T_j \le f(k) < T_{j+1}\} \quad (6)$$

$$X \subseteq \{x | x \in R \wedge T_0 \le x < T_M\} \quad (7)$$

According to formula (7), the function f is any mapping from the domain K of the keys to the set X that includes, as its elements, at least some of the real numbers equal to or larger than the threshold $T_0$ and smaller than the threshold $T_M$. Depending on the domain K of the keys, the function f may be, for example, an identity mapping or a hash function. Depending on the embodiments, the function f may be, of course, a particular mapping that uses at least one of: a hash function (especially a cryptographic hash function); a modulo function; and a function to extract bits at a plurality of particular positions from an input bit string.

As exemplified by formulas (2) through (7), the subsets $K_0$ to $K_{M-1}$ may be defined based on the image of the key under a particular mapping. Note that formula (6) is a generalized formula that covers formulas (2) through (5), as described below.

Let SHA1(k) be a function for obtaining a hash value from the key k according to SHA-1. When using SHA1(k) as the hash function hash(k) in the example of formula (5) where L=0 and B=7, each subset $K_j$ is defined by formula (8).

$$\forall\, 0 \le j \le 2^7 - 1, \qquad (8)$$
$$K_j = \{k \mid k \in K \land ext(SHA1(k), 0, 6) = j\}$$
$$= \{k \mid k \in K \land 2^{153} \times j \le SHA1(k) < 2^{153} \times (j+1)\}$$

From another viewpoint, the example of formula (8) is also an example in which the threshold $T_j$ in formula (6) is defined so that $T_j = 2^{153} \times j$ holds true for any j where $0 \le j \le M$, and in which the function SHA1(k) is used as the function f(k) in formula (6).

The example of formula (2) is also an example in which the modulo function mod(k, M) is used as the function f(k) in formula (6), and in which the threshold $T_j$ is defined so that $T_j = j$ holds true for any j where $0 \le j \le M$. Similarly, the example of formula (3) is also an example in which the function mod(hash(k), M)) is used as the function f(k) in formula (6), and in which the threshold $T_j$ is defined so that $T_j = j$ holds true for any j where $0 \le j \le M$. It is also obvious that each of formulas (4) and (5) is one of the specific examples of formula (6).

Let Ka be a particular one of the subsets $K_0$ to $K_{M-1}$. All entries 102 whose keys belong to the subset Ka are stored in the memory 101a of the computer 100a in step S1 in FIG. 1 while the entries 102 are stored in the memory 101b of the computer 100b in step S2. The number of entries 102 may be one or may be larger than one.

When the computer 110 intends to access at least one of the entries 102, the computer 110 transmits a DB access request. Specifically, in step S1, in which the entries 102 are stored in the memory 101a, the computer 110 transmits a DB access request 120a to the computer 100a. In step S2, in which the entries 102 are stored in the memory 101b, the computer 110 transmits a DB access request 120b to the computer 100b. The reason why the computer 110 is able to transmit the DB access request 120a to the computer 100a in step S1 and is able to transmit the DB access request 120b to the computer 100b in step S2 is described later.

The DB access request 120a is received by the network interface Ia of the computer 100a. The computer 100a accesses the memory 101a at the DB access request 120a, and returns a DB access reply to the computer 110.

The DB access request 120b is received by the network interface Ib of the computer 100b. The computer 100b accesses the memory 101b at the DB access request 120b, and returns a DB access reply to the computer 110.

As described above, a node that responds to a DB access request to an entry whose key belongs to the subset Ka is a node that stores the entry. In the description below, the node storing in its local memory the entries each of whose key belongs to the subset $K_j$ (where $0 \le j \le M-1$) is referred to a "node responsible for the subset $K_j$", a "node in charge of the subset $K_j$", or a "node which takes charge of the subset $K_j$".

One node may take charge of only one subset, or a plurality of subsets. Thus, depending on the number of subset (s) covered by each node, the loads may become unbalanced among nodes.

Furthermore, there may be a case in which there are a large number of DB access requests to entries each of whose key belongs a certain subset, and in which there are a small number of DB access requests to entries each of whose key belongs to another subset. In this case, the loads may become unbalanced among nodes depending on the amount of DB access requests.

For example, if the load of the computer 100a is high and the load of the computer 100b is low, it is preferable that part of the load of the computer 100a is transferred to the computer 100b in order to achieve load-balancing. For example, for the purpose of the load-balancing as described above, the node responsible for the subset Ka may be changed from the computer 100a to the computer 100b, and thereby a change in state from step S1 to step S2 may be made.

It is obvious that the change in state from step S1 to step S2 may be caused by other factors. For example, the following case may arise.

In FIG. 1, the computer 100b is drawn in the upper part indicating step S1. However, in the stage in step S1, it is not necessary that the computer 100b exists as a node of the distributed DB system. A change in state may be made from step S1 to step S2 by adding the computer 100b as a new node.

In FIG. 1, the computer 100a is also drawn in the lower part indicating step S2. However, in the stage in step S2, it is not necessary that the computer 100a exists as a node of the distributed DB system. That is, there may be a case in which the computer 100b takes over the charge of the subset Ka and thereby the state is changed from step S1 to step S2. Such a case may arise, for example, when the computer 100a becomes faulty immediately after step S1.

As described above, the takeover may be failover triggered by an occurrence of a failure, or may be independent of a failure. However, whatever the cause of the change in state is, the computer 100b acquires the entries 102 from the DB when the state changes from step S1 to step S2, and stores the acquired entries 102 in the memory 101b.

In the description above, it is mentioned "the computer 100b acquires the entries 102 from the DB". To be more specific, the computer 100b may acquire the entries 102 from the computer 100a. Otherwise, if a certain computer which is other than the computer 100a and is not illustrated in FIG. 1 (that is, another node in the plurality of nodes) has a backup copy of the entries 102, the computer 100b may acquire the entries 102 from the certain computer not illustrated in FIG. 1.

In addition, the computer 100b, which has acquired the entries 102, further associates a particular piece of communication endpoint information with the network interface Ib of the computer 100b. The association enables other computers (for example, the computer 110 and another node in the plurality of nodes but not illustrated in FIG. 1) to recognize that the node responsible for the subset Ka has been changed from the computer 100a to the computer 100b. The details of the reason are described below.

The communication endpoint information is a kind of information to logically identify a communication endpoint.

For example, in the communication according to the TCP/IP (Transmission Control Protocol/Internet Protocol) protocol suite, the communication endpoint is logically identified by a combination of an IP address and a port number. Although not specifically described below, such a port number is a port number in a transport layer protocol (such as the TCP, the UDP (User Datagram Protocol), etc.) in the TCP/IP protocol suite.

However, it is not always necessary for a computer which intends to perform communications with a communication endpoint to acquire, as the communication endpoint information, both of an IP address and a port number. It may be sufficient that a computer acquires only an IP address as the communication endpoint information.

For example, in a DB application for the distributed DB system illustrated in FIG. 1, the port number may be a fixed value. When a port number is a predetermined constant, any computer is able to logically recognize (i.e., identify) a target communication endpoint so long as the computer is able to acquire the IP address of the target communication endpoint. That is, the computer is able to logically recognize the target communication endpoint by the acquired IP address and the fixed known port number.

The port number used in one application is not always limited to one specific port number. For example, any port numbers being equal to or more than 7000 and equal to or less than 7020 may be used in the same single DB application. In this case, any computer is able to logically identify a target communication endpoint so far as the computer is able to acquire the IP address of the target communication endpoint. That is, the computer is able to logically identify the target communication endpoint by the acquired IP address and a port number appropriately selected from the range from 7000 to 7020.

Therefore, the communication endpoint information may be, for example, only an IP address, or a pair of an IP address and a port number. Anyway, the communication endpoint information is a kind of information for logically identifying a communication endpoint, but is not physical identification information. Accordingly, it is possible to dynamically change the correspondence between the communication endpoint, which is logically identified by the communication endpoint information, and a physical entity.

In the present embodiment, at least M pieces of communication endpoint information in the context of the M subsets $K_0$ to $K_{M-1}$ indicated by formula (1) are used to logically identify M communication endpoints. Although the details are described later with reference to FIG. 8 etc., two or more pieces of communication endpoint information may be associated with each subset $K_j$. For example, when three pieces of communication endpoint information are associated with each subset $K_j$, 3M pieces of communication endpoint information for logically identifying 3M communication endpoints are used.

Each piece of communication endpoint information is statically associated with one of the M subsets $K_0$ to $K_{M-1}$. For example, in the example in FIG. 1, the communication endpoint information Pa is statically associated with the subset Ka.

Hereafter, for convenience of explanation, the domain K of keys is also referred to as a "key space". Each of the subsets $K_0$ to $K_{M-1}$ in formula (1) is also referred to as a "key region". The key region is a subspace of the key space.

The static association between the communication endpoint information and the subset of keys is stored as static association information 111 in the computer 110 as illustrated in FIG. 1 in the present embodiment. Although only the computer 110 includes the static association information 111 in FIG. 1, the computers 100a and 100b similarly may store the static association information 111.

In FIG. 1, due to space limitations, only the association between the key region Ka (that is, the subset Ka) and the communication endpoint information Pa is illustrated as an example of the static association information 111. However, the static association information 111 statically associates each of a predetermined number of pieces (for example, 3M pieces when each subset $K_j$ is associated with three pieces of communication endpoint information) of communication endpoint information with one of the M key regions $K_0$ to $K_{M-1}$.

In addition, each piece of communication endpoint information is dynamically associated with a network interface which provides access to one of a plurality of memories that store the DB in a distributed manner.

For example, in step S1, every entry 102 whose key belongs to the key region Ka is stored in the memory 101a. Therefore, in step S1, the communication endpoint information Pa, which is statically associated with the key region Ka, is associated with the network interface Ia, which provides access to the memory 101a.

In step S2, the entries 102 are stored in the memory 101b. Therefore, in step S2, the communication endpoint information Pa is associated with the network interface Ib, which provides access to the memory 101b.

The above-mentioned dynamic association between the communication endpoint information and the network interface is stored as dynamic association information 112 in the computer 110 according to the present embodiment as illustrated in FIG. 1. In FIG. 1, only the computer 110 includes the dynamic association information 112, but the computers 100a and 100b may also store the dynamic association information 112.

In FIG. 1, due to space limitations, only the association between the communication endpoint information Pa and a network interface is illustrated as an example of the dynamic association information 112. Specifically, the dynamic association information 112 in step S1 associates the communication endpoint information Pa and the network interface Ia. However, since the dynamic association information 112 is dynamically rewritable, the dynamic association information 112 in step S2 associates the communication endpoint information Pa with the network interface Ib. It is obvious that the dynamic association information 112 further associates another piece of communication endpoint information with another network interface, too.

As described above, the communication endpoint information includes an IP address, and a network interface is identified by a MAC address. Therefore, for example, an entry of an ARP (Address Resolution Protocol) table may be used as the dynamic association information 112, which dynamically associates the communication endpoint information with a network interface.

The ARP table is also referred to as ARP cache, and includes one or more entries each of which associates an IP address and a MAC address with each other. Each entry of the ARP table is created and updated based on an ARP request and an ARP reply, and is deleted when it is not accessed for a predetermined time. Thus, each entry of the ARP table is a preferable example of the dynamic association information 112 for dynamically associating the IP address and the MAC address.

The entries 102, which are acquired by the computer 100b when the state changes from step S1 to step S2, are all entries each of whose key belongs to the subset Ka, as described above. Thus, upon transition from step S1 to step S2, the computer 100*b* associates the communication endpoint information Pa (which is statically associated with the subset Ka, of which the computer 100*b* is to newly take charge) with the network interface Ib of the computer 100*b* itself. That is, the above-mentioned "particular piece of communication endpoint information" is the communication endpoint information Pa in the example in FIG. 1.

As described above, the network interface Ib is identified by, for example, a MAC address, and the communication endpoint information Pa includes an IP address. Therefore, the association between the communication endpoint information Pa and the network interface Ib made by the computer 100*b* is able to be realized by, for example, the technique called "IP aliasing" specifically.

The IP aliasing function is implemented in some OSs (operating systems). The IP aliasing function is a function to assign a plurality of IP addresses to one network interface. That is, the IP aliasing function enables one MAC address to be associated with a plurality of IP addresses.

When the computer 100*b* associates the communication endpoint information Pa with the network interface Ib, the computer 110 is able to recognize that the communication endpoint information Pa has been associated with the network interface Ib. That is, the computer 110 is enabled to update the dynamic association information 112 for the following reason.

In the actual communications, a message whose destination is specified by logical information such as the communication endpoint information Pa is encapsulated, and included in the payload of a frame in a lower layer. Then, the frame in the lower layer is transmitted. For example, an IP datagram is included in the payload of an Ethernet frame, and the Ethernet frame is transmitted.

Therefore, before transmitting a message addressed to the communication endpoint logically identified by the communication endpoint information Pa, the computer 110 checks the physical identification information for physically identifying a network interface that serves as the communication endpoint that is logically identified by the communication endpoint information Pa. Specifically, the computer 110 refers to the dynamic association information 112, and thereby checks the physical identification information corresponding to the communication endpoint information Pa.

If the communication endpoint information Pa is associated with any physical identification information by the dynamic association information 112, the computer 110 specifies the physical identification information associated with the communication endpoint information Pa as the destination of the frame in the lower layer.

On the other hand, if the dynamic association information 112 does not associate the communication endpoint information Pa with any physical identification information, the computer 110 inquires about the network interface corresponding to the communication endpoint information Pa by broadcasting. Then, a computer that includes the network interface associated with the communication endpoint information Pa replies to the inquiry.

For example, if an inquiry from the computer 110 is broadcast after the computer 100*b* associates the communication endpoint information Pa with the network interface Ib, the computer 100*b* replies to the inquiry. Then, the computer 110 receives the reply, and acquires the identification information for identification of the network interface Ib as the physical identification information corresponding to the communication endpoint information Pa.

Furthermore, the computer 110 updates the dynamic association information 112 based on the received reply. That is, the computer 110 updates the dynamic association information 112 so as to associate the communication endpoint information Pa with the network interface Ib. Then, the computer 110 specifies the identification information physically identifying the network interface Ib as the destination of the frame according to the updated dynamic association information 112.

As described above, the actual communication involves the process of resolving the logical identification information into the physical identification information. For the resolution, an inquiry is broadcast as described above as necessary, and the dynamic association information 112 is updated based on the reply. Thus, even if the association between the logical identification information and the physical identification information dynamically changes, the dynamic association information 112 is appropriately updated according to the change.

Even if the dynamic association information 112 incidentally stays in the state in step S1 when the computer 110 refers to the dynamic association information 112, there is no problem so long as the computer 110 performs an appropriate process(es). The appropriate process (es) may be a timeout process and a retry process, which are common in communications, an aging process, which is common in management of dynamic information, or a combination of these processes.

For example, the computer 110 may refer to the dynamic association information 112 to transmit the DB access request 120*b*, and may acquire, from the dynamic association information 112, obsolete information (i.e., old information) that the communication endpoint information Pa is associated with the network interface Ia. As a result, the computer 110 may specify the information for physically identifying the network interface Ia as the destination of the frame of the DB access request 120*b*.

However, at the time when the process in step S2 is performed, the association between the network interface Ia and the communication endpoint information Pa is already dissolved. Accordingly, even if the frame of the DB access request 120*b* is received at the network interface Ia of the computer 100*a*, the DB access request 120*b* is discarded in the computer 100*a*. Thus, the reply to the DB access request 120*b* is not returned.

That is, if the computer 110 transmits the frame of the DB access request 120*b* based on the wrong resolution result according to the obsolete dynamic association information 112, the computer 110 is unable to obtain a reply, and therefore times out. The computer 110 is able to update the dynamic association information 112 by performing an appropriate retry process in response to the timeout.

For example, the computer 110 may forcibly delete the association between the communication endpoint information Pa (which logically identifies the destination of the DB access request 120*b*, for which the timeout has occurred because of the absence of a reply) and the network interface Ia from the dynamic association information 112. Then, the computer 110 may retry the transmission of the DB access request 120*b*.

In this case, since the dynamic association information 112 after the forcible deletion does not associate the communication endpoint information Pa with any physical identification information, the computer 110 broadcasts an inquiry as mentioned above. As a result, the dynamic association information 112 is correctly updated. That is, a new state in which the communication endpoint information Pa is associated with the network interface Ib is reflected in the dynamic association information 112.

When the computer 110 determines the destination of the frame of the DB access request 120b according to the updated dynamic association information 112, the DB access request 120b is then correctly received by the computer 100b. Then, the computer 110 is able to receive, from the computer 100b, a reply to the DB access request 120b.

Otherwise, it is possible that the computer 110 performs neither the above-mentioned explicit timeout process nor the above-mentioned explicit retry process. Instead, the computer 110 may perform the aging process on the dynamic association information 112, thereby forcibly deleting the dynamic association information 112 if the dynamic association information 112 becomes obsolete.

Thus, the obsolete dynamic association information 112, which associates the communication endpoint information Pa with the network interface Ia, is to be deleted in time in the aging process. Therefore, when the computer 110 intends to transmit any message (which may be, for example, the DB access request 120b) for which the communication endpoint information Pa is specified as the destination after the deletion of the obsolete dynamic association information 112, an inquiry is also broadcast in this case similarly to the above-described case.

As a result, the dynamic association information 112 is correctly updated. Then, the computer 110 transmits the message according to the correctly updated dynamic association information 112. Therefore, the message is received appropriately by the network interface Ib in accordance with the new state, in which the communication endpoint information Pa is associated with the network interface Ib.

As described above, when the computer 100b associates the communication endpoint information Pa with the network interface Ib, the computer 110 is enabled to recognize that the communication endpoint information Pa has been associated with the network interface Ib. That is, the computer 110 is able to update the dynamic association information 112 according to the recognized result.

Therefore, while there may be a time lag from when the state changes from step S1 to step S2 to when the dynamic association information 112 is updated, the computer 110 is able to appropriately update the dynamic association information 112 according to the state change. Then, the computer 110 is able to transmit any message such as the DB access request 120b to an appropriate destination according to the appropriately updated dynamic association information 112.

Namely, by dynamically updating the dynamic association information 112, the computer 110 is able to correctly specify the identification information, which identifies the network interface Ia, as the destination of the frame of the DB access request 120a in step S1. In addition, by dynamically updating the dynamic association information 112, the computer 110 is able to correctly specify the identification information, which identifies the network interface Ib, as the destination of the frame of the DB access request 120b in step S2.

As a result, the DB access request 120a is correctly received by the computer 100a, and the DB access request 120b is correctly received by the computer 100b. That is, even if the node responsible for the key region Ka changes from the computer 100a to the computer 100b, the computer 110 is still able to transmit a DB access request to the node responsible for the key region Ka according to the change.

Each of the DB access requests 120a and 120b includes at least the fields for the following items (1-1) through (1-3).

(1-1) Communication endpoint information for identifying the communication endpoint at the destination of the DB access request.

(1-2) A key for identifying an entry that the computer 110 intends to access.

(1-3) The content of a request (i.e., a request body) indicating the content of the operation to be performed on the DB.

Specifically, the communication endpoint information Pa, a key k1 belonging to the key region Ka, and appropriate request content are specified in the DB access request 120a. Meanwhile, the communication endpoint information Pa, a key k2 belonging to the key region Ka, and appropriate request content are specified in the DB access request 120b.

As clearly understood from the examples of the DB access requests 120a and 120b above, the communication endpoint information that is specified in the DB access request is the communication endpoint information that is associated with the key region, to which the key specified in the DB access request belongs, by the static association information 111. Therefore, the computer 110 first determines the key region to which the key belongs from the key of the entry that the computer 110 intends to access. Then, by referring to the static association information 111, the computer 110 acquires the communication endpoint information corresponding to the determined key region, and specifies the acquired communication endpoint information in the DB access request.

The computer 110 is able to appropriately determine the key region from the key depending on how the key regions are defined. For example, assume that the key regions are defined by formula (2). In this case, the constant M is known to the computer 110. Therefore, if the key of the entry that the computer 110 intends to access is, for example, the key k1, the computer 110 is able to calculate the mod(k1, M) according to formula (2), and to determine the key region Ka, to which the key k1 belongs, according to the calculated result. The same holds true with the case in which the key regions are defined by any other formula.

The request content described in item (1-3) is expressed by an appropriate format depending on the specifications of the DB application used for the distributed DB system. For example, as the operations to be performed on the DB, the DB application may define only two types of operations, that is, a reading operation for reading an entry and a writing operation for writing data to an entry. In this case, the request content may include a field indicating the type of operation, and an optional field expressing the data to be written by the writing operation.

Depending on the DB application, an inserting operation for adding a new entry, and an updating operation for rewriting an existing entry may be defined instead of the writing operation. Also in this case, the request content may include a field indicating the type of operation and an optional field expressing the data to be written by the inserting operation or the updating operation. Furthermore, a deleting operation for deleting the existing entry may be specifiable as the request content.

Since the DB access request includes communication endpoint information, a key, and request content as described above, a node which receives the DB access request is able to identify the entry to be accessed according to the DB access request, and to perform the requested operation on the identified entry. As a result, the node that receives the DB access request is able to return the result of the DB access as a DB access reply to the computer 110, which is the sender of the DB access request.

The format of the DB access reply is arbitrary depending on an embodiment. For example, the DB access reply in a case where the reading operation is requested includes the data of the entry corresponding to the key specified in the DB access request. In addition, the DB access reply for the operation other than the reading operation may include, for example, the information indicating whether or not the operation has been successfully performed.

As understood from the explanation about FIG. 1, according to the present embodiment, the association (in other words, the correspondence) that indicates which subset of the domain of the keys each of the plurality of memories, which store the DB in a distributed manner, corresponds to is not managed by direct and dynamic association. The association (i.e., the correspondence) is managed by indirect association.

That is, a subset and a piece of the communication endpoint information are statically associated with each other. The piece of the communication endpoint information thus statically associated with the subset is dynamically associated with a network interface which provides access to a memory. Thus, the subset and the memory are indirectly associated with each other.

A state change which may occur in a case where a DB is distributed to a plurality of memories is, namely, a change in the above-described indirect association between a memory and a subset. In addition, the association that is between a subset and a piece of the communication endpoint information and that is used for the indirect association between a memory and a subset is static regardless of the state change, and therefore does not have to be followed. Therefore, following the state change is realized by following the change in the association that is between the communication endpoint information and the network interface and that is used in indirectly associating the memory and the subset.

It is possible to follow the change in the association between the communication endpoint information and the network interface by using a communication protocol implemented in a layer lower than the application layer. Therefore, according to the present embodiment, it is possible to follow the state change by using the communication protocol implemented in the layer lower than the application layer. That is, according to the present embodiment, a complicated protocol for exchange of control information between the nodes is not required, and the mechanism in the application layer for following the state change is simplified by using the existence of the communication protocol.

Next, the association using the static association information 111 and the dynamic association information 112 is further described below in detail with reference to FIG. 2. FIG. 2 illustrates an example of the association among a key region, a communication endpoint, and a node.

In FIG. 2, a donut-shaped gray portion indicates the key space K (that is, the domain K of the keys). The key space K is partitioned into 16 mutually disjoint key regions $K_0$ to $K_{15}$ (that is, mutually disjoint subsets $K_0$ to $K_{15}$ of the domain K) in the example in FIG. 2. In the example in FIG. 2, the value of M in formula (1) is 16.

As described above, the static association information 111 statically associates, for each key region $K_j$ (where $0 \leq j \leq M-1$), the key region $K_j$ and the communication endpoint information $P_j$ with each other. The association between the key region $K_j$ and the communication endpoint information $P_j$ is, in other words, the association between the key region $K_j$ and the communication endpoint identified by the communication endpoint information $P_j$.

In FIG. 2, pieces of the communication endpoint information $P_0$ to $P_{15}$ are expressed by black circles. The static association between the key region $K_j$ and the communication endpoint information $P_j$, associated by the static association information 111, is indicated by the solid line between the black circle and the gray block.

On the other hand, the dynamic association information 112 dynamically associates the communication endpoint information with the network interface. That is, the dynamic association information 112 dynamically associates the key region, which is statically associated with the communication endpoint information, with the network interface through the communication endpoint information.

In addition, each individual network interface statically corresponds to one of a plurality of nodes. Therefore, the dynamic association information 112 also associates a key region and a node with each other through the association between the communication endpoint information and the network interface. That is, according to the association between the communication endpoint information, which is statically associated with a key region, and the network interface included in a node, the dynamic association information 112 also indicates that this node takes charge of this key region.

The oval in broken line indicates a node in FIG. 2. That is, in the example in FIG. 2, the distributed DB system includes five nodes $N_1$ to $N_5$. Furthermore, the dynamic association by the dynamic association information 112 corresponds to the association between the oval and the gray block(s) in FIG. 2.

Specifically, in the example in FIG. 2, the node $N_1$ takes charge of the key regions $K_1$, $K_2$, and $K_3$. That is, the node $N_1$ associates each of three pieces of the communication endpoint information $P_1$, $P_2$, and $P_3$ corresponding to the three key regions $K_1$, $K_2$, and $K_3$ with the network interface included in the node $N_1$ itself. In addition, the node $N_1$ stores every entry whose key belongs to any of the key regions $K_1$, $K_2$, and $K_3$ in the memory included in the node $N_1$ itself.

Furthermore, in the example in FIG. 2, the node $N_2$ takes charge of the key regions $K_4$, $K_5$, $K_6$, and $K_7$. That is, the node $N_2$ associates each of four pieces of the communication endpoint information $P_4$, $P_5$, $P_6$, and $P_7$ corresponding to the four key regions $K_4$, $K_5$, $K_6$, and $K_7$ with the network interface included in the node $N_2$ itself. In addition, the node $N_2$ stores every entry whose key belongs to any of the key regions $K_4$, $K_5$, $K_6$, and $K_7$ in the memory included in the node $N_2$ itself.

In addition, in the example in FIG. 2, the node $N_3$ takes charge of the key regions $K_8$, $K_9$, $K_{10}$, and $K_{11}$. That is, the node $N_3$ associates each of four pieces of the communication endpoint information $P_8$, $P_9$, $P_{10}$, and $P_{11}$ corresponding to the four key regions $K_8$, $K_9$, $K_{10}$, and $K_{11}$ with the network interface included in the node $N_3$ itself. In addition, the node $N_3$ stores every entry whose key belongs to any of the key regions $K_8$, $K_9$, $K_{10}$, and $K_{11}$ in the memory included in the node $N_3$ itself.

Furthermore, in the example in FIG. 2, the node $N_4$ takes charge of the key regions $K_{12}$, $K_{13}$, and $K_{14}$. That is, the node $N_4$ associates each of three pieces of the communication endpoint information $P_{12}$, $P_{13}$, and $P_{14}$ corresponding to the three key regions $K_{12}$, $K_{13}$, and $K_{14}$ with the network interface included in the node $N_4$ itself. In addition, the node $N_4$ stores every entry whose key belongs to any of the key regions $K_{12}$, $K_{13}$, and $K_{14}$ in the memory included in the node $N_4$ itself.

In the example in FIG. 2, the node $N_5$ takes charge of the key regions $K_{15}$ and $K_0$. That is, the node $N_5$ associates each of two pieces of the communication endpoint information $P_{15}$ and $P_0$ corresponding to the two key regions $K_{15}$ and $K_0$ with the network interface included in the node $N_5$ itself. In addition, the node $N_5$ stores every entry whose key belongs to any of the key regions $K_{15}$ and $K_0$ in the memory included in the node $N_5$ itself.

For convenience of illustration in FIG. 2, FIG. 2 illustrates an example in which each node is responsible for a plurality of consecutive key regions. However, the key regions for which an individual node is responsible may be inconsecutive. For example, as a result of a dynamic change in the configuration of nodes, the node $N_3$ may be responsible for the key regions $K_1$, $K_8$, $K_9$, and $K_{12}$ at a certain time point.

The client C in FIG. 2 may be, for example, the computer 110 illustrated in FIG. 1, the computer 100a, or the computer 100b. Therefore, the client C stores the static association information 111 in FIG. 1.

Therefore, the client C is able to statically determine the communication endpoint at the destination of a DB access request from the key corresponding to the entry that the client C intends to access. That is, one of the merits of the present embodiment lies in that the client C is able to directly determine the communication endpoint at the destination of the DB access request.

That is, it is not necessary for the client C to transmit an inquiry to another computer such as a gateway server etc. in order to determine, from the key, the communication endpoint at the destination of the DB access request. That is, according to the present embodiment, it is not necessary to provide a computer such as a gateway server etc. for managing which node takes charge of which key region. Therefore, in the present embodiment, various problems which may occur in other distributed DB systems as described below are avoidable.

In a distributed DB system including a gateway server for determining the destination of a DB access request from a key, the gateway server is a single point of failure (SPoF) of the entire distributed DB system. In addition, the gateway server is also a bottleneck of the performance of the entire distributed DB system. Even if there are two or more gateway servers, it is certain that these gateway servers are bottlenecks. That is, the gateway server(s) may cause problems in both fault tolerance and performance.

Furthermore, in the above-mentioned distributed DB system including the gateway server(s), a client transmits an inquiry about the node at the destination of a DB access request to the gateway server, and the gateway server returns a reply to the client. Then, the client specifies the node described in the reply from the gateway server as the destination of the DB access request, and transmits the DB access request to the destination. Therefore, the latency of the DB access is prolonged due to the time taken in transmitting the inquiry from the client to the gateway server and the time taken in transmitting the reply from the gateway server to the client.

Even if the gateway server does not return a reply to the client upon receipt of the inquiry from the client, but operates as follows, the unpreferable effect on the latency is not avoidable. That is, even if the gateway server receives the DB access request from the client, determines a node from the DB access request, and forwards the DB access request to the determined node, the latency of the DB access becomes worse by using the gateway server because the communication from the client to the gateway server still remains.

However, according to the present embodiment, without the gateway server, the client itself is able to determine the communication endpoint at the destination of the DB access request from the key and some pieces of known information only. For example, when each key region $K_j$ is defined by formula (3), the pieces of known information include the value of the constant M, and the definition of the function mod(hash(k, M)) for determining a key region from the key.

Therefore, according to the present embodiment, the above-described various problems, which are caused by a gateway server, are avoidable.

In addition, there may be a distributed DB system in which a large number of clients hold the information for direct and dynamic association between a node and a key region instead of a small number of gateway servers holding such information as described above. However, in the system in which a large number of clients hold the dynamic information, it is necessary to provide a complicated protocol for maintaining the information held by each of a large number of clients in the latest state, and to exchange a large number of control messages according to the protocol. Therefore, especially when the number of exchanged control messages is much larger than the number of nodes, the overhead due to the exchange of control messages may have an unpreferable effect on the performance of the entire distributed DB system. Therefore, it is practically very difficult for a large number of clients to each hold dynamic information while maintaining it in the latest state.

As described above, various problems may occur in other distributed DB systems. However, according to the present embodiment described with reference to FIGS. 1 and 2, the key region and the communication endpoint are statically associated with each other by the static association information 111. Therefore, the above-mentioned various problems are avoidable. That is, according to the present embodiment, the maintenance cost of the static association information 111 is zero, and deterioration (such as that in the fault tolerance, the performance, the latency, etc.) that may be caused by introducing the gateway server does not arise.

Next, examples of a network to which the present embodiment is applied are described with reference to FIGS. 3 and 4.

FIG. 3 illustrates a first example of a network configuration. In the example in FIG. 3, one broadcast domain 200 includes eight nodes $N_{11}$ through $N_{18}$ to which a DB is distributed and in which the DB is stored, a deployment server 201, a client 202, and a router 203.

The deployment server 201 initializes the nodes $N_{11}$ through $N_{18}$ when deploying the distributed DB system. The initialization includes some processes such as the installation of an OS, and the installation of a program for causing a computer to operate as a node of the distributed DB system. In addition, the deployment server 201 may further set the association between each node and the key region in the initial state. Furthermore, the deployment server 201 may perform various processes such as monitoring the load balance among the nodes $N_{11}$ through $N_{18}$ etc. However, the deployment server 201 may be omitted.

For example, the computer 100a in FIG. 1 may be one of the nodes $N_{11}$ through $N_{18}$. The computer 100b in FIG. 1 may be another one of the nodes $N_{11}$ through $N_{18}$.

In addition, the computer 110 in FIG. 1 may be the client 202. As another example, the computer 110 as a client at the source of the DB access request may be one of the nodes $N_{11}$ through $N_{18}$ other than the computers 100a and 100b.

For example, when a node responsible for a key region is changed, a certain node may request entries from another node, and this request is also a kind of the DB access request. Therefore, the computer 110 in FIG. 1 may be one of the nodes $N_{11}$ through $N_{18}$.

Additionally, the router 203 is connected to the Internet 210, and another client 220 is also connected to the Internet 210. The computer 110 in FIG. 1 may be the client 220 external to the broadcast domain 200, to which the nodes $N_{11}$ through $N_{18}$ belong.

FIG. 4 illustrates a second example of a network configuration. In the example in FIG. 4, five nodes $N_{21}$ through $N_{25}$ to which a DB is distributed and in which the DB is stored exist separately in two broadcast domains 230 and 240. Specifically, the nodes $N_{21}$, $N_{22}$, and $N_{23}$ belong to the broadcast domain 230, and the nodes $N_{24}$ and $N_{25}$ belong to the broadcast domain 240.

The broadcast domain 230 includes a router 231, and the broadcast domain 240 includes a router 241 and an application server 242. The routers 231 and 241 are connected to each other.

The routers 231 and 241 are each connected to the Internet 250. A client PC (personal computer) 260 is also connected to the Internet 250.

For example, the computer 100a in FIG. 1 may be one of the nodes $N_{21}$ through $N_{25}$. The computer 100b in FIG. 1 may be another one of the nodes $N_{21}$ through $N_{25}$.

Furthermore, the computer 110 in FIG. 1 may be the client PC 260. It is obvious that, as described with reference to FIG. 3, each of the nodes $N_{21}$ through $N_{25}$ may also operate as a client for other nodes as with the computer 110 in FIG. 1.

As another example, the application server 242 may accept a request from the client PC 260 through the Internet 250 and the router 241. The distributed DB system may be used as a back end of a Web application provided by the application server 242.

In this case, the application server 242 may transmit the DB access request to any node at a request from the client PC 260. That is, the computer 110 in FIG. 1 may be the application server 242. Depending on the content of the DB access reply received from the node, the application server 242 may return a reply (for example, a page written in HTML (hypertext markup language)) to the client PC 260.

Next, the configurations of the node and the client according to the present embodiment are described below with reference to FIGS. 5 through 7.

FIG. 5 is a block diagram that illustrates a configuration of a node. According to the present embodiment, the computers 100a and 100b in FIG. 1, the nodes $N_1$ through $N_5$ in FIG. 2, the nodes $N_{11}$ through $N_{28}$ in FIG. 3, and the nodes $N_{21}$ through $N_{25}$ in FIG. 4 are each configured as a node 300 in FIG. 5.

The node 300 includes a local store 310, a network interface 320, and a communication processing unit 330. The communication processing unit 330 holds an ARP table 331 and an interface configuration file 332. Due to space limitations, the abbreviation "I/F config file" is used for the interface configuration file 332 in FIG. 5. The node 300 further holds a correspondence table 340.

The node 300 includes one key region management unit for each key region for which the node 300 is responsible. That is, the node 300 includes one key region management unit for each communication endpoint for which the node 300 is responsible. In more detail, the node 300 includes one key region management unit for each IP address dynamically assigned to the network interface 320.

In the example in FIG. 5, for convenience of explanation, it is assumed that the node 300 takes charge of three key regions corresponding to three pieces of communication endpoint information. Therefore, the node 300 includes three key region management units 350a through 350c.

Since the key region management units 350a through 350c are similarly configured, only the detailed inside of the key region management unit 350a is illustrated in FIG. 5. Specifically, the key region management unit 350a includes a read/write processing unit 351, an acquisition control unit 352, a supply control unit 353, an association unit 354, and a monitoring request unit 355. The monitoring request unit 355 holds a requested node list 356.

The node 300 also includes a monitoring unit 360. The monitoring unit 360 holds a target node list 361.

Each block in the node 300 above is described in detail as follows. Unless specifically described, the reference to layers is, as in RFC (request for comments) 1122, based on a model in which four layers, that is, the link layer, the Internet layer, the transport layer, and the application layer are included.

The local store 310 stores entries each corresponding to one of one or more key regions for which the node 300 is responsible. That is, the local store 310 corresponds to the memories 101a and 101b in FIG. 1. The local store 310 is preferably a RAM, but may also be secondary storage such as a hard disk device etc.

The network interface 320 is similar to the network interfaces Ia and Ib in FIG. 1. That is, the network interface 320 performs processes in the link layer. The node 300 communicates with other devices through the network interface 320 and the communication processing unit 330.

The communication processing unit 330 may be realized by using part of an OS. For example, the communication processing unit 330 may be implemented using a standard library of a TCP/IP protocol stack. To realize the communication processing unit 330, an Ethernet driver may be further used. That is, the communication processing unit 330 performs processes in the transport layer and the Internet layer, and also performs processes for interfacing the Internet layer and the link layer.

In the description below, for convenience of explanation, it is assumed that the communication through the communication processing unit 330 and the network interface 320 is a communication according to the TCP/IP protocol suite, and that the Ethernet is used in the link layer.

The communication processing unit 330 not only provides the infrastructure of the communication according to the TCP/IP protocol suite as described above, but also sorts messages received from other devices and forwards each message to an appropriate module. That is, the communication processing unit 330 also performs the sorting/forwarding process in the application layer.

The message received by the node 300 from another device may be, for example, any of the massages listed in items (2-1) through (2-6) below.

(2-1) A DB access request to be processed by the read/write processing unit 351.
(2-2) A DB access reply to be processed by the acquisition control unit 352.
(2-3) A DB access request to be processed by the supply control unit 353.
(2-4) A keep-alive message for monitoring the monitoring request unit 355.
(2-5) A monitoring request to the monitoring unit 360
(2-6) An ACK (acknowledgement) to the monitoring unit 360

Depending on the type specified in the header of a received message, the communication processing unit 330 may judge which type of the above-listed messages (2-1) through (2-6) a received message falls under. The communication processing unit 330 may then sort the received message and forward it to an appropriate block. For example, when the type indicates an ACK, the communication processing unit 330 outputs the received message to the monitoring unit 360.

The DB access requests include, for example, read requests for reading data from the DB, and write requests for writing data to the DB.

According to the present embodiment, a copy request for copying all entries corresponding to a certain key region is one of the DB access requests. Furthermore, a takeover request for obtaining data of all entries corresponding to a certain key region in order to take over this key region (to be more specific, in order to take over a communication endpoint corresponding to this key region) from the node at the destination of this takeover request is also one of the DB access requests. The copy request is a request for obtaining only a copy of a set of the entries without taking over the communication endpoint from the node at the destination of the copy request.

As described later in detail, a copy request and a takeover request are used when the node responsible for a certain key region is changed. The DB access reply listed in item (2-2) above is specifically a reply to a copy request or a reply to a takeover request (hereafter these replies are referred to as a "copy reply" and a "takeover reply").

As illustrated in FIG. 1, a key is specified for a read request and also for a write request. For a copy request and a takeover request, information capable of identifying a key region is specified. For example, this information may be an index (such as the subscript j in formulas (1) through (6) and (8)) for identifying a key region, or may be communication endpoint information statically associated with a key region.

A pair of the destination IP address and the destination port number of a read request or a write request in which a certain key is specified is a pair of an IP address and a port number that identifies a communication endpoint corresponding to the key region to which the specified key belongs. Similarly, a pair of the destination IP address and the destination port number of a copy request or a takeover request in which a certain key region is specified is a pair of an IP address and a port number that identifies a communication endpoint corresponding to the specified key region.

The key region management units 350a through 350c correspond to different pieces of communication endpoint information. For example, the key region management unit 350a may initialize a TCP socket by calling (i.e., invoking) the function of the communication processing unit 330 while specifying the communication endpoint identified by the communication endpoint information (to be more specific, a pair of an IP address and a port number) corresponding to the key region management unit 350a. As described later for details, the monitoring unit 360 uses a fixed IP address not associated with any key region.

Therefore, the communication processing unit 330 is able to sort a received message, which is one of the messages (2-1) through (2-6), and forward it to an appropriate one of the key region management units 350a through 350c or to the monitoring unit 360 depending on the destination IP address and the destination port number.

Furthermore, the communication processing unit 330 may judge the subtype of the received DB access request. If the subtype indicates a read request or a write request, the communication processing unit 330 outputs the read request or the write request to the read/write processing unit 351 in the key region management unit that corresponds to the destination IP address. If the subtype indicates a copy request or a takeover request, the communication processing unit 330 outputs the copy request or the takeover request to the supply control unit 353 in the key region management unit that corresponds to the destination IP address.

As a result, for example, a read request or a write request in which a key which belongs to the key region corresponding to the key region management unit 350a is specified is outputted to the read/write processing unit 351 in the key region management unit 350a. Similarly, a copy request or a takeover request in which the key region corresponding to the key region management unit 350a is specified is outputted to the supply control unit 353 in the key region management unit 350a.

In addition, the communication processing unit 330 includes the ARP table 331 and the interface configuration file 332.

The ARP table 331 is used as the dynamic association information 112 illustrated in FIG. 1. The ARP table 331 includes an entry (hereafter referred to also as an "ARP entry") for each IP address of another device. Each ARP entry associates an IP address with a MAC address that identifies the network interface to which this IP address is assigned (i.e., allocated).

The interface configuration file 332 associates the MAC address that identifies the network interface 320 of the node 300 itself with the IP address assigned to the network interface 320. By the IP aliasing function, a plurality of IP addresses may be associated with one network interface 320. The interface configuration file 332 is, for example, a configuration file located at a particular path such as "/etc/sysconfig/network-scripts/ifcfg-eth0", which is predetermined by the OS.

The correspondence table 340 is a specific example of the static association information 111 in FIG. 1. The detailed data example of the correspondence table 340 is described later with reference to FIG. 8. All of the key region management units 350a through 350c and the monitoring unit 360 are allowed to refer to the correspondence table 340.

The key region management units 350a through 350c may be realized by, for example, different threads or different processes. The key region management units 350a through 350c operate in the application layer. The operation of each unit in the key region management unit 350a is described below.

The read/write processing unit 351 receives a DB access request from another device through the network interface 320 and the communication processing unit 330, and accesses the local store 310 according to the DB access request. Then, the read/write processing unit 351 returns a result of the DB access as a DB access reply to the source device of the DB access request through the communication processing unit 330 and the network interface 320.

Since the communication processing unit 330 performs the sorting/forwarding process as described above, what is processed by the read/write processing unit 351 in the key region management unit 350a is limited to the read request or the write request in which a key belonging to the key region corresponding to the key region management unit 350a is specified.

When the received DB access request is a read request, the read/write processing unit 351 reads the content of an entry stored in the local store 310. When the received DB access request is a write request, the read/write processing unit 351 performs a writing operation (for example, creation of a new entry or rewriting of an existing entry) to the local store 310 according to the DB access request. Then, the read/write processing unit 351 returns the result of the reading operation or the writing operation as a DB access reply.

The acquisition control unit 352 transmits a copy request or a takeover request to another node through the communication processing unit 330 and the network interface 320. Then, the acquisition control unit 352 acquires every entry that is included in the distributed DB and that corresponds to a certain key region as a reply to the copy request or the takeover request from the above-mentioned other node through the communication processing unit 330 and the network interface 320. Then, the acquisition control unit 352 adds the all acquired entries to the local store 310.

For example, if it is determined that the node 300 newly takes charge of a certain key region $K_j$, the node 300 may generate a thread for a new key region management unit corresponding to the key region $K_j$. For convenience of explanation, it is assumed that the thread for the key region management unit 350a is newly generated. Then, the acquisition control unit 352 of the key region management unit 350a transmits the copy request or the takeover request in which the key region $K_j$ is specified, acquires all entries corresponding to the key region $K_j$, and adds the all acquired entries to the local store 310.

In contrast, the supply control unit 353 replies to the copy request or the takeover request from another node, and thereby supplies a copy of a set of the entries in the DB to the above-mentioned other node. That is, the supply control unit 353 receives the copy request or the takeover request through the network interface 320 and the communication processing unit 330. Then, the supply control unit 353 reads, from the local store 310, all entries corresponding to the key region specified in the copy request or the takeover request. Furthermore, the supply control unit 353 transmits all the read entries to the source node of the copy request or the takeover request through the communication processing unit 330 and the network interface 320.

In addition, the association unit 354 performs the process for updating the interface configuration file 332. That is, the association unit 354 directly rewrites the interface configuration file 332, or instructs the communication processing unit 330 to rewrite the interface configuration file 332.

When the node 300 is determined to take charge of a new key region, or when the node 300 is released from the responsibility for the key region which the node 300 has taken charge of, the association (i.e., the correspondence) between the network interface 320 and the communication endpoint changes. If the association between the network interface 320 and the communication endpoint changes, the association unit 354 performs the process for updating the interface configuration file 332. As a result, the change in the association is reflected in the interface configuration file 332.

Specifically, if the node 300 is determined to take charge of a new key region, the acquisition control unit 352 specifies, to the association unit 354, the IP address included in the communication endpoint information corresponding to the new key region. Then, the association unit 354 updates the interface configuration file 332 so as to associate the IP address specified from the acquisition control unit 352 with the MAC address of the network interface 320. The update of the interface configuration file 332 may be directly performed by the association unit 354, or may be indirectly performed through the communication processing unit 330.

In addition, after the reply to the takeover request, the supply control unit 353 instructs the association unit 354 to release (i.e., to dissolve) the association between the IP address corresponding to the key region management unit including the supply control unit 353 itself and the network interface 320. Then, the association unit 354 updates the interface configuration file 332 so as to release the association between the IP address specified by the supply control unit 353 and the MAC address of the network interface 320. The update of the interface configuration file 332 may be directly performed by the association unit 354, or may be indirectly performed through the communication processing unit 330.

As described above, the association unit 354 directly or indirectly updates the interface configuration file 332 according to the instruction from the acquisition control unit 352 or the supply control unit 353. That is, the association unit 354 performs control to update the association between the network interface 320 and the communication endpoint.

In the present embodiment, "alive monitoring" is performed among nodes. The monitoring request unit 355 and the monitoring unit 360 are modules for the alive monitoring. The monitoring unit 360 also operates in the application layer.

Specifically, the monitoring request unit 355 in the key region management unit 350a requests one or more other nodes to monitor the communication endpoint corresponding to the key region management unit 350a. The monitoring request is transmitted from the monitoring request unit 355 through the communication processing unit 330 and the network interface 320.

In addition, the monitoring request unit 355 holds, in the requested node list 356, the information for identifying each of the one or more other nodes, to each of which the monitoring request unit 355 has transmitted the monitoring request. A specific example of the requested node list 356 is described later with reference to FIG. 8.

On the other hand, the monitoring unit 360 receives a monitoring request from another node through the network interface 320 and the communication processing unit 330. The monitoring request includes the communication endpoint information (for example, a pair of an IP address and a port number) that identifies the communication endpoint to be monitored. That is, the monitoring request includes the communication endpoint information that identifies the communication endpoint statically associated with the key region for which the node that requests the monitoring is responsible.

Upon receipt of the monitoring request, the monitoring unit 360 registers (i.e., enters) the communication endpoint information that identifies the communication endpoint to be monitored in the target node list 361. Then, according to the monitoring request, the monitoring unit 360 transmits a keep-alive message, which is a control message for monitoring. The keep-alive message is addressed to the communication endpoint to be monitored, and is transmitted through the communication processing unit 330 and the network interface 320. The keep-alive message is transmitted repeatedly at appropriate intervals.

Each time the keep-alive message is transmitted, the monitoring unit 360 monitors whether or not a reply (that is, an ACK) to the keep-alive message is received through the network interface 320 and the communication processing unit 330 within a predetermined time. Then, if the ACK is not received within the predetermined time, the monitoring unit 360 recognizes that a failure has occurred in the node that is monitored.

If the monitoring unit 360 recognizes that a failure has occurred in the node that is monitored, the monitoring unit 360 determines that the node 300 newly takes charge of the key region corresponding to the communication endpoint that is monitored. Then, the monitoring unit 360 generates a thread for a new key region management unit corresponding to this key region.

For convenience of explanation, for example, assume that the key region $K_j$ corresponds to the communication endpoint that is monitored, and also assume that a thread for the key region management unit 350a is newly generated corresponding to the key region $K_j$. In this case, the monitoring unit 360 notifies the acquisition control unit 352 in the key region management unit 350a that it is determined that the node 300 newly takes charge of the key region $K_j$. Upon receipt of the notification, the acquisition control unit 352 transmits a copy request or a takeover request as described above, and notifies the association unit 354 of the IP address included in the communication endpoint information corresponding to the key region $K_j$.

FIG. 6 is a block diagram that illustrates a configuration of a client. For example, the computer 110 in FIG. 1 may be one of a plurality of nodes, or may be configured like a client 400 in FIG. 6. In addition, the client C in FIG. 2 may be one of a plurality of nodes, or may be configured like the client 400 in FIG. 6. The clients 202 and 220 in FIG. 3, and the application server 242 and the client PC 260 in FIG. 4 are each configured like the client 400 in FIG. 6 according to the present embodiment.

The client 400 includes a network interface 410 and a communication processing unit 420, and the communication processing unit 420 holds an ARP table 421. Furthermore, the client 400 includes a DB request processing unit 430, and the DB request processing unit 430 holds a correspondence table 431. The client 400 executes an application 440.

The network interface 410 is similar to the network interfaces Ia and Ib in FIG. 1. That is, the network interface 410 performs processes in the link layer. The client 400 communicates with other devices through the network interface 410 and the communication processing unit 420.

The communication processing unit 420 may be part of an OS, and may be implemented by a standard library of a TCP/IP protocol stack, for example. To realize the communication processing unit 420, an Ethernet driver may be further used. That is, the communication processing unit 420 performs processes in the transport layer and the Internet layer, and also performs processes for interfacing the Internet layer and the link layer.

In the description below, for convenience of explanation, it is assumed that the communication through the communication processing unit 420 and the network interface 410 is a communication according to the TCP IP protocol suite, and that the Ethernet is used in the link layer.

The ARP table 421 is used as the dynamic association information 112 in FIG. 1. The ARP table 421 includes an entry for each network interface of another device, and each entry associates an IP address and a MAC address with each other.

The DB request processing unit 430 may be implemented as a library or middleware for providing the application 440 with an interface for DB access. The DB request processing unit 430 and the application 440 operate in the application layer.

The DB request processing unit 430 receives the DB access request from the application 440, and transmits the DB access request through the communication processing unit 420 and the network interface 410. Then, the DB request processing unit 430 receives the DB access reply to the DB access request through the network interface 410 and the communication processing unit 420, and returns the content of the DB access reply to the application 440.

The correspondence table 431 is a specific example of the static association information 111 in FIG. 1, and is identical to the correspondence table 340 in FIG. 5. The DB request processing unit 430 uses the correspondence table 431 in determining the destination of the DB access request.

Specifically, the DB request processing unit 430 acquires the communication endpoint information by referring to the correspondence table 431 based on the key region to which the key specified in the DB access request received from the application 440 belongs. For example, when the communication endpoint information is expressed by a pair of an IP address and a port number, the DB request processing unit 430 transmits, as a DB access request, a packet in which the acquired IP address is set as its destination IP address, and the acquired port number is set as its destination port number.

The application 440 may be any application using data in the distributed DB.

FIG. 7 illustrates a hardware configuration of a computer. For example, each device listed in the following items (3-1) through (3-6) may be specifically realized by a computer 500 in FIG. 7.

(3-1) The computers 100a, 100b, and 110 in FIG. 1.
(3-2) The nodes $N_1$ through $N_5$, and the client C in FIG. 2.
(3-3) The nodes $N_{11}$ through $N_{18}$, the deployment server 201, the client 202, and the client 220 in FIG. 3.
(3-4) The nodes $N_{21}$ through $N_{25}$, the application server 242, and the client PC 260 in FIG. 4.
(3-5) The node 300 in FIG. 5.
(3-6) The client 400 in FIG. 6.

The computer 500 in FIG. 7 includes a CPU (central processing unit) 501, a ROM (read only memory) 502, a RAM 503, and a network interface 504. The computer 500 further includes an input device 505, an output device 506, a storage device 507, and a drive device 508 of a portable storage medium 510. The above-mentioned components of the computer 500 are connected to one another through a bus 509.

The CPU 501 loads a program into the RAM 503, and executes the program using the RAM 503 as a work area. Depending on some embodiments, the general-purpose CPU 501 may be replaced with (or may be used in combination with) a dedicated hardware circuit such as an ASIC (application specific integrated circuit). The RAM 503 is more specifically a DRAM (dynamic random access memory), for example.

The program executed by the CPU 501 may be stored in advance in the ROM 502 or in the storage device 507. As another example, the program may be downloaded from a network through the network interface 504, and then may be copied to the storage device 507.

As another example, the program may be stored in the portable storage medium 510. The stored program may be provided, and then may be read by the drive device 508. The program read from the portable storage medium 510 by the drive device 508 may be loaded directly into the RAM 503, or may be temporarily copied to the storage device 507, followed by being loaded from the storage device 507 into the RAM 503.

The portable storage medium 510 may be any of an optical disc (such as a CD (compact disc), a DVD (digital versatile disc), etc.), a magneto optical disk, a magnetic disc, a non-volatile semiconductor memory card, etc. A node or a client may be a computer without the drive device 508.

In addition, the network interface 504 is a communication interface device for communication over a network. The network interface 504 may be an on-board network adapter or a NIC attached externally. The network interface 504 provides a communication function through, for example, a wired LAN, a wireless LAN, or both. The network interface 504 includes, for example, one or more hardware circuits (e.g., circuits so-called a "PHY chip", a "MAC chip", etc.).

Although FIG. 7 illustrates only one network interface 504, the computer 500 may include a plurality of network interfaces 504. For example, the computer 500 including two network interfaces 504 may be used as a node. In this case, one or more IP addresses may be dynamically assigned to each of the two network interfaces 504.

The input device 505 is, for example, a keyboard, a pointing device (such as a mouse, a touch screen, etc.), a microphone, or a combination of them. The output device 506 is, for example, a display, a speaker, or a combination of them. The display may be the touch screen. The input device 505 and the output device 506 may be omitted. For example, the input device 505 and the output device 506 may be omitted in a case where the computer 500 is used as a node, and where a human administrator performs operations on the node through the console of the deployment server 201.

The storage device 507 is a non-volatile storage device, and may be, for example, a semiconductor memory such as a flash memory etc., a hard disk device, or a combination of them. The ROM 502, the RAM 503, the storage device 507, and the portable storage medium 510 are examples of a computer-readable storage medium (i.e., a computer-readable recording medium). These computer-readable storage media are tangible storage media, and not transitory media such as a signal carrier.

When the computer 500 is used as the node 300 illustrated in FIG. 5, each block in FIG. 5 is realized by the hardware in FIG. 7 as follows, for example.

The local store 310 may preferably be the RAM 503, but there may also be a case in which the local store 310 is the storage device 507. The network interface 320 may be the network interface 504. The communication processing unit 330 may be realized by the CPU 501 that executes a program, the RAM 503 that holds the ARP table 331, and the storage device 507 that holds the interface configuration file 332. The correspondence table 340 may be stored in advance in the ROM 502 or the storage device 507, then may be read out to the RAM 503, and may be held therein.

Each of the key region management units 350a through 350c may be realized by the CPU 501 and the RAM 503. That is, the read/write processing unit 351, the acquisition control unit 352, the supply control unit 353, and the association unit 354 may be realized by the CPU 501 that executes a program. The monitoring request unit 355 may be realized by the CPU 501 that executes a program and the RAM 503 that holds the requested node list 356.

In addition, the monitoring unit 360 may also be realized by the CPU 501 that executes a program and the RAM 503 that holds the target node list 361.

When the computer 500 is used as the client 400 in FIG. 6, each block in FIG. 6 is realized by the hardware in FIG. 7 as follows, for example.

The network interface 410 may be the network interface 504. The communication processing unit 420 may be realized by the CPU 501 that executes a program and the RAM 503 that holds the ARP table 421.

The correspondence table 431 may be stored in advance in the ROM 502 or the storage device 507, then may be read out to the RAM 503, and may be held therein. The DB request processing unit 430 may be realized by the CPU 501 that executes a program and the RAM 503 that holds the correspondence table 431.

The application 440 may be executed by the CPU 501.

Figure 8:
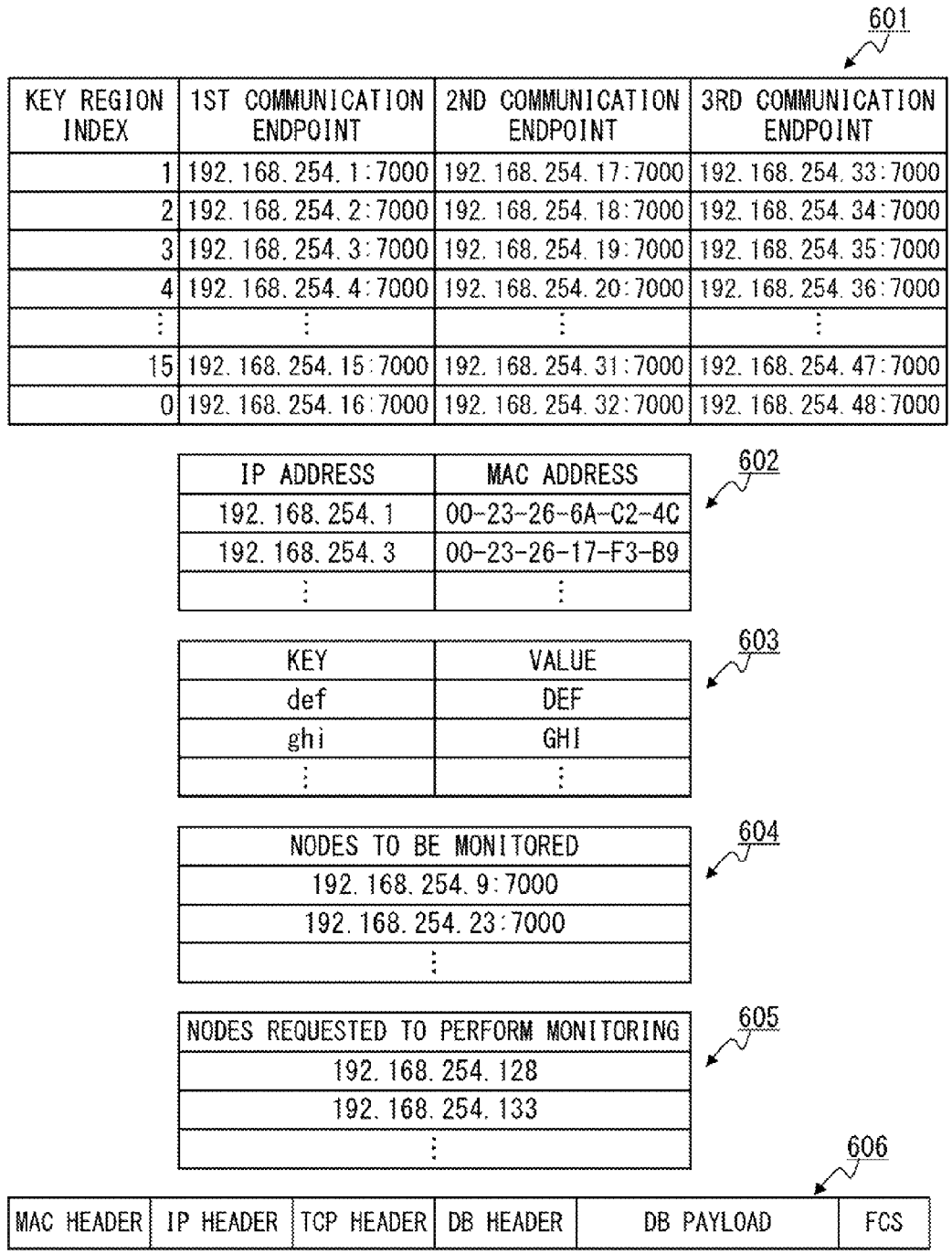
FIG. 8 illustrates examples of various types of data.

Described next is various types of data used in the distributed DB system according to the present embodiment. FIG. 8 illustrates examples of various types of data. Due to space limitations, some abbreviations are used in FIG. 8.

A correspondence table 601 is a specific example of the static association information 111 in FIG. 1. Each of the correspondence table 340 in FIG. 5 and the correspondence table 431 in FIG. 6 may be specifically the correspondence table 601 in FIG. 8.

Each entry of the correspondence table 601 corresponds to one key region. Each entry includes fields named a "key region index", a "first communication endpoint", a "second communication endpoint", and a "third communication endpoint".

The correspondence table 601 is an example for a case where the domain K of the keys is partitioned into 16 key regions $K_0$ through $K_{15}$ as in the example in FIG. 2 (that is, a case where M=16). Therefore, the key region index exemplified in the correspondence table 601 ranges from 0 to 15. For example, the entry whose key region index is j (where $0 \leq j \leq 15$) corresponds to the key region $K_j$.

According to the present embodiment, the data corresponding to one key region $K_j$ is held by each of three nodes. Therefore, each entry of the correspondence table 601 includes the fields of the "first communication endpoint" through the "third communication endpoint", each of which indicates a piece of the communication endpoint information corresponding to the key region $K_j$ in each of the three nodes. The reason for holding the same data corresponding to one key region $K_j$ in each of the three nodes is described as follows.

Assume that entries corresponding to a certain key region $K_j$ are held by only one node. Such a situation is not preferable because the entries corresponding to the key region $K_j$ may be lost when the one node becomes faulty. Therefore, it is preferable that two or more nodes each hold the entries corresponding to the key region $K_j$.

In addition, when the entries corresponding to the key region $K_j$ are held by each of only two nodes, there is the possibility of a secondary failure. To enhance the fault tolerance of the entire distributed DB system to the secondary failure, the entries corresponding to the key region $K_j$ are held by each of three nodes according to the present embodiment.

For example, assume that the nodes $N_1$ and $N_2$ each hold the entries corresponding to the key region $K_j$, and that a failure occurs in the node $N_1$ at a certain time point. As a result of the failover accompanying the failure occurred in the node $N_1$, for example, the node $N_3$ may newly hold the entries corresponding to the key region $K_j$. In this case, since the node $N_3$ is unable to acquire the entries corresponding to the key region $K_j$ from the faulty node $N_1$, the node $N_3$ tries to acquire the entries corresponding to the key region $K_j$ from the node $N_2$, which is normal.

However, for example, if the hardware of the node $N_1$ and that of the node $N_2$ are substantially of the same model, and have been released around the same time, the service life of the node $N_1$ and that of the $N_2$ are substantially the same. Therefore, it is considered that when the probability of a failure in the node $N_1$ becomes high, the probability of a failure in the node $N_2$ also becomes high. Meanwhile, the load of the process of transmitting all entries corresponding to the key region $K_j$ to the node $N_3$ is not small if the DB is large. That is, there is the possibility that a heavy load due to the process for the failover may be applied to the node $N_2$, whose service life is expected to expire soon. As a result, there may occur a secondary failure, namely another failure may occur in the node $N_2$ before the completion of the failover.

Therefore, according to the present embodiment, three nodes each hold the same data corresponding to one key region $K_j$. For example, assume that the three nodes $N_1$, $N_2$, and $N_4$ each hold the entries corresponding to the same key region $K_j$. Under this assumption, data is recoverable in most cases even if a secondary failure occurs (i.e., even if a failure occurs in the node $N_2$ during the failover accompanying a failure in the node $N_1$).

The reason why the data is recoverable is because it is rare that the three nodes $N_1$, $N_2$, and $N_4$ become faulty simultaneously. That is, even if the above-exemplified secondary failure occurs in the node $N_2$, the node $N_4$ still remains normal in most cases. Therefore, the node $N_3$ is able to acquire all entries corresponding to the key region $K_j$ from the node $N_4$, thereby completing the failover.

As with the failover from the node $N_1$ to the node $N_3$, the failover from the node $N_2$ to the node $N_5$ is also feasible. Alternatively, the node $N_5$ may acquire all entries corresponding to the key region $K_j$ from the node $N_3$, which has completed the failover from the node $N_1$.

Anyway, the entire distributed DB system is able to recover to the state in which three nodes (specifically the node $N_3$, $N_4$, and $N_5$) each hold the entries corresponding to the same key region $K_j$. Thus, excellent fault tolerance is realized by three nodes holding the same data corresponding to one key region $K_j$.

For example, in the example of the correspondence table 601 in FIG. 8, in the entry whose key region index is 1, the first communication endpoint is identified by a pair of an IP address and a port number, namely "192.168.254.1:7000", the second communication endpoint is identified by a pair of an IP address and a port number, namely "192.168.254.17:7000", and the third communication endpoint is identified by a pair of an IP address and a port number, namely "192.168.254.33:7000".

That is, this entry indicates the following items (4-1) through (4-3).

(4-1) The first node for holding the entries corresponding to the key region $K_1$ is a node logically identified by the communication endpoint information of "192.168.254.1:7000".

(4-2) The second node for holding the entries corresponding to the key region $K_1$ is a node logically identified by the communication endpoint information of "192.168.254.17:7000".

(4-3) The third node for holding the entries corresponding to the key region $K_1$ is a node logically identified by the communication endpoint information of "192.168.254.33:7000".

There may be priorities among the three nodes each holding the entries corresponding to the same key region $K_1$. Alternatively, it is possible that such priorities are not set. According to the present embodiment, it is assumed that the node at the communication endpoint identified by the communication endpoint information in the "first communication endpoint" field has the highest priority, and the node at the communication endpoint identified by the communication endpoint information in the "third communication endpoint" field has the lowest priority. In the flowchart in FIG. 11 described later, access is performed in the order from the first communication endpoint according to the above-mentioned priorities.

The example of the correspondence table 601 is an example for the case in which all nodes belong to one broadcast domain as illustrated in FIG. 3, and the client also belong to the same broadcast domain. Therefore, each IP address included in each piece of the communication endpoint information in the correspondence table 601 is a private IP address. However, it is obvious that a global IP address may be used in identifying a communication endpoint depending on some embodiments.

In addition, in the example of the correspondence table 601, the port number in each of 48 (=3×16) pieces of the communication endpoint information is the same value "7000". However, depending on some embodiments, p (where 2≤p≤48) different port numbers may be used for the 48 pieces of the communication endpoint information.

As another example, when the port number is a constant as in the case of the correspondence table 601, pieces of the communication endpoint information held by the correspondence table 601 may be expressed by IP addresses only. When the port number is a constant, a pair of an IP address and the constant port number is capable of uniquely identifying a communication endpoint. Thus, it is acceptable that only the IP addresses are stored in the correspondence table 601.

An ARP table 602 is a specific example of the dynamic association information 112 in FIG. 1. The ARP table 331 in FIG. 5 and the ARP table 421 in FIG. 6 are tables in a format that is illustrated with the ARP table 602. Each entry of the ARP table 602 associates an IP address and a MAC address with each other.

Although omitted in FIG. 8, with each entry, a counter for counting down the lifetime or the last modified time of this entry is associated. The counter or the last modified time is used for the aging process. For example, each entry of the ARP table 602 is cleared (i.e., deleted) if this entry is not used at all within a predetermined time period (for example two minutes). When an entry is used (that is, referenced or updated), the counter is reset to indicate the predetermined time period or the current time is set again as the last modified time.

Furthermore, each entry of the ARP table 602 may be held for a predetermined time period (for example ten minutes) at most regardless of whether this entry is used or not. That is, with each entry, a counter for counting down the lifetime left until the maximum time period for holding this entry may be further associated, or the creation time of this entry may be further associated.

For example, for the first entry in FIG. 8, the IP address of "192.168.254.1" and the MAC address of "00-23-26-6A-C2-4C" are associated with each other. Therefore, with the correspondence table 601 taken into consideration, the first entry indicates that the node 300 including the network interface 320 identified by the MAC address of "00-23-26-6A-C2-4C" currently takes charge of the key region $K_1$.

The distributed DB, which is distributed to and stored in individual memories of a plurality of nodes, may be an RDB or a KVS. For convenience of explanation, it is assumed that the distributed DB of the present embodiment is a KVS. A KVS 603 in FIG. 8 illustrates some entries extracted from the entries that a certain node 300, which is one of all nodes for the KVS being a distributed DB, stores in its local store 310, corresponding to a certain key region.

Each entry of the KVS 603 is a pair of a key and a value, and two entries are exemplified in FIG. 8. In the first entry, the key is "def", and the value is "DEF". In the second entry, the key is "ghi", and the value is "GHI".

A target node list 604 in FIG. 8 is a specific example of the target node list 361 in FIG. 5. That is, each element of the target node list 604 is the information for identifying a node to be monitored by the monitoring unit 360 of the node 300. Each element of the target node list 604 is specifically a piece of the communication endpoint information for identifying the communication endpoint to be monitored.

FIG. 8 exemplifies "192.168.254.9:7000" and "192.168.254.23:7000" as elements of the target node list 604. Therefore, with the correspondence table 601 taken into account, the target node list 604 indicates that the monitoring unit 360 that holds the target node list 604 in FIG. 8 as its target node list 361 monitors: the first node among three nodes responsible for the key region $K_9$; and the second node among three nodes responsible for the key region $K_7$.

Furthermore, a requested node list 605 in FIG. 8 is a specific example of the requested node list 356 in FIG. 5. That is, each element of the requested node list 605 is the information for identifying another node that has been requested by the monitoring request unit 355 to monitor the communication endpoint assigned to the node 300. Each element of the requested node list 605 is specifically a piece of the communication endpoint information for identifying the communication endpoint.

According to the present embodiment, in addition to the IP address whose assignment is dynamically changed (that is, the IP address appearing on the correspondence table 601), a fixed IP address for maintenance is assigned to each node. For example, when the distributed DB system includes eight nodes as illustrated in FIG. 3, eight fixed IP addresses of "192.168.254.128" through "192.168.254.135" not appearing on the correspondence table 601 may be used.

FIG. 8 exemplifies the IP addresses of "192.168.254.128" and "192.168.254.133" as the elements of the requested node list 605. That is, the requested node list 605 indicates that the nodes that the monitoring request unit 355 has requested to perform monitoring include two nodes to which the IP addresses of "192.168.254.128" and "192.168.254.133" are fixedly assigned, respectively. As an element of the requested node list 605, a pair of an IP address and a port number may be used instead of an IP address.

A frame 606 is an example of the frame used for a DB access request, a DB access reply, etc. in the present embodiment. To be more specific, the frame 606 is an Ethernet frame.

The frame 606 includes a MAC header, a frame payload, and an FCS (frame check sequence) for error detection. The frame payload includes an IP datagram, and the IP datagram includes an IP header and an IP payload.

In the example in FIG. 8, the IP payload includes a TCP segment. In some embodiments, the IP payload may include a PDU (protocol data unit) of a protocol other than the TCP in the transport layer such as a UDP segment etc.

The TCP segment includes a TCP header and a TCP payload. The TCP payload includes a PDU in the application layer.

In the present embodiment, the "PDU in the application layer" is specifically a PDU used in the communication between nodes or the communication between a node and a client in the DB application for the distributed DB system. The DB application specifically corresponds to the portions listed in the following items (5-1) and (5-2).

(5-1) The correspondence table 340, the key region management units 350a through 350c, and the monitoring unit 360, all of which are included in the node 300 in FIG. 5.

(5-2) The application 440 and the DB request processing unit 430, both of which are included in the client 400 in FIG. 6.

In the description below, for convenience of explanation, the PDU in the application layer is referred to as a DB packet. The DB packet includes a header and a payload. In the following descriptions, for convenience of explanation, the header of the DB packet and the payload of the DB packet are respectively referred to as a DB header and a DB payload.

For example, the DB header may include fields of a type, a subtype, etc., and may further include a field of an identification number assigned to each request, which may be a DB access request, for example. In the DB header of a reply to a certain request, the identification number of the certain request may be set. This enables the source device of requests to judge to which request the received reply corresponds. If the frame 606 is a frame for the DB access request 120a in FIG. 1, the DB payload includes the fields of the key and the request content in FIG. 1.

As described above, the frame 606 includes encapsulated PDUs of upper layers. Therefore, the frame 606 is specifically formatted so as to arrange the MAC header, the IP header, the TCP header, the DB header, the DB payload, and the FCS in this order as illustrated in FIG. 8.

It is obvious that when the DB payload is long, one DB packet may be fragmented into a plurality of IP datagrams by IP fragmentation, and thereby a plurality of frames may be transmitted. However, FIG. 8 exemplifies the unfragmented frame 606 for simple explanation.

The details of the MAC header, the IP header, and the TCP header are well known. Therefore, the detailed explanation of the MAC header, the IP header, and the TCP header is omitted here, but some points related to the present embodiment are described below.

The MAC header includes a source MAC address and a destination MAC address. The IP header includes a source IP address and a destination IP address. The TCP header includes a source port number and a destination port number. Some embodiments may use the UDP instead of the TCP. The UDP header similarly includes a source port number and a destination port number.

The communication endpoint at the destination of a DB packet is identified by a pair of a destination IP address and a destination port number. For example, when the frame 606 is a frame for the DB access request 120a in FIG. 1, the communication endpoint specified in the DB access request 120a is specifically expressed by a destination IP address field in the IP header and a destination port number field in the TCP header.

For simple explanation, it is assumed that all nodes and a client(s) belong to the same broadcast domain. In this case, the destination MAC address is a value acquired from the destination IP address by address resolution according to the ARP, and the source MAC address is a MAC address that identifies a network interface from which the frame 606 is transmitted. On the other hand, when the frame 606 is relayed by one or more routers, the MAC header is rewritten by each router.

The source port number is determined by the DB application. The source IP address is one of one or more IP addresses assigned to a network interface from which the frame 606 is transmitted.

Next, the processes performed by individual devices included in the distributed DB system are described with reference to the flowchart in FIGS. 9 through 16.

Figure 9:
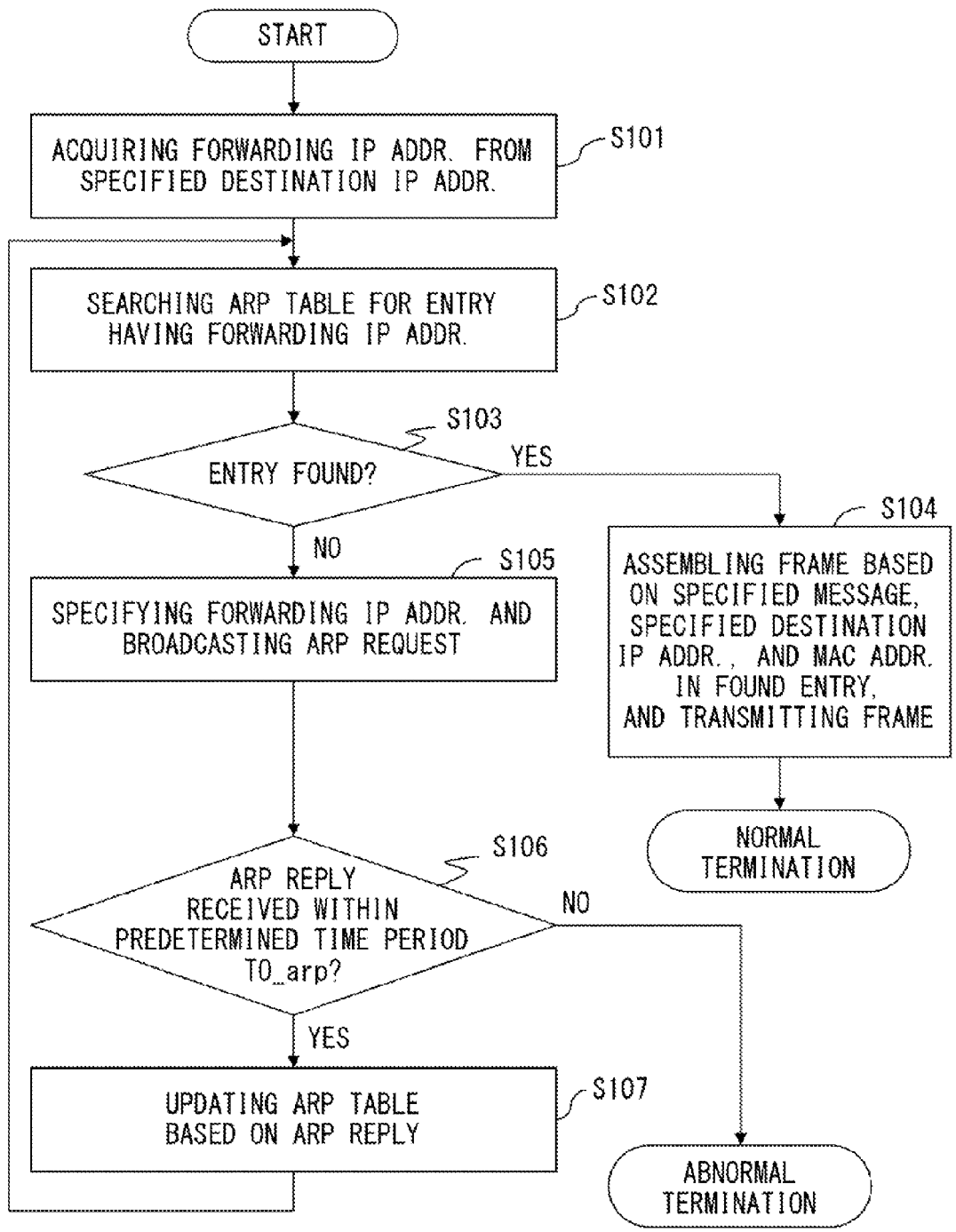
FIG. 9 is a flowchart of the operation that is performed in the Internet layer and the link layer by a communication processing unit and a network interface upon instruction to transmit a message

Specifically, the processes that are related to the ARP and that are common to the node 300 and the client 400 are described below with reference to FIGS. 9 and 10. In the present embodiment, since the ARP table is used as the dynamic association information 112 in FIG. 1, the processes in FIGS. 9 and 10 are related to the dynamic update of the dynamic association information 112. Then, the processes performed by the client 400 are described with reference to FIGS. 11 and 12. Furthermore, the processes performed by the node 300 are described with reference to FIGS. 13 through 16.

FIG. 9 is a flowchart of the operation that is performed in the Internet layer and the link layer by the communication processing unit and the network interface upon instruction to transmit a message. The process in FIG. 9 is common to the node 300 and the client 400. Therefore, in the explanation with reference to FIG. 9, the expressions of the "communication processing unit 330 or 420", the "ARP table 331 or 421", the "network interface 320 or 410", etc. may be used.

The process in FIG. 9 is called (i.e., invoked) from some steps in FIGS. 11 through 16, which are referenced later. For example, the process in FIG. 9 is performed in the following cases (6-1) through (6-6), etc.

(6-1) A case where the communication processing unit 330 receives an instruction from the read/write processing unit 351 to transmit a reply to a read request or a reply to a write request.

(6-2) A case where the communication processing unit 330 receives an instruction from the acquisition control unit 352 to transmit a copy request or a takeover request.

(6-3) A case where the communication processing unit 330 receives an instruction from the supply control unit 353 to transmit a reply to a copy request or a reply to a takeover request.

(6-4) A case where the communication processing unit 330 receives an instruction from the monitoring request unit 355 to transmit a monitoring request or to transmit an ACK to a keep-alive message.

(6-5) A case where the communication processing unit 330 receives an instruction from the monitoring unit 360 to transmit a keep-alive message for monitoring.

(6-6) A case where the communication processing unit 420 receives an instruction from the DB request processing unit 430 to transmit a DB access request (specifically a read request or a write request).

When the communication processing unit 330 or 420 receives an instruction to transmit a certain message, the communication processing unit 330 or 420 acquires a forwarding IP address from the specified destination IP address in step S101. The examples of the message include, for example, a DB access reply, a monitoring request, a keep-alive message, a DB access request, other control messages, etc. as described above.

For example, assume that the client 202 in FIG. 3 is attempting to transmit a message to the node $N_{11}$. In the example in FIG. 3, the client 202 and the node $N_{11}$ belongs to the same broadcast domain 200. Therefore, the communication processing unit 420 of the client 202 acquires, as the forwarding IP address, the destination IP address itself (that is, the IP address of the communication endpoint corresponding to the key region for which the node $N_{11}$ is currently responsible) in step S101.

The same holds true with the case in which the communication is performed between the nodes belonging to the same broadcast domain 200. That is, the communication processing unit 330 of the node 300 acquires the destination IP address itself as the forwarding IP address in step S101.

On the other hand, when the application server 242 in FIG. 4 is, as a client, attempting to transmit a message to the node $N_{21}$, the forwarding IP address is not the destination IP address itself because the application server 242 and the node $N_{21}$ belong to different broadcast domains.

In this case, for example, by using a subnet mask, the communication processing unit 420 of the application server 242 recognizes that the destination IP address is not an IP address of a machine in the broadcast domain 240, to which the application server 242 belongs. Then, the communication processing unit 420 of the application server 242 acquires, as the forwarding IP address, the IP address of the router 241, which belongs to the same broadcast domain 240 as the application server 242, in step S101.

The same holds true with the case in which communication is performed between the nodes belonging to the different broadcast domains 230 and 240. For example, when the node $N_{22}$ is attempting to transmit a certain message to the node $N_{25}$, the communication processing unit 330 of the node $N_{22}$ acquires the IP address of the router 231 as the forwarding IP address in step S101.

After acquiring the forwarding IP address as described above, the communication processing unit 330 or 420 searches the ARP table 331 or 421 for an entry having the forwarding IP address in the next step S102.

Then, in step S103, the communication processing unit 330 or 420 judges whether or not an entry is found as a result of the search in step S102. When an entry is found, the communication processing unit 330 or 420 sets again the lifetime of the found entry to a predetermined value (for example, two minutes etc.), then the process proceeds to step S104. On the other hand, if no entry is found, the process proceeds to step S105.

In step S104, the communication processing unit 330 or 420 assembles (i.e., constructs) a frame to transmit a message. Specifically, the communication processing unit 330 or 420 assembles the frame based on the message specified for transmission, the specified destination IP address, the MAC address registered in the found entry, etc. The particular destination IP address is set in the destination IP address field in the IP header, and the MAC address registered in the found entry is set in the destination MAC address field in the MAC header.

Then, the communication processing unit 330 or 420 transmits the frame through the network interface 320 or 410. When the frame is transmitted, the process in FIG. 9 is normally terminated.

On the other hand, in step S105, the communication processing unit 330 or 420 generates an ARP request in which the forwarding IP address is specified as the TPA (target protocol address). Then, the communication processing unit 330 or 420 broadcasts the generated ARP request through the network interface 320 or 410.

In the next step S106, the communication processing unit 330 or 420 judges whether or not an ARP reply has been received through the network interface 320 or 410 within a predetermined time period (hereafter referred to as "TO_arp"). If no ARP reply is received within the predetermined time period TO_arp, the communication processing unit 330 or 420 returns an error code to the caller, which has instructed the communication processing unit 330 or 420 to transmit the message, thereby abnormally terminating the process in FIG. 9.

On the other hand, if an ARP reply is received within the predetermined time period TO_arp, the communication processing unit 330 or 420 updates the ARP table 331 or 421 according to the received ARP reply in step S107.

That is, the communication processing unit 330 or 420 adds a new entry, which associates the IP address (7-1) and the MAC address (7-2) with each other, to the ARP table 331 or 421.

(7-1) The IP address specified as the SPA (sender protocol address) in the received ARP reply.

(7-2) The MAC address specified as the SHA (sender hardware address) in the received ARP reply.

Furthermore, the communication processing unit 330 or 420 sets the lifetime of the newly added entry to a predetermined value (for example, two minutes etc.).

After the above-mentioned update of the ARP table 331 or 421, the process returns to step S102. As a result of the search in step S102 after step S107, an entry is found. Therefore, a frame is then transmitted in step S104. The update of the ARP table 331 or 421 in step S107 provides an example of a case where the dynamic association information 112 in FIG. 1 is updated.

Next, with reference to FIG. 10, the process performed by a device which receives an ARP request transmitted in step S105 in FIG. 9 is described below. FIG. 10 is a flowchart of the ARP reply. The process in FIG. 10 is also common to the node 300 and the client 400.

The process in FIG. 10 is performed for each Ethernet port (that is, for each MAC address). For example, when the network interface 320 of the node 300 includes two Ethernet ports, the process in FIG. 10 is performed independently for each of the two Ethernet ports. For convenience, in the explanation in FIG. 10, the Ethernet port to which the process in FIG. 10 is targeted is referred to as a "target Ethernet port".

In step S201, the communication processing unit 330 or 420 wait until an ARP request is received.

When the ARP request is received, the communication processing unit 330 or 420 updates the ARP table 331 or 421 as necessary in step S202.

Specifically, the communication processing unit 330 or 420 searches the ARP table 331 or 421 for an entry having the IP address that is specified as the SPA in the ARP request. If the entry is found, the communication processing unit 330 or 420 updates the MAC address of the found entry to the MAC address that is specified as the SHA in the ARP request, and sets again the lifetime of the found entry to a predetermined value (for example, two minutes etc.). Then, the process proceeds to step S203.

On the other hand, if no entry is found, the communication processing unit 330 or 420 judges whether or not the IP address specified as the TPA in the received ARP request is an IP address assigned to the target Ethernet port. The communication processing unit 330 may make the judgment above by referring to the interface configuration file 332. Although omitted in FIG. 6, the communication processing unit 420 also includes an interface configuration file similar to the interface configuration file 332 in FIG. 5. Therefore, like the communication processing unit 330, the communication processing unit 420 is also able to make the above-mentioned judgment.

If the IP address specified as the TPA is the IP address assigned to the target Ethernet port, then the communication processing unit 330 or 420 adds a new entry to the ARP table 331 or 421. The newly added entry is specifically an entry that associates the IP address specified as the SPA in the ARP request and the MAC address specified as the SHA in the ARP request with each other. Then, the communication processing unit 330 or 420 sets the lifetime of the newly added entry to a predetermined value (for example, two minutes etc.). Then, the process proceeds to step S203.

On the other hand, if the IP address specified as the TPA is different from the IP address assigned to the target Ethernet port, the communication processing unit 330 or 420 does not add an entry in step S202. In this case, the process proceeds from step S202 to step S203 without updating the ARP table 331 or 421.

The dynamic association information 112 in FIG. 1 may be updated by updating the ARP table 331 or 421 (that is, by updating an ARP entry or by adding an ARP entry) in step S202 as described above.

In the next step S203, the communication processing unit 330 or 420 judges whether or not the IP address specified as the TPA in the received ARP request is the IP address assigned to the target Ethernet port. This judgment may be performed in the method described with reference to step S202.

When the IP address specified as the TPA in the received ARP request is different from the IP address assigned to the target Ethernet port, the process returns to step S201.

On the other hand, when the IP address specified as the TPA in the received ARP request is the IP address assigned to the target Ethernet port, the communication processing unit 330 or 420 returns an ARP reply in step S204. Specifically, the communication processing unit 330 or 420 generates an ARP reply that includes, as the SPA, the IP address specified as the TPA in the received ARP request, and that includes the MAC address of the target Ethernet port as the SHA. Then, the communication processing unit 330 or 420 transmits the generated ARP reply through the network interface 320 or 420.

Then, after the transmission of the ARP reply, the process returns to step S201. The transmitted ARP reply is received as described above in step S106 in FIG. 9.

Then, the processes performed by the client 400 in FIG. 6 are described below with reference to FIGS. 11 and 12.

FIG. 11 is a flowchart of a reading operation performed by the client 400. The reading operation in FIG. 11 is started when the application 440 instructs the DB request processing unit 430 to transmit a read request. The distributed DB according to the present embodiment is a KVS, part of which is exemplified in the KVS 603 in FIG. 8. Therefore, a key is specified in the read request.

In step S301, the DB request processing unit 430 identifies three communication endpoints using the key specified by the application 440, and the correspondence table 431.

Specifically, the DB request processing unit 430 first judges to which key region the specified key belongs. For example, it is assumed that each key region $K_j$ is defined by formula (3). In addition, let x be the specified key. In this case, the DB request processing unit 430 calculates the value of mod(hash (x), M), and identifies the key region to which the specified key belongs based on the calculation result. It is obvious that the DB request processing unit 430 is still able to identify the key region to which the specified key belongs even when each key region $K_j$ is defined by any other formula.

In addition, the correspondence table 431 of the present embodiment associates three communication endpoints with each key region as specifically illustrated in the correspondence table 601 in FIG. 8. Therefore, the DB request processing unit 430 searches the correspondence table 431 for an entry corresponding to the identified key region, and reads, from the found entry, three pieces of the communication endpoint information for respectively identifying the first through third communication endpoints.

Then, in the next step S302, the DB request processing unit 430 transmits the read request to the first communication endpoint, which is identified in step S301, through the communication processing unit 420 and the network interface 410. That is, the DB request processing unit 430 specifies the content of the read request and the communication endpoint information about the first communication endpoint, and instructs the communication processing unit 420 to transmit the read request. Then, the communication processing unit 420 assembles a frame according to the instruction in a way as illustrated in FIG. 9, and transmits the frame.

After instructing the communication processing unit 420 to transmit the read request, the DB request processing unit 430 waits for the reception of a reply from the first communication endpoint (hereafter a reply to a read request is referred to as a "read reply"). As illustrated in step S303, if the DB request processing unit 430 receives a read reply within a predetermined time period (hereafter referred to as "TO_db"), the process proceeds to step S304. On the other hand, if the DB request processing unit 430 fails to receive a read reply after the passage of the predetermined time period TO_db, the process proceeds to step S305.

In step S304, the DB request processing unit 430 returns the content of the received read reply to the application 440. Then, the reading operation in FIG. 11 normally terminates. The details of step S304 are described below.

If the entry corresponding to the key specified by the application 440 exists in the KVS, the received read reply includes the value associated with this key by this entry. Therefore, the DB request processing unit 430 returns this value to the application 440 in step S304.

On the other hand, if the entry corresponding to the key specified by the application 440 does not exist in the KVS, the received read reply indicates that there is no value corresponding to the specified key. Therefore, in step S304, the DB request processing unit 430 notifies the application 440 that no value has been detected.

On the other hand, in step S305, the DB request processing unit 430 transmits a read request to the second communication endpoint through the communication processing unit 420 and the network interface 410. Since step S305 is the same as step S302 except the destination of the read request, the detailed explanation is omitted here.

Then, after instructing the communication processing unit 420 to transmit the read request, the DB request processing unit 430 waits for the reception of a read reply from the second communication endpoint. As illustrated in step S306, if the DB request processing unit 430 receives the read reply within the predetermined time period TO_db, the process proceeds to step S307. On the other hand, if the DB request processing unit 430 fails to receive a read reply after the passage of the predetermined time period TO_db, the process proceeds to step S308.

Then, in step S307, the DB request processing unit 430 returns the content of the received read reply to the application 440. Then, the reading operation in FIG. 11 normally terminates. Since step S307 is the same as step S304, the detailed explanation is omitted here.

On the other hand, in step S308, the DB request processing unit 430 transmits a read request to the third communication endpoint through the communication processing unit 420 and the network interface 410. Since step S308 is also the same as step S302 except the destination of the read request, the detailed explanation is omitted here.

After instructing the communication processing unit 420 to transmit the read request, the DB request processing unit 430 waits for the reception of a read reply from the third communication endpoint. Then, as illustrated in step S309, if the DB request processing unit 430 receives a read reply within the predetermined time period TO_db, the process proceeds to step S310. On the other hand, if the DB request processing unit 430 fails to receive a read reply after the passage of the predetermined time period TO_db, the process proceeds to step S311.

In step S310, the DB request processing unit 430 returns the content of the received read reply to the application 440. Then, the reading operation in FIG. 11 normally terminates. Since step S310 is the same as step S304, the detailed explanation is omitted here.

On the other hand, in step S311, the DB request processing unit 430 notifies the application 440 of an error. Then, the reading operation in FIG. 11 abnormally terminates.

The description about FIG. 11 above mainly relates to the DB request processing unit 430, which operates in the application layer. Next, supplementary explanation on the behaviors in the network layer and the link layer is given below using an example of transmitting a read request and receiving a read reply in steps S302 and S303. The following supplementary explanation is also similarly applicable to steps S305 and S306, as well as applicable to steps S308 and S309.

In some cases, triggered by an instruction issued from the DB request processing unit 430 to the communication processing unit 420 in step S302, the communication processing unit 420 may first perform the process for establishing a TCP connection. That is, if a TCP connection has not yet been established between the first communication endpoint and the client 400, the communication processing unit 420 attempts to establish a TCP connection. Specifically, the communication processing unit 420 transmits a SYN (synchronize) segment, waits for the reception of a SYN/ACK segment, and transmits an ACK segment after the reception of the SYN/ACK segment. Thus, the communication processing unit 420 establishes a TCP connection between the first communication endpoint and the client 400.

Once the TCP connection has been established, the communication processing unit 420 transmits the read request, which the DB request processing unit 430 instructs the communication processing unit 420 to transmit, on the established TCP connection. In some cases, an ARP request may be broadcast in the process in FIG. 9 that is invoked in the context of transmitting the SYN segment. It is obvious that the process in FIG. 9 may be invoked not only in the context of transmitting a SYN segment, but also in the context of transmitting an ACK segment and in the context of transmitting a read request.

On the other hand, if a TCP connection has already been established between the first communication endpoint and the client 400, the communication processing unit 420 simply transmits the read request, which the DB request processing unit 430 instructs the communication processing unit 420 to transmit, on the established TCP connection. The process in FIG. 9 is of course invoked in the context of thus transmitting the read request.

The transmission of the read request is not always succeeds on the first try. This fact does not depend on whether the process for establishing a TCP connection is performed or not when the DB request processing unit 430 issues an instruction in step S302. For example, there may be various cases as follows.

A read request transmitted on the first try may successfully reach a node responsible for the first communication endpoint. As a result, the DB request processing unit 430 may receive a read reply within the predetermined time period TO_db.

Otherwise, the first transmission of a read request may fail. However, since the communication processing unit 420 performs retransmission control according to the TCP, the read request may successfully reach a node responsible for the first communication endpoint within a predetermined number of retries (for example, three retries). As a result, the DB request processing unit 430 may receive a read reply within the predetermined time period TO_db.

Otherwise, there may be a case where no ACK segment to a read request (specifically, a data segment of the read request) is received by the client 400 even if the retransmission of the read request is repeated up to the predetermined number of retries. The ACK segment to the read request may be a piggy back ACK segment, that is, the ACK flag in the TCP header in a read reply may be set to "1".

There may be some reasons why the ACK segment to the read request is not received by the client 400 after the retransmission of the read request is repeated up to the predetermined number of retries.

For example, there may be a case where the client 400 does not recognize the change of a node responsible for the first communication endpoint even after the change of the node actually occurs. In this case, the MAC address of the network interface 320 of the node 300 that is no longer responsible for the first communication endpoint may be associated with the IP address of the first communication endpoint by the ARP table 421. That is, a frame may be transmitted based on an obsolete ARP entry which does not reflect the current state.

As another example, there may be a case where a failure incidentally occurs in the node that is responsible for the first communication endpoint, and where the takeover of the first communication endpoint accompanying the occurrence of the failure has not yet been completed. Also in this case, the MAC address of the network interface 320 of the node 300 which is currently faulty may be used in transmission of a frame.

As described above, there may be a case where the ACK segment to the read request is not received by the client 400 for any reason even if the retransmission of the read request is repeated up to the predetermined number of retries. The implementation of error handling for such a case may vary from embodiment to embodiment.

For example, the communication processing unit 420 may be implemented by a standard library of a TCP/IP protocol stack as described above, and may specifically include a TCP module, an IP module, an ARP module, etc. If the ACK segment to the read request is not received by the client 400 even if the retransmission of the read request is repeated up to the predetermined number of retries, the TCP module in the transport layer may operate as follows.

That is, the TCP module recognizes that the TCP connection has been disconnected due to the occurrence of abnormality, and closes the TCP connection. In addition, the TCP module may notify the ARP module of the abnormality directly or indirectly through the IP module. The notification of the abnormality includes the destination IP address used in the disconnected TCP connection.

Upon receipt of the notification of the abnormality, the ARP module deletes, from the ARP table 421, a particular entry that corresponds to the notified destination IP address. On the other hand, the TCP module attempts re-establishment of the TCP connection.

For example, assume that the re-establishment of a connection is attempted relating to the transmission of a read request to the first communication endpoint in step S302 in FIG. 11. In this case, the TCP module of the communication processing unit 420 transmits a SYN segment, waits for the reception of a SYN/ACK segment, and transmits an ACK segment after the reception of the SYN/ACK segment.

When the process in FIG. 9 is called in the context of transmitting the SYN segment, no entry is found as a result of the search in step S102 in FIG. 9 because the particular entry of the ARP table 421 has already been forcibly deleted as described above. As a result, an ARP request is broadcast in step S105, and a new entry is added to the ARP table 421 in step S107.

In some cases, the problem is solved by forcibly clearing an ARP entry and creating another ARP entry as described above. Therefore, the TCP module of the communication processing unit 420 may transmit a read request again on the re-established TCP connection.

For example, in a case where the client 400 has failed to recognize the change of the node responsible for the first communication endpoint, according to the above-mentioned process of re-establishing the connection, a new connection is established with a node physically different from the node with which the TCP connection has been established so far. Then, the read request transmitted on the newly established connection successfully reaches the node currently in charge of the first communication endpoint, and therefore the read reply is returned to the client 400.

For example, the time long enough for the communication processing unit 420 to perform the above-mentioned retransmission control and re-establishment of the connection may be determined in advance as the predetermined time period TO_db, which is referred to in step S303. In this case, the DB request processing unit 430, which operates in the application layer, simply judges in step S303 that the read reply is received within the predetermined time period TO_db, without recognizing the retransmission, the deletion of the particular ARP entry, or the creation of another ARP entry.

On the other hand, depending on some embodiments, the implementation may be adopted so that the DB request processing unit 430 in the application layer is responsible for the deletion of an ARP entry and the creation of another ARP entry. That is, the TCP module of the communication processing unit 420 may be implemented so as to report the abnormality to the application layer instead of reporting the abnormality to the ARP module as described above. In other words, the TCP module may notify the application layer that no ACK segment is received even after repeating the retransmission of the data segment for the predetermined number of times.

Then, the DB request processing unit 430 invokes a "close" instruction to a socket for the TCP connection about which the abnormality is reported. The "close" instruction may be, for example, a system call or an API (application programming interface) function.

In addition, the DB request processing unit 430 specifies the destination IP address which has been used in the TCP connection about which the abnormality is reported, and instructs the ARP module to forcibly delete the entry from the ARP table 421. For example, the DB request processing unit 430 may call the "arp" command and may thereby instruct the ARP module to forcibly delete the entry.

The operation of the DB request processing unit 430 after the instruction to forcibly delete the entry may be one of the following two operations.

The first example is an example in which the DB request processing unit 430 performs retransmission control. That is, if the DB request processing unit 430 receives the above-mentioned notification of the abnormality while waiting for the reception of a read reply in step S303, and accordingly instructs the ARP module to forcibly delete an entry, the DB request processing unit 430 may perform another process that is similar to the process in step S302. Then, the communication processing unit 420 receives an instruction from the DB request processing unit 430 to transmit a read request to the first communication endpoint, and attempts the establishment of a TCP connection starting with the transmission of a new SYN segment.

Additionally, in the context of transmitting the SYN segment, the process in FIG. 9 is called, and an ARP request is broadcast. If the establishment of a TCP connection succeeds, the communication processing unit 420 transmits the data segment of the read request, which the DB request processing unit 430 instructs the communication processing unit 420 to transmit, on the established TCP connection.

In this case, it is preferable that the time sufficiently long for the DB request processing unit 430 to perform the above-mentioned retransmission control is determined in advance as the predetermined time period TO_db, which is referred to in step S303. Thus, the DB request processing unit 430 may be enabled to receive a read reply within the predetermined time period TO_db from the first execution of step S302.

Meanwhile, the second example is an example in which the DB request processing unit 430 does not perform the retransmission control. That is, if the DB request processing unit 430 receives the above-mentioned notification of the abnormality while waiting for the reception of a read reply in step S303, and accordingly instructs the ARP module to forcibly delete an entry, the DB request processing unit 430 may perform the process in step S305 without waiting until the predetermined time period TO_db passes.

In this case, for example, when another new DB access request, in which a key belonging to the same key region as the key specified in the currently concerned DB access request is specified, occurs in the application 440 after the currently concerned DB access request, an ARP request may be broadcast upon the new DB access request. Then, as a result, a new entry may be added to the ARP table 421 in step S107 in FIG. 9.

Various implementation examples are described above, in each of which the following processes (8-1) through (8-3) are performed when the TCP connection is abnormally disconnected due to a failure etc.

(8-1) A certain entry in the ARP table 421 is forcibly deleted.

(8-2) After the forcible deletion of the entry, a TCP connection is established again (although there is a difference of whether the TCP connection is established again immediately after the forcible deletion or whether the TCP connection is established again when another new DB access request occurs).

(8-3) Before transmitting a SYN segment for re-establishment of a TCP connection, an ARP request is broadcast, and a new entry about the same IP address as that in the forcibly deleted entry is added to the ARP table 421.

Therefore, the dynamic update of the dynamic association information 112 in FIG. 1 is realized regardless of whether each of the forcible deletion of an entry of the ARP table 421, the retransmission control, and the re-establishment of a TCP connection is controlled by the DB request processing unit 430 or by the communication processing unit 420.

FIG. 12 is a flowchart of a writing operation performed by the client. The writing operation in FIG. 12 is started when the application 440 instructs the DB request processing unit 430 to transmit a write request. A pair of a key and a value is specified in the write request.

In step S401, the DB request processing unit 430 identifies three communication endpoints using the key specified by the application 440, and also using the correspondence table 431. Since step S401 is similar to step S301 in FIG. 11, the detailed explanation is omitted here.

In the next step S402, the DB request processing unit 430 transmits a write request to the first communication endpoint, which is identified in step S401, through the communication processing unit 420 and the network interface 410. That is, the DB request processing unit 430 specifies the content of the write request and the communication endpoint information of the first communication endpoint, and instructs the communication processing unit 420 to transmit the write request. Step S402 is similar to step S302 in FIG. 11 except the content of the transmitted DB access request. Therefore, the detailed explanation is omitted here.

In the next step S403, the DB request processing unit 430 transmits a write request to the second communication endpoint, which is identified in step S401, through the communication processing unit 420 and the network interface 410. Step S403 is similar to step S402 except the destination of the write request. Therefore, the detailed explanation is omitted here.

Furthermore, in the next step S404, the DB request processing unit 430 transmits a write request to the third communication endpoint, which is identified in step S401, through the communication processing unit 420 and the network interface 410. Step S404 is also similar to step S402 except the destination of the write request. Therefore, the detailed explanation is omitted here.

After the transmission in steps S402 through S404, the DB request processing unit 430 waits for the reception of replies from the three communication endpoints (hereafter, the reply to a write request is referred to as a "write reply"). As illustrated in step S405, if the DB request processing unit 430 receives the write reply from every one of the three communication endpoints within the predetermined time period TO_db, the process proceeds to step S406. On the other hand, in a case where the number of communication endpoints from which a write reply is received is zero, one, or two even after the passage of the predetermined time period TO_db, the process proceeds to step S407.

In step S406, the DB request processing unit 430 notifies the application 440 of the normal termination of the writing operation. Then, the writing operation in FIG. 12 normally terminates.

On the other hand, in step S407, the DB request processing unit 430 notifies the application 440 of an error. Then, the writing operation in FIG. 12 abnormally terminates. Upon notification of the error, the application 440 may execute some kind of control for rollback in order to remove the inconsistency of data among the three nodes, which are expected to hold the same copies, and the application 440 may also issue a specific DB access request for rollback to the DB request processing unit 430.

In each of the steps S402 through S404, as in step S302 in FIG. 11, the process in FIG. 9 is called. Furthermore, situations and operations similar to those explained in the supplementary explanation about FIG. 11 are also applicable to steps S402 through S405 in FIG. 12.

In some cases, the process for establishment of a TCP connection is performed prior to the transmission of a data segment of a write request.

In addition, depending on the implementation, the retransmission control is performed by the communication processing unit 420 during the predetermined time period TO_db, in which the DB request processing unit 430 waits for the reception of a write reply. Then, an entry in the ARP table 421 is forcibly deleted in a case where no ACK segment to a write request is received by the client 400 even when the retransmission of the write request is repeated up to the predetermined number of retries. As described above in the supplementary explanation relating to FIG. 11, the forcible deletion of the entry may be performed under the control of the communication processing unit 420, or may be performed under the control of the DB request processing unit 430.

Then, an attempt to establish a TCP connection may be made again, and a write request may be retransmitted on the newly established TCP connection. Then, an ARP request is broadcast in the context of, for example, transmitting a SYN segment for re-establishment of a TCP connection, and a new entry is created on the ARP table 421 as a result of the broadcasting.

The operation of the client 400 is described above with reference to FIGS. 11 and 12. Next, the operation of the node 300 is described below with reference to FIGS. 13 through 16.

Figure 13:
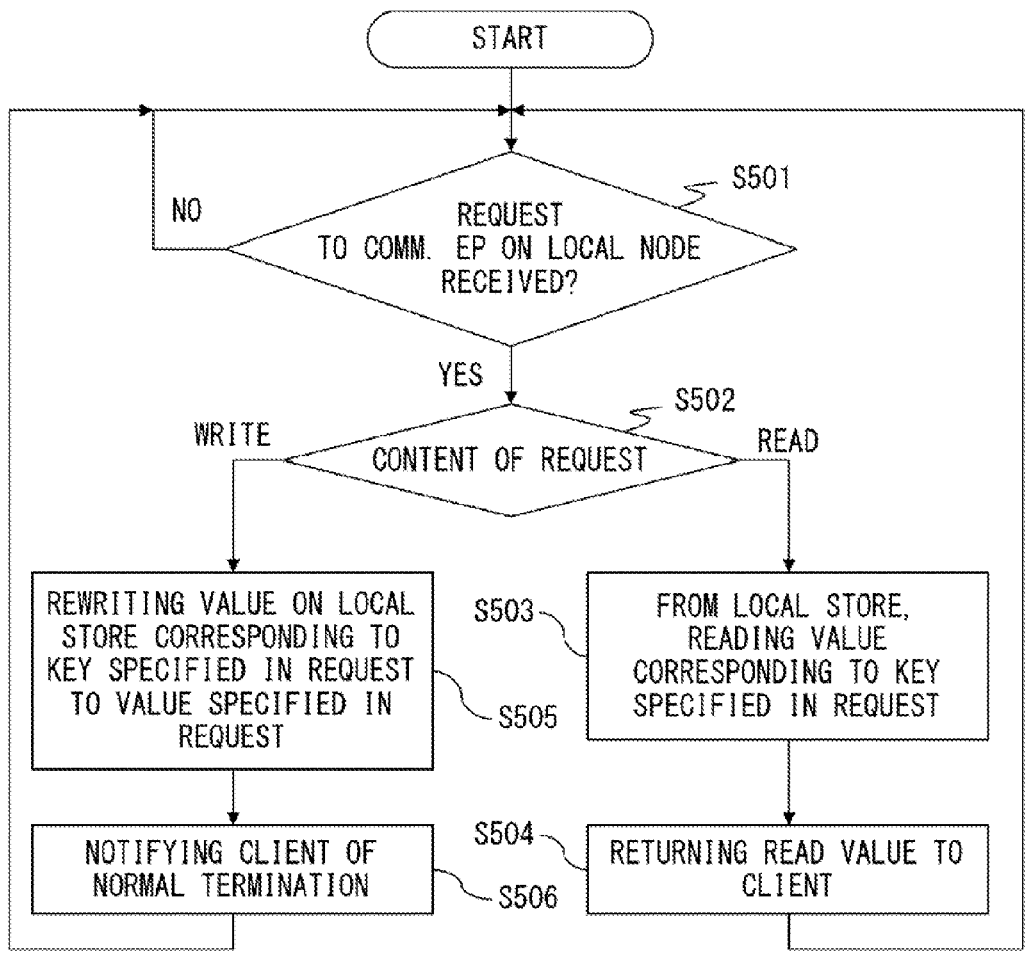
FIG. 13 is a flowchart of a process in which a node replies to a database access request from a client.

FIG. 13 is a flowchart of a process in which a node replies to a DB access request from a client. The execution of the process in FIG. 13 is continued while the node 300 is in operation. In the description below, for convenience of explanation, the node 300 itself for the node 300 in FIG. 5 may be referred to as a "local node", and other nodes than the node 300 may be referred to as "remote nodes".

The node 300 waits in step S501 until the node 300 receives a DB access request to a communication endpoint on the local node (that is, a communication endpoint corresponding to a key region that the node 300 itself is responsible for). When the DB access request to the communication endpoint on the local node is received, the process proceeds to step S502. The details of step S501 are specifically described as follows.

The communication endpoint corresponding to the key region that the node 300 itself is responsible for is identified by a pair of an IP address and a port number wherein the IP address is associated with the MAC address of the network interface 320 by the interface configuration file 332. Meanwhile, a frame received by the network interface 320 is sorted and forwarded by the communication processing unit 330 depending on the destination IP address, the destination port number, and the subtype in the DB header.

For example, as illustrated in FIG. 5, assume that the node 300 includes the three key region management units 350*a* through 350*c*. In this case, the communication processing unit 330 waits in step S501 until the communication processing unit 330 receives a read request or a write request in which the communication endpoint information corresponding to one of the key region management units 350*a* through 350*c* is specified in the destination IP address and the destination port number.

When the communication processing unit 330 receives the read request or the write request in which the communication endpoint information corresponding to one of the key region management units 350*a* through 350*c* is specified, the communication processing unit 330 outputs the received read request or write request. That is, the read request or the write request is outputted to the read/write processing unit 351 in one of the key region management units 350*a* through 350*c* depending on the destination IP address.

Then, in step S502, the read/write processing unit 351 judges whether the DB access request outputted from the communication processing unit 330 is a read request or a write request. When the read request is outputted from the communication processing unit 330, the process proceeds to step S503. On the other hand, if the write request is outputted from the communication processing unit 330, the process proceeds to step S505.

In step S503, the read/write processing unit 351 reads, from the local store 310, the value corresponding to the key specified in the read request.

For example, assume that the key "def" is specified in the read request, and that the key "def" belongs to the key region corresponding to the key region management unit 350*a* in FIG. 5. In the example in FIG. 8, the value corresponding to the key "def" is "DEF". In this case, in step S503, the read/write processing unit 351 in the key region management unit 350*a* reads the value "DEF" from the local store 310.

Then, in the next step S504, the read/write processing unit 351 returns the value read from the local store 310 as a reply to the client 400. That is, the read/write processing unit 351 generates a DB access reply in which the read value is included in the DB payload, and returns the generated DB access reply to the client 400 through the communication processing unit 330 and the network interface 320. Then, the process returns to step S501.

In step S505, the read/write processing unit 351 rewrites the value that is stored on the local store 310 in correspondence with the key specified in the write request, into the value specified by the write request.

For example, assume that the key "def" and the value "XYZ" are specified in the write request, and that the key "def" belongs to the key region corresponding to the key region management unit 350*a* in FIG. 5. In this case, in step S505, the read/write processing unit 351 in the key region management unit 350*a* overwrites the value "DEF", which is stored in the local store 310 in association with the key "def" as illustrated in FIG. 8, with the value "XYZ".

Then, in the next step S506, the read/write processing unit 351 notifies the client 400 of the normal termination of the write request. That is, the read/write processing unit 351 generates a DB access reply including the data indicating the normal termination of the write request in the DB payload or in the DB header, and returns the generated DB access reply to the client 400. Afterwards, the process returns to step S501.

In the present embodiment, as described above, a TCP connection is established between the client 400 and the node 300 before the node 300 receives the DB access request. Then, the DB access request is received on the established TCP connection in step S501, and the transmission of the DB access reply in step S504 or S506 is performed also on the established TCP connection.

In addition, the transmission of the DB access reply in step S504 or S506 is performed through the communication processing unit 330 as described above. Therefore, when the read/write processing unit 351 instructs the communication processing unit 330 to transmit a DB access reply in step S504 or S506, the communication processing unit 330 calls the process in FIG. 9.

Figure 14:
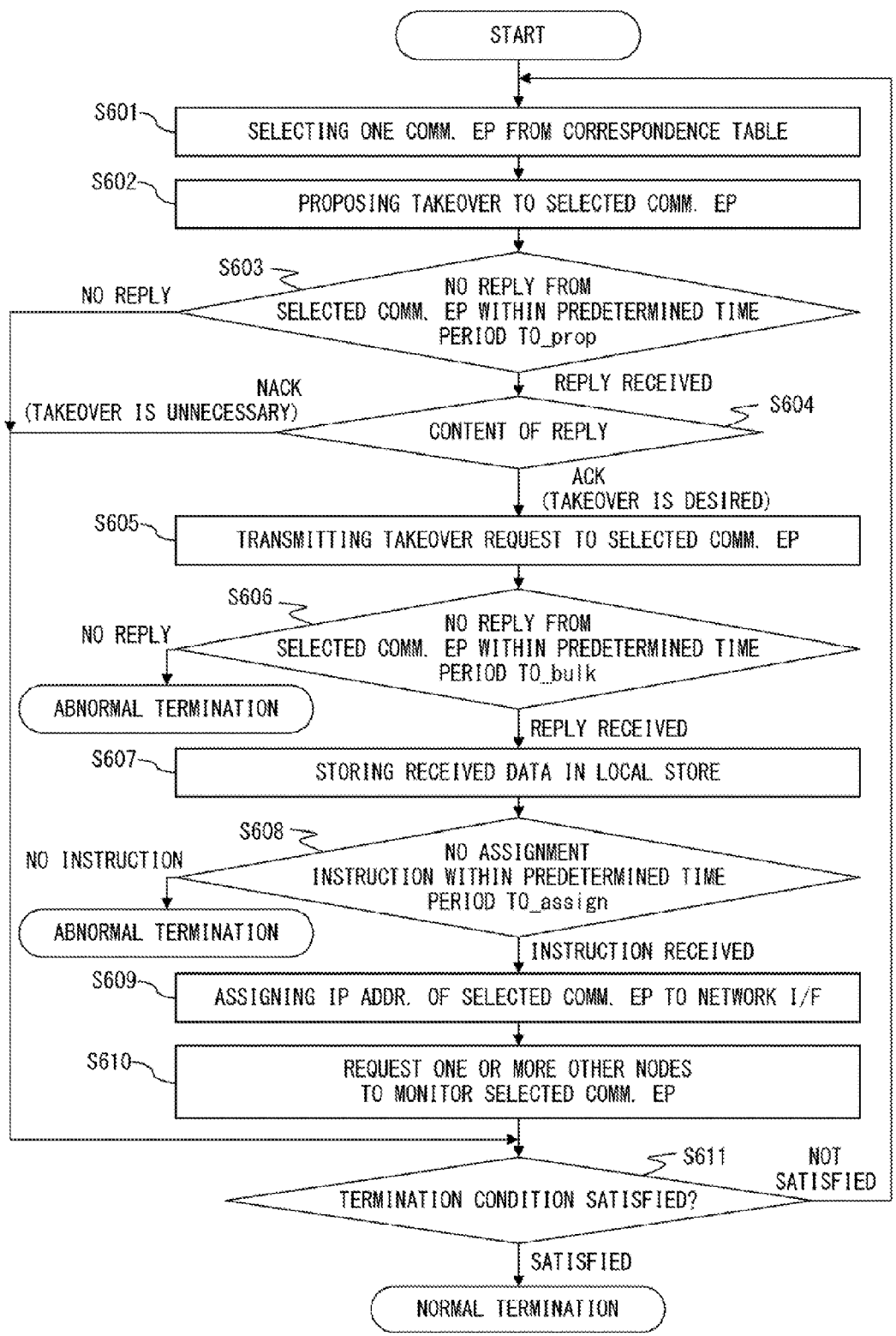
FIG. 14 is a flowchart of a process in which a node takes over a key region from another node and which is executed when the node itself is newly added or when the load on the node itself is light.

FIG. 14 is a flowchart of a process in which the node 300 takes over a key region from another node and which is executed when the node 300 itself is newly added or when the load on the node 300 itself is light. That is, when the node 300 is newly added, the node 300 may start the process in FIG. 14. The existing node 300 may monitor the load of the node 300 itself, and may start the process in FIG. 14 when its load is equal to or lower than a predetermined criterion.

The load may be measured by one of the indices (9-1) through (9-3), for example.

(9-1) The usage percentage or the use amount of the local store 310.

(9-2) The usage percentage of the CPU 501 of the node 300.

(9-3) A Score calculated from the combination of the indices (9-1) and (9-2).

In step S601, the node 300 selects one of the communication endpoints from the correspondence table 340. Specifically, the node 300 selects one of the communication endpoints identified by an IP address not assigned to the network interface 320 from the correspondence table 340. To be more preferable, the node 300 selects one of the communication endpoints from among the communication endpoints corresponding to other key regions than the key region(s) each corresponding to one of the IP address (es) that is/are assigned to the network interface 320. The selection in step S601 may be random selection, or may be selection based on the hash value of the information that is unique to the node 300. For example, the information may be the host name or the FQDN (fully qualified domain name) of the node 300.

For example, assume that the network interface 320 is assigned three IP addresses, that is, "192.168.254.15", "192.168.254.17", and "192.168.254.36". In this case, the node 300 may select at random one communication endpoint from among the communication endpoints corresponding to other key regions than the key regions $K_{15}$, $K_1$, and $K_4$, which respectively correspond to the three IP addresses above. In the following description, for convenience of explanation, the communication endpoint selected in step S601 is called a "selected communication endpoint".

Then, in the next step S602, the node 300 proposes a takeover to the selected communication endpoint.

For example, assume that the correspondence table 340 is specifically the correspondence table 601 in FIG. 8, and that the node 300 has selected, in step S601, the communication endpoint identified by the communication endpoint information "192.168.254.36:7000". According to FIG. 8, the node currently assigned the IP address "192.168.254.36" is the node that is responsible for the key region $K_4$, which is identified by the index "4", as the "third communication endpoint".

In this case, the node 300, which performs the process in FIG. 14, generates in step S602 a control message (hereafter referred to as a "takeover proposition" for convenience of explanation) in which "192.168.254.36" is specified as the destination IP address and "7000" is specified as the destination port number.

As the source IP address of the takeover proposition, a fixed IP address, which is described above relating to the requested node list 605 in FIG. 8, is used. For example, assuming that the IP address "192.168.254.130" is fixedly assigned to the node 300, which is performing the process in FIG. 14, the source IP address of the takeover proposition is "192.168.254.130".

Hereafter, for convenience of explanation, the node currently assigned the selected communication endpoint is referred to as a "current responsible node". For example, assuming that the selected communication endpoint is identified by the communication endpoint information "192.168.254.36:7000" as described above, the "current responsible node" is a node that is responsible for the key region $K_4$, which is identified by the index "4", as the "third communication endpoint".

The takeover proposition generated in step S602 is a message designed to be used when the node identified by the source IP address proposes, to the current responsible node, taking over from the current responsible node the communication endpoint identified by the destination IP address and the destination port number. The node 300 transmits the generated takeover proposition through the communication processing unit 330 and the network interface 320 in step S602.

Then, the node 300 waits for the reception of a reply to the takeover proposition from the selected communication endpoint in step S603. If the reply is received from the selected communication endpoint (that is, from the current responsible node) within a predetermined time period (hereafter referred to as "TO_prop"), the process proceeds to step S604. On the other hand, if the reply from the selected communication endpoint is not received within the predetermined time period TO_prop, the process proceeds to step S611.

Then, in step S604, the node 300 judges whether the content of the reply indicates an ACK or a NACK (negative acknowledgement). The ACK reply indicates that the current responsible node accepts the proposition (that is, the current responsible node desires the takeover). On the other hand, the NACK reply indicates that the current responsible node does not accept the proposition (that is, the takeover is not necessary).

For example, any node which has received the takeover proposition may return the ACK reply when the load of the node itself exceeds a predetermined criterion, and may return the NACK reply when the load of the node itself is equal to or falls below the predetermined criterion. The load may be measured by any of the indices (9-1) through (9-3) above, for example.

When the ACK reply is received, the node 300 generates a new key region management unit corresponding to the selected communication endpoint (that is, the communication endpoint to be taken over by the node 300 from the current responsible node). Then, the process proceeds to step S605. In the description below, for convenience of explanation, it is assumed that the key region management unit 350c is newly generated herein.

On the other hand, when the NACK reply is received, the process proceeds to step S611.

Then, in step S605, the acquisition control unit 352 in the key region management unit 350c, which is generated upon receipt of the ACK reply, transmits a takeover request to the selected communication endpoint. The takeover request is specifically transmitted through the communication processing unit 330 and the network interface 320. The destination IP address, the destination port number, and the source IP address of the takeover request are the same as those of the takeover proposition.

Then, in step S606, the acquisition control unit 352 waits for the reception of a takeover reply to the transmitted takeover request from the selected communication endpoint. If the takeover reply is not received from the selected communication endpoint (that is, from the current responsible node) within a predetermined time period (hereafter referred to as "TO_bulk"), then the process in FIG. 14 abnormally terminates. On the other hand, if the takeover reply is received from the selected communication endpoint within the predetermined time period TO_bulk, the process proceeds to step S607.

For example, when assuming that the selected communication endpoint is identified by the communication endpoint information "192.168.254.36:7000" as described above, the takeover reply includes all entries whose keys belong to the key region $K_4$, which is identified by the index "4". Therefore, when a large number of keys belong to the key region to be taken over, it is desirable that the time period TO_bulk is set to be long enough. For example, when the current responsible node which has received the takeover proposition returns the ACK reply, the current responsible node may specify the value of the time period TO_bulk in the ACK reply depending on the number of keys belonging to the key region to be taken over.

The takeover reply is received by the network interface 320, and then outputted, through the communication processing unit 330, to the acquisition control unit 352 in the key region management unit 350c that is the sender of the takeover request. In the takeover reply, its source IP address is the IP address of the selected communication endpoint, and its destination IP address is the source IP address of the takeover request (that is, the fixed IP address).

The acquisition control unit 352 stores the received data (that is, all entries included in the takeover reply) in the local store 310 in step S607. For example, in the example above, the acquisition control unit 352 newly adds every entry whose key belongs to the key region $K_4$, which is identified by the index "4", to the local store 310.

Then, the acquisition control unit 352 waits for the reception of an assignment instruction in step S608. The "assignment instruction" is a control message for instructing the node 300, which is performing the process in FIG. 14, to assign the IP address of the selected communication endpoint to the network interface 320 of the node 300.

For example, for convenience of explanation, the following situations (10-1) through (10-3) are assumed.

(10-1) The selected communication endpoint is identified by the communication endpoint information "192.168.254.36:7000".

(10-2) The IP address fixedly assigned to the current responsible node is "192.168.254.133".

(10-3) The IP address fixedly assigned to the node 300 which is performing the process in FIG. 14 is "192.168.254.130".

In the case where the situations (10-1) through (10-3) hold true, the assignment instruction is a control message for allowing the current responsible node to instruct the node 300, which is performing the process in FIG. 14, to assign the IP address "192.168.254.36". In the assignment instruction, its source IP address is the fixed IP address "192.168.254.133", and its destination IP address is the fixed IP address "192.168.254.130".

If no assignment instruction is received within a predetermined time period (hereafter referred to as "TO_assign"), the process in FIG. 14 abnormally terminates. On the other hand, if the assignment instruction is received within the predetermined time period TO_assign, the process proceeds to step S609.

Then, in step S609, the acquisition control unit 352 instructs the association unit 354 to assign the IP address of the selected communication endpoint to the network interface 320. Then, the association unit 354 performs the process for assigning the IP address of the selected communication endpoint to the network interface 320.

For example, the association unit 354 may directly rewrite the interface configuration file 332 in the communication processing unit 330 to associate the IP address of the selected communication endpoint with the network interface 320. Otherwise, the association unit 354 may invoke the function of the communication processing unit 330 by issuing an appropriate command such as the "ifconfig" command so as to cause the communication processing unit 330 to rewrite the interface configuration file 332.

For example, in the case where the above situations (10-1) through (10-3) hold true, the IP address "192.168.254.36" is anyway assigned to the network interface 320 of the node 300, which is performing the process in FIG. 14, as a result of step S609.

Then, in step S610, the monitoring request unit 355 selects one or more other nodes and registers them in the requested node list 356. Then, the monitoring request unit 355 requests each node registered in the requested node list 356 to monitor the selected communication endpoint.

For example, assume that the distributed DB system includes eight nodes and the eight IP addresses "192.168.254.128" through "192.168.254.135" are fixedly assigned to the eight nodes. In addition, assume that, as described above with respect to the situation (10-2), the IP address "192.168.254.130" is fixedly assigned to the node 300 which is performing the process in FIG. 14. Further, assume that the IP address "192.168.254.36" is assigned in step S609 as described above.

In this case, the monitoring request unit 355 recognizes in advance the eight fixed IP addresses by performing, for example, the process of reading a configuration file not illustrated in the attached drawings, and also recognizes the fixed IP address of the node 300 itself.

As another example, for each individual IP address not assigned to the network interface 320 of the node 300 among the IP addresses appearing on the correspondence table 340, the monitoring request unit 355 may transmit an inquiry whose destination IP address is the individual IP address concerned. When each node which has received the inquiry returns a reply including the fixed IP address of the node itself, the monitoring request unit 355 is enabled to recognize a set of fixed IP addresses used for the nodes in the distributed DB system.

Anyway, the monitoring request unit 355 recognizes the eight fixed IP addresses in advance. Therefore, in step S610, the monitoring request unit 355 selects one or more arbitrary IP addresses from among the seven fixed IP addresses other than "192.168.254.130", and registers each selected IP address in the requested node list 356. For example, the monitoring request unit 355 may select "192.168.254.128" and "192.168.254.133", and may register them in the requested node list 356.

When the above two IP addresses are selected, the monitoring request unit 355 generates pieces of data for the following monitoring requests (11-1) and (11-2), and transmits the generated data of each monitoring request through the communication processing unit 330 and the network interface 320.

(11-1) A monitoring request in which the source IP address is "192.168.254.130", the destination IP address is "192.168.254.128", and the pair of the IP address and the port number for indicating the communication endpoint as a monitoring target is "192.168.254.36:7000".

(11-2) A monitoring request in which the source IP address is "192.168.254.130", the destination IP address is "192.168.254.133", and the pair of the IP address and the port number for indicating the communication endpoint as a monitoring target is "192.168.254.36:7000".

It is obvious that the IP address (such as "192.168.254.36") dynamically assigned depending on the key region may be used as the source IP address of the monitoring request in some embodiments. In addition, the port number of the communication endpoint to be monitored may be specified as the source port number of the monitoring request. That is, in the packet of the monitoring request, the monitoring target may be specified by its source IP address and its source port number.

In another node which has received the monitoring request, the communication processing unit 330 outputs the monitoring request to the monitoring unit 360. Then, the monitoring unit 360 adds the communication endpoint information about the monitoring target specified in the monitoring request to the target node list 361.

When the transmission of the monitoring request to each of the one or more other nodes is completed in step S610, the node 300 judges, in the next step S611, whether or not a particular condition (hereafter referred to as a "termination condition") for terminating the process in FIG. 14 is satisfied.

The termination condition may be, for example, one of the following conditions (12-1) through (12-3), or may be another condition.

(12-1) The load of the node 300 exceeds the criterion referenced by the node 300 to judge whether or not the process in FIG. 14 is to be started.

(12-2) The node 300 has already performed the selection in step S601 for a predetermined number of times (for example, three times) after the start of the process in FIG. 14.

(12-3) At least one of the conditions (12-1) and (12-2) holds true.

If the termination condition is satisfied, the node 300 terminates the process in FIG. 14. On the other hand, if the termination condition is not satisfied, the process returns to step S601.

In the present embodiment, the takeover proposition, the ACK reply or the NACK reply to the takeover proposition, the takeover request, and the takeover reply are transmitted and received on an established TCP connection. That is, in some cases, to transmit the takeover proposition in step S602, the node 300 first performs a series of processes to establish the TCP connection (that is, the transmission of a SYN segment, the reception of a SYN/ACK segment, and the transmission of an ACK segment).

Although omitted in FIG. 14, a series of processes to close the TCP connection used in the transmission and reception of the takeover reply etc. is performed before the current responsible node transmits the assignment instruction. This is because the node assigned the IP address used in this TCP connection changes.

Specifically, the current responsible node transmits a FIN/ACK segment after the transmission of the takeover reply. Upon receipt of the FIN/ACK segment, the node 300, which is performing the process in FIG. 14, transmits an ACK segment to the FIN/ACK segment. In addition, since the TCP connection is bidirectional, the node 300 further transmits a FIN/ACK segment. Upon receipt of the FIN/ACK segment, the current responsible node transmits an ACK segment to the FIN/ACK segment. The TCP connection is thus closed by the processes above.

In the present embodiment, the assignment instruction is also transmitted and received on a TCP connection. The IP addresses of the communication endpoints on both ends of the TCP connection used in the transmission and reception of the assignment instruction are the fixed IP addresses as exemplified in the situations (10-2) and (10-3). That is, the TCP connection used in the transmission and reception of the assignment instruction is different from the TCP connection used in the transmission and reception of the takeover reply etc.

Thus, if there is no TCP connection between the communication endpoints identified by the fixed IP addresses, the current responsible node transmits a SYN segment for establishing a TCP connection before transmitting the assignment instruction. Then, the communication processing unit 330 of the node 300, which is performing the process in FIG. 14, transmits a SYN/ACK segment, and the current responsible node further transmits an ACK segment. The assignment instruction is transmitted and received on the TCP connection newly established as described above (or already and incidentally established for any other use).

Furthermore, according to the present embodiment, a monitoring request is also transmitted on an established TCP connection. That is, in some cases, the communication processing unit 330 may first perform a series of processes to establish a TCP connection to transmit a monitoring request in step S610.

In any of steps S602, S605, and S610, the communication processing unit 330 calls the process in FIG. 9.

The timeout process in each of steps S603, S606, and S608 may include the processes such as forcible deletion of an entry from the ARP table 331, the retransmission control, the re-establishment of a TCP connection, etc. like the process in step S303 in FIG. 11. As with the above explanation about the client 400, specific implementation may vary from some viewpoints such as a viewpoint as to whether the retransmission control is performed by the monitoring unit 360 in the application layer or by the communication processing unit 330 in the transport layer.

Next described is the process performed by a node which has been requested to perform monitoring. FIG. 15 is a flowchart of a process in which the node monitors another node, and performs a takeover when the monitoring target becomes faulty.

For example, assume that the node $N_{11}$ in FIG. 3 performs the process in FIG. 14. Also assume that the node $N_{11}$ requests the nodes $N_{15}$ and $N_{17}$ in step S610 to monitor a certain communication endpoint that the node $N_{11}$ has dynamically assigned to the node $N_{11}$ in step S609. In this case, the nodes $N_{15}$ and $N_{17}$ each perform the process in FIG. 15. Then, if a failure occurs in the node $N_{11}$ afterwards, one of the nodes $N_{15}$ and $N_{17}$ whichever recognizes, according to the process in FIG. 15, the failure in the node $N_{11}$ earlier than the other recognizes it turns into a node to which the communication endpoint to be monitored is newly assigned.

For each communication endpoint registered in the target node list 361 (to be more specific, the target node list 604 in FIG. 8, for example) in the monitoring unit 360, the process in FIG. 15 is separately performed and continues while the node 300 is in operation. In the following description, for convenience of explanation, the communication endpoint as a target of the process in FIG. 15 is referred to as a "target communication endpoint".

In step S701, the monitoring unit 360 transmits a keep-alive message to a target communication endpoint. For example, when the target communication endpoint is the communication endpoint that is first listed in the target node list 604 in FIG. 8, the monitoring unit 360 generates a keep-alive message in which "192.168.254.9" is specified as the destination IP address, and "7000" is specified as the destination port number. The source IP address of the keep-alive message is an IP address fixedly assigned to the node 300 which is performing the process in FIG. 15. The monitoring unit 360 transmits the generated keep-alive message to the target communication endpoint through the communication processing unit 330 and the network interface 320.

Then, in step S702, the monitoring unit 360 waits for the reception of a reply to the keep-alive message from the target communication endpoint.

If the reply to the keep-alive message is received from the target communication endpoint within a predetermined time period (hereafter referred to as "TO_keepalive"), the monitoring unit 360 judges that the node assigned the target communication endpoint is normal. Then, the process proceeds to step S703.

On the other hand, if no reply to the keep-alive message is received from the target communication endpoint within the predetermined time period TO_keepalive, the monitoring unit 360 judges that there has occurred a failure in the node assigned the target communication endpoint. Then, the process proceeds to step S706 for failover.

In step S703, the monitoring unit 360 reads the content of the reply to the keep-alive message. According to the present embodiment, the reply to the keep-alive message includes the information (for example, a flag etc.) indicating whether monitoring is required or not. If the reply specifies that monitoring is not required, the process proceeds to step S704. On the other hand, if the reply specifies that monitoring is required, the process proceeds to step S705.

The reason why the reply to the keep-alive message includes the information indicating whether monitoring is required or not is described as follows.

In the present embodiment, if the communication endpoint that has been assigned to a first node is taken over by a second node for any reason, the second node selects one or more nodes arbitrarily regardless of which node (s) the first node has requested to monitor the first node. Then, the second node requests each selected node to monitor the communication endpoint newly assigned to the second node. Then, there is the possibility that the second node receives a keep-alive message from a third node which has monitored the first node at the request from the first node.

The reason is that the destination of the keep-alive message is determined by the IP address and the port number, which logically identify the communication endpoint. That is, there is the possibility that the second node receives the keep-alive message from the third node when the ARP table is updated in the third node.

On the other hand, unless the second node happens to select the third node and requests the third node to monitor the second node, the third node for the second node is not the node which the second node has requested to monitor the second node. That is, there is the possibility that the second node receives the keep-alive message from the node not registered in the requested node list 356.

Thus, according to the present embodiment, the reply to the keep-alive message includes the information indicating whether monitoring is required or not. As understood from the explanation below with reference to FIGS. 15 and 16, this information makes it feasible to maintain the consistency between the requested node list 356 held by the node at the destination of the keep-alive message and the node(s) each actually transmitting the keep-alive message.

Back to the explanation of the branch in step S703, when the reply to the keep-alive message specifies that monitoring is not required, the monitoring unit 360 excludes the target communication endpoint from its monitoring target(s) in step S704. That is, the monitoring unit 360 deletes the communication endpoint information identifying the target communication endpoint from the target node list 361. Then, the process in FIG. 15 terminates. As a result, the monitoring of the communication endpoint identified by the communication endpoint information deleted from the target node list 361 is no longer performed.

On the other hand, in step S705, the monitoring unit 360 waits until a predetermined time period (hereafter referred to as "I_keepalive") has passed from the transmission in step S701. The predetermined time period I_keepalive is a time period determined as a transmission interval of the keep-alive message. If the predetermined time period I_keepalive has passed since the transmission in step S701, the process returns to step S701. Therefore, even if a failure occurs in the node at the target communication endpoint, the failure is detectable within the maximum time period (I_keepalive+ TO_keepalive) from the occurrence of the failure.

The processes in steps S706 through S713 indicate the takeover process performed for failover when a failure at the communication endpoint that is the monitoring target is detected.

First, in step S706, the monitoring unit 360 newly generates one key region management unit. For example, the key region management units 350a through 350c in FIG. 5 may be realized by three different threads as described above, and the monitoring unit 360 may generate a new key region management unit by generating a new thread. The generated new key region management unit specifically corresponds to the target communication endpoint, and therefore corresponds to the key region statically associated with the target communication endpoint. In the following description, for convenience of explanation, it is assumed that the key region management unit 350c is generated in step S706.

Furthermore, in step S706, the acquisition control unit 352 in the newly generated key region management unit 350c searches the correspondence table 340 for other communication endpoints each responsible for the key region corresponding to the target communication endpoint.

For example, it is assumed that the correspondence table 340 is specifically the same as the correspondence table 601 in FIG. 8, and that the target communication endpoint is identified by the communication endpoint information "192.168.254.9:7000". In this case, the target communication endpoint is the "first communication endpoint" for the key region $K_9$ identified by the index 9.

Therefore, the acquisition control unit 352 in the newly generated key region management unit 350c searches for the "second communication endpoint" and the "third communication endpoint" for the key region $K_9$. As a result, the acquisition control unit 352 acquires the communication endpoint information "192.168.254.25:7000" corresponding to the "second communication endpoint" and the communication endpoint information "192.168.254.41:7000" corresponding to the "third communication endpoint".

In the next step S707, the acquisition control unit 352 judges whether or not there remains a communication endpoint not selected as the target of the process in and after step S708 in the communication endpoints found in the search in step S706. If there remains a communication endpoint not selected yet, the process proceeds to step S708.

On the other hand, the case in which the process in step S707 is performed even after all communication endpoints found in step S706 have been selected is an abnormal case such as the case in which all three nodes responsible for the same key region are faulty. Therefore, if there remains no unselected communication endpoint, the process in FIG. 15 abnormally terminates.

In step S708, the acquisition control unit 352 selects one unselected communication endpoint in the communication endpoints found in step S706. In the following description, for convenience of explanation, the communication endpoint selected in step S708 is referred to as a "selected communication endpoint".

Then, the acquisition control unit 352 requests the selected communication endpoint for all data of the key region corresponding to the selected communication endpoint. The key region corresponding to the selected communication endpoint is the same as the key region corresponding to the target communication endpoint.

For convenience of explanation, the following situations (13-1) and (13-2) are assumed, for example.

(13-1) As described above, the pieces of the communication endpoint information "192.168.254.25:7000" and "192.168.254.41:7000" are acquired in step S706.

(13-2) In step S708, the communication endpoint identified by the communication endpoint information "192.168.254.25:7000" is selected.

In the case where the situations (13-1) and (13-2) hold true, the acquisition control unit 352 in the newly generated key region management unit 350c requests the selected communication endpoint for the data of all entries whose keys belong to the key region $K_9$. The request thus transmitted in step S708 is a copy request described above. The copy request is transmitted through the communication processing unit 330 and the network interface 320 at an instruction of the acquisition control unit 352.

In the copy request used in the above example where the situations (13-1) and (13-2) hold true, the destination IP address is "192.168.254.25", and the destination port number is "7000". The source IP address of the copy request is an IP address fixedly assigned to the node 300, which is performing the process in FIG. 15, as with the takeover request in step S605 in FIG. 14.

After the transmission of the copy request, the acquisition control unit 352 waits for the reception of a copy reply in step S709.

If no normal copy reply is received from the selected communication endpoint within a predetermined time period (which may be, for example, the same as the predetermined time period TO_bulk referred to in step S606 in FIG. 14), the process returns to step S707. On the other hand, if the reply to the copy request is received by the acquisition control unit 352 within the predetermined time period TO_bulk, the process proceeds to step S710.

Although the explanation is omitted above, the acquisition control unit 352 may transmit a control message to the selected communication endpoint in order to inquire about the predetermined time period TO_bulk before transmitting the copy request in step S708. The node at the selected communication endpoint may reply to the acquisition control unit 352 with an appropriate time period depending on the number of entries whose keys belong to the key region corresponding to the selected communication endpoint. The acquisition control unit 352 may set the predetermined time period TO_bulk based on the reply to the control message, and may then transmit the copy request in step S708 as described above.

For more details, the copy reply is received by the network interface 320, and outputted to the acquisition control unit 352 in the key region management unit 350c as the source of the copy request through the communication processing unit 330. In the copy reply, its source IP address is the IP address of the selected communication endpoint, and its destination IP address is the source IP address of the copy request (that is, the fixed IP address used in the copy request).

Then, upon receipt of the copy reply, the acquisition control unit 352 stores the received data (that is, all entries included in the copy reply) into the local store 310 in step S710.

For example, the selected communication endpoint in the example of the above situation (13-2) is the "second communication endpoint" for the key region $K_9$. Therefore, the copy reply includes every entry whose key belongs to the key region $K_9$. Accordingly, the acquisition control unit 352 newly adds every entry whose key belongs to the key region $K_9$ to the local store 310 in step S710.

In addition, in the next step S711, the acquisition control unit 352 instructs the association unit 354 to assign the IP address of the target communication endpoint to the network interface 320. Then, the association unit 354 performs the process for assigning the IP address of the target communication endpoint to the network interface 320. For example, in a case where the target communication endpoint is identified by the communication endpoint information "192.168.254.9: 7000", the IP address "192.168.254.9" is associated with the network interface 320 of the node 300 itself.

As in step S609 in FIG. 14, the association unit 354 may directly rewrite the interface configuration file 332 in the communication processing unit 330 in step S711. Otherwise, the association unit 354 may invoke the function of the communication processing unit 330 by issuing a command so as to instruct the communication processing unit 330 to rewrite the interface configuration file 332.

Then, in the next step S712, the monitoring request unit 355 included in the same key region management unit 350c as the acquisition control unit 352, which has transmitted the copy request, selects one or more other nodes and registers them in the requested node list 356. Then, the monitoring request unit 355 requests each node registered in the requested node list 356 to monitor the target communication endpoint.

Step S712 is the same as step S610 in FIG. 14 except which communication endpoint is a target of the request for monitoring. Therefore, the explanation of the details of step S712 is omitted.

In the next step S713, the acquisition control unit 352 reports the completion of the failover to the monitoring unit 360. Then, the monitoring unit 360 excludes the target communication endpoint from the monitoring target(s) of the local node (that is, the monitoring target (s) of the node 300). That is, the monitoring unit 360 deletes the communication endpoint information that identifies the target communication endpoint from the target node list 361 because the physical node corresponding to the target communication endpoint is currently the node 300 itself, and is no longer a remote node.

After the deletion in step S713, the process in FIG. 15 also terminates. In some embodiments, the monitoring unit 360 may perform the process in step S713 concurrently with the acquisition control unit 352 performing the processes in steps S710 through S712. As another example, the process in step S713 may be performed before the processes in steps S710 through S712.

In the process illustrated in FIG. 15 and described above, the transmission of the keep-alive message in step S701, the transmission of the copy request in step S708, and the transmission of the monitoring request in step S712 each include the process in FIG. 9. Accordingly, depending on the state of the ARP table 331, an ARP request may be broadcast and the ARP table 331 may be updated in step S701, S708, or S712.

In some cases, the transmission in step S701, S708, or S712 may include the establishment of a TCP connection performed by the communication processing unit 330.

That is, the keep-alive message and the reply to the keep-alive message are transmitted and received on a TCP connection established in advance according to the present embodiment. Similarly, the copy request and the reply to the copy request are also transmitted and received on a TCP connection established in advance. The monitoring request is also transmitted and received on a TCP connection established in advance.

Therefore, if the TCP connection corresponding to a message to be transmitted has not been established yet, the communication processing unit 330 performs the process for establishing the TCP connection in response to the instruction that is regarding the transmission of the message and that is issued in step S701, S708, or S712. Specifically, the communication processing unit 330 establishes a TCP connection by transmitting a SYN segment, receiving a SYN/ACK segment, and transmitting an ACK segment.

When the communication processing unit 330 attempts to transmit the SYN segment, the communication processing unit 330 refers to the ARP table 331. As a result of such reference to the ARP table 331, the broadcasting of an ARP request as described above may be performed prior to the actual transmission of the SYN segment. As another example, depending on the timing when an ARP entry is deleted in the aging process, an ARP request may be broadcast when the communication processing unit 330 attempts to transmit a data segment on the established TCP connection.

In addition, the timeout processes in steps S702 and S709 may each include the processes such as the forcible deletion of an entry from the ARP table 331, the retransmission control, the re-establishment of the TCP connection, etc. as with the process in step S303 of FIG. 11 performed by the client 400. Thus, as explained above relating to the client 400, specific implementation may vary from some viewpoints such as a viewpoint as to whether the retransmission control is performed by the monitoring unit 360 in the application layer or by the communication processing unit 330 in the transport layer. Therefore, the details of the timeout process are described later with reference to FIG. 18.

Next, a process performed by the node that is monitored is described below with reference to the flowchart in FIG. 16. That is, the node which has transmitted the monitoring request in step S610 in FIG. 14 or step S712 in FIG. 15 then performs the process in FIG. 16. To be more specific, the monitoring request unit 355 in each key region management unit of the node 300 performs the process in FIG. 16.

In step S801, the monitoring request unit 355 judges whether or not the number of entries in the requested node list 356 is less than a predetermined number (hereafter referred to as "E_req").

It is preferable that the predetermined number E_req is two or more because there may be the case rarely (but at a frequency which is not negligible) in which both of the monitoring node and the monitored node happen to be faulty. In this state, if the predetermined number E_req is one, the failure in the monitored node is not detectable.

However, if the predetermined number E_req is larger than one, the probability of the situation that one monitored node and the predetermined number E_req of monitoring nodes are all faulty is almost zero. Therefore, the failure in the monitored node is surely detectable by at least one normal node among the predetermined number E_req of monitoring nodes. Therefore, it is preferable that the predetermined number E_req is larger than one.

If the number of entries in the requested node list 356 is the predetermined number E_req or more, the process proceeds to step S802. On the other hand, if the number of entries in the requested node list 356 is less than the predetermined number E_req, the process proceeds to step S808.

In step S802, the monitoring request unit 355 judges whether or not there is a requested node which has not transmitted a keep-alive message within a predetermined time period (hereafter referred to as "P_keepalive") in the past. In the explanation below, each node identified by each element of the requested node list 356 is referred to as a "requested node".

The length of the predetermined time period P_keepalive in step S802 is, for example, the sum of an appropriate margin and the transmission interval I_keepalive of the keep-alive message. For example, the predetermined time period P_keepalive may be approximately double the transmission interval I_keepalive.

If there is no requested node which has not transmitted the keep-alive message within the predetermined time period P_keepalive, the process proceeds to step S803. That is, if each requested node registered in the requested node list 356 has transmitted the keep-alive message at least once within the predetermined time period P_keepalive, this means that all requested nodes normally continue the monitoring. Therefore, the process proceeds to step S803.

On the other hand, if there is a requested node which has not transmitted the keep-alive message within the predetermined time period P_keepalive, the process proceeds to step S807. For example, if a certain requested node becomes faulty, the transmission of the keep-alive messages from the faulty requested node stops. Therefore, the process may proceed from step S802 to step S807, for example, when a failure occurs in any of the requested nodes.

In step S803, the monitoring request unit 355 waits for the reception of the keep-alive message from any node. When the monitoring request unit 355 receives the keep-alive message from any node through the network interface 320 and the communication processing unit 330, the process proceeds to step S804.

As described above relating to step S701 in FIG. 15, the source IP address of the keep-alive message is a fixed IP address for administrative purposes. The destination IP address of the keep-alive message is an IP address dynamically assigned depending on the correspondence between the key region and the node.

In step S804, the monitoring request unit 355 judges whether or not the source node (i.e., the sender node) of the received keep-alive message is found in the requested node list 356.

As described above with reference to FIG. 8, each element of the requested node list 356 is also a fixed IP address.

Therefore, if the source IP address of the received keep-alive message is included in the requested node list 356, the monitoring request unit 355 judges that the source node of the received keep-alive message is found in the requested node list 356. Then, the process proceeds to step S805.

On the other hand, if the source IP address of the received keep-alive message is not included in the requested node list 356, the monitoring request unit 355 judges that the source node of the received keep-alive message is not found in the requested node list 356. Then, the process proceeds to step S806.

In step S805, the monitoring request unit 355 returns a normal reply indicating that the node 300 (more specifically, the key region management unit including the monitoring request unit 355 concerned) is alive.

Specifically, the monitoring request unit 355 generates the reply whose details are listed in the following items (14-1) through (14-4).

(14-1) The source IP address of the reply is an IP address corresponding to the key region management unit including the monitoring request unit 355 concerned.

(14-2) The destination IP address of the reply is the source IP address of the keep-alive message.

(14-3) The type (or subtype) in the DB header of the reply indicates being a reply to the keep-alive message.

(14-4) The DB header or the DB payload of the reply includes the information indicating that the monitoring is still required afterwards.

Then, the monitoring request unit 355 transmits the generated reply to the source node (i.e., the sender) of the keep-alive message through the communication processing unit 330 and the network interface 320. After the transmission, the process returns to step S801. The reply transmitted in step S805 is received in step S702 by the requested node, which performs the process in FIG. 15.

When the keep-alive message from a node not registered in the requested node list 356 is received, the monitoring request unit 355 returns, in step S806, a reply specifying that monitoring is not required hereafter. The reply returned in step S806 is the same as the reply returned in step S805 in terms of (14-1) through (14-3). The difference lies in that the reply returned in step S806 includes the information indicating that monitoring is not required, instead of the information described in item (14-4).

Also in step S806, the reply generated by the monitoring request unit 355 is transmitted through the communication processing unit 330 and the network interface 320. Then, after the transmission, the process returns to step S801. The transmitted reply is received in step S702 by the requested node, which performs the process in FIG. 15.

Meanwhile, the process in step S807 is performed when there is a requested node which has not transmitted the keep-alive message within the predetermined time period P_keepalive. In step S807, the monitoring request unit 355 deletes the IP address of each requested node which has not transmitted the keep-alive message within the predetermined time period P_keepalive from the requested node list 356. Then, the process returns to step S801.

When the number of entries in the requested node list 356 is less than the predetermined number E_req, the monitoring request unit 355 selects a new node (s) depending on the shortage in step S808. For example, when the predetermined number E_req is three, and the number of entries in the requested node list 356 is one, the monitoring request unit 355 newly selects two (=3−1) nodes.

As described above with reference to step S610 illustrated in FIG. 14, the monitoring request unit 355 recognizes in advance a set of fixed IP addresses used in the distributed DB system, and also recognizes in advance the IP address fixedly assigned to the node 300 itself. Therefore, in step S808, the monitoring request unit 355 is able to select one or more IP addresses each assigned to one or more other nodes than the local node 300 from among the set of fixed IP addresses.

When the monitoring request unit 355 selects a new node (s) depending on the shortage (that is, when the monitoring request unit 355 selects the fixed IP address(es) of the new node(s)), the monitoring request unit 355 then, in step S809, requests each selected node to monitor the node 300. To be more specific, the monitoring request unit 355 generates a monitoring request in which the communication endpoint corresponding to the key region management unit including the monitoring request unit 355 itself is specified as a monitoring target. Then, the monitoring request unit 355 transmits the generated monitoring request through the communication processing unit 330 and the network interface 320.

For example, assume that the following assumptions (15-1) through (15-3) hold true.

(15-1) The correspondence table 340 is the same as the correspondence table 601 in FIG. 8.

Figure 16:
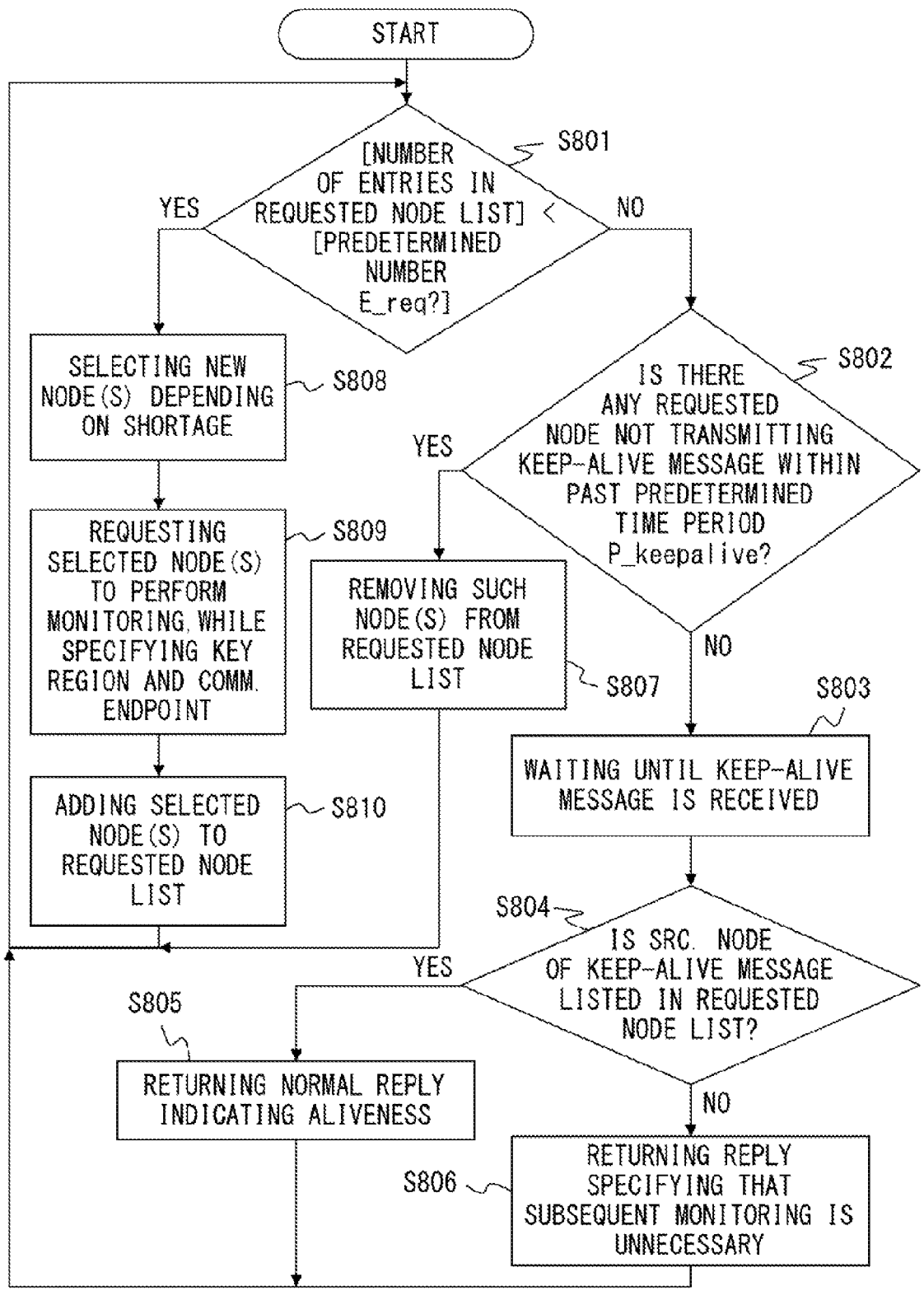
FIG. 16 is a flowchart of a process performed by a node that is monitored.

(15-2) The monitoring request unit 355 that is performing the process in FIG. 16 is the monitoring request unit 355 in the key region management unit 350b.

(15-3) The key region management unit 350b corresponds to the "third communication endpoint" for the key region $K_4$, which is identified by the index "4".

In the case where the assumptions (15-1) through (15-3) hold true, the monitoring request unit 355 of the key region management unit 350b specifies the monitoring target (i.e., the communication endpoint to be monitored) using the communication endpoint information "192.168.254.36:7000". As with step S610 in FIG. 14, the fixed IP address may be used as the source IP address of the monitoring request transmitted in step S809, or the IP address of the communication endpoint to be monitored may be used as the source IP address of the monitoring request transmitted in step S809.

In the next step S810, the monitoring request unit 355 adds each node selected in step S808 to the requested node list 356. That is, the monitoring request unit 355 adds each fixed IP address selected in step S808 to the requested node list 356. Then, the process returns to step S801.

In the present embodiment, the keep-alive message and the reply to the keep-alive message are transmitted on an established TCP connection. That is, in each of steps S805 and S806, the reply is transmitted on the TCP connection that has been established and used in transmitting the keep-alive message received in step S803.

According to the present embodiment, a monitoring request is also transmitted on an established TCP connection. Therefore, in step S809, the communication processing unit 330 may first perform the process for establishing a TCP connection in some cases, when receiving from the monitoring request unit 355, which has generated a monitoring request, an instruction to transmit the monitoring request. That is, to transmit the monitoring request in step S809, a series of processes may be performed starting with the transmission of a SYN segment.

When the IP address of the communication endpoint to be monitored is used as the source IP address of the monitoring request, all of the monitoring request, the keep-alive messages in response to the monitoring request, and the replies to the keep-alive messages may be transmitted and received on the same TCP connection.

In addition, each of steps S805, S806, and S809 includes calling the process in FIG. 9. Therefore, depending on the state of the ARP table 331, the transmission in step S805, S806, or S809 may be accompanied by broadcasting of an ARP request and update of the ARP table 331.

Next, with reference to the sequence diagrams in FIGS. 17 through 22, some examples of the operation sequences of the distributed DB system in FIG. 3 are described below. As understood from the examples in FIGS. 17 through 22, the entire distributed DB system works well when the nodes $N_{11}$ through $N_{18}$ in FIG. 3 each operate according to the flowcharts in FIGS. 9, 10 and 13 through 16.

In the description about FIGS. 17 through 22, the following assumptions (16-1) through (16-3) are assumed.

(16-1) Each of the nodes $N_{11}$ through $N_{18}$ in FIG. 3 is configured as the node 300 in FIG. 5.

(16-2) The client 202 in FIG. 3 is configured as the client 400 in FIG. 6.

(16-3) The correspondence table 340 of the node 300 and the correspondence table 431 of the client 400 are the same as the correspondence table 601 in FIG. 8.

Figure 17:
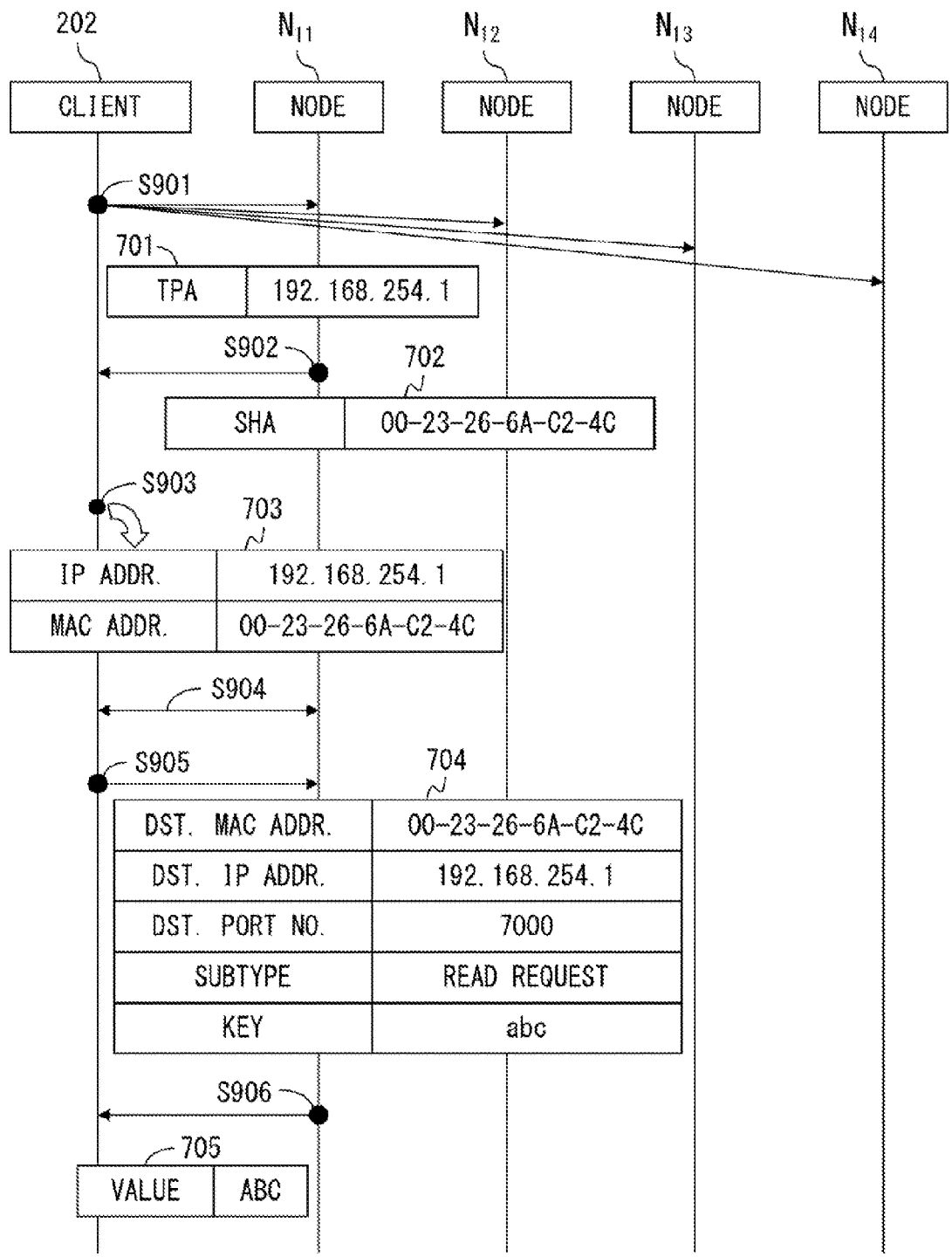
FIG. 17 is a sequence diagram that illustrates a request from a client and a normal reply from a node.

FIG. 17 is a sequence diagram that illustrates a request from the client 202 and a normal reply from a node. Due to space limitations in FIGS. 17 through 22, the nodes $N_{15}$ through $N_{18}$ are omitted in the nodes $N_{11}$ through $N_{18}$.

First, the application 440 of the client 202 specifies the key "abc" and instructs the DB request processing unit 430 to perform the reading operation. Then, the DB request processing unit 430 starts the process in FIG. 11.

For convenience of explanation in the following description, assume that the key region to which the key "abc" belongs is the key region $K_1$, which is identified by the index "1". Thus, according to FIG. 8, the first communication endpoint specified in step S302 in FIG. 11 is specifically the communication endpoint identified by the communication endpoint information "192.168.254.1:7000".

The DB request processing unit 430 instructs the communication processing unit 420 to transmit a read request to the above-mentioned first communication endpoint in step S302 in FIG. 11. Then, the communication processing unit 420 confirms whether or not there is a TCP connection between the client 202 and the communication endpoint specified from the DB request processing unit 430. However, in the example in FIG. 17, there is no TCP connection existing.

Then, the communication processing unit 420 tries to establish a TCP connection between the communication endpoint identified by the communication endpoint information "192.168.254.1:7000" and the client 202. Specifically, the communication processing unit 420 tries to transmit a SYN segment. Then, the process in FIG. 9 is called to transmit the SYN segment.

The example in FIG. 17 is an example of the case in which no entry is found in the search in step S102 in FIG. 9. Therefore, in step S105 in FIG. 9, specifically as indicated in step S901 in FIG. 17, an ARP request 701 in which the IP address "192.168.254.1" is specified as the TPA (target protocol address) is broadcast from the client 202.

The ARP request 701 is received by each device in the broadcast domain 200 in FIG. 3. Then, each device which has received the ARP request 701 operates according to FIG. 10.

Assume that, when the ARP request 701 is broadcast, the IP address "192.168.254.1" is assigned to the network interface 320 of the node $N_{11}$. In this case, as indicated by step S902 in FIG. 17, the node $N_{11}$ returns an ARP reply 702 to the client 202 in step S204 in FIG. 10.

In the ARP reply 702, the MAC address of the network interface 320 of the node $N_{11}$ is specified as the SHA (sender hardware address). In the following description, for convenience of explanation, it is assumed that the MAC address of the network interface 320 of the node $N_{11}$ is "00-23-26-6A-C2-4C" as exemplified in FIG. 17.

In addition, the client 202 receives the ARP reply 702. The reception of the ARP reply 702 corresponds to step S106 in FIG. 9. Therefore, as illustrated in step S107 in FIG. 9, the ARP table 421 is updated in the client 202, which has received the ARP reply 702.

Specifically, as indicated by step S903 in FIG. 17, a new ARP entry 703 is added to the ARP table 421 of the client 202. The ARP entry 703 associates the IP address "192.168.254.1" and the MAC address "00-23-26-6A-C2-4C" with each other.

When the ARP entry 703 is thus added in step S903 in FIG. 17 corresponding to step S107 in FIG. 9, the client 202 searches the ARP table 421 in step S102 in FIG. 9 again. As a result, in step S103, the newly added ARP entry 703 is found.

Therefore, in step S104 in FIG. 9, the communication processing unit 420 of the client 202 generates a SYN segment having the destination IP address "192.168.254.1" and the destination port number "7000". Then, the communication processing unit 420 transmits the generated SYN segment through the network interface 410.

The destination MAC address of this SYN segment is "00-23-26-6A-C2-4C". Therefore, the SYN segment is received by the network interface 320 of the node $N_{11}$, and outputted to the communication processing unit 330 of the node $N_{11}$.

As a result, the communication processing unit 330 of the node $N_{11}$ generates a SYN/ACK segment, and transmits the SYN/ACK segment to the client 202 through the network interface 320. Then, the SYN/ACK segment is received by the network interface 410 of the client 202, and outputted to the communication processing unit 420.

As a result, the communication processing unit 420 of the client 202 generates an ACK segment, and transmits the ACK segment to the node $N_{11}$ through the network interface 410. Then, the ACK segment is received by the network interface 320 of the node $N_{11}$, and outputted to the communication processing unit 330.

The establishment of the TCP connection according to the above-mentioned three-way handshake is indicated by the bidirectional arrow of step S904 in FIG. 17. Meanwhile, as described above, the establishment of the TCP connection is performed in order to transmit the read request in step S302 in FIG. 11.

Therefore, when the TCP connection is established in step S904, the DB request processing unit 430 of the client 202 transmits a read request 704 on the TCP connection as indicated by the next step S905. The read request 704 has the format of the frame 606 in FIG. 8, but only some fields are extracted and illustrated in FIG. 17.

The destination MAC address of the read request 704 is a MAC address determined by the ARP reply 702 (that is, the MAC address of the network interface 320 of the node $N_{11}$), and is specifically "00-23-26-6A-C2-4C". The destination IP address and the destination port number of the read request 704 are the IP address and the port number for identifying the first communication endpoint, which is identified in step S301 in FIG. 11 by the client 202, and are specifically "192.168.254.1" and "7000".

The subtype specified in the DB header of the read request 704 has the value indicating a "read request". In the DB payload of the read request 704, the key specified by the application 440 (that is, the key "abc") is specified.

Then, the read request 704 is received by the node $N_{11}$. When the read request 704 is received, the node $N_{11}$ is responsible for (i.e., is in charge of) the communication endpoint identified by the communication endpoint information "192.168.254.1:7000". That is, all entries of the key region $K_1$ corresponding to the communication endpoint information "192.168.254.1:7000" are stored in the local store 310 of the node $N_{11}$, and a key region management unit corresponding to the key region $K_1$ exists in the node $N_{11}$.

Therefore, the node $N_{11}$, which has received the read request 704, performs the process in FIG. 13. Then, in step S503 in FIG. 13, the read/write processing unit 351 reads, from the local store 310, the value "ABC" corresponding to the key "abc" specified in the read request 704.

In step S906 in FIG. 17 corresponding to step S504 in FIG. 13, a read reply 705 including the value "ABC" is transmitted to the client 202 from the node $N_{11}$. It is obvious that the read reply 705 is also transmitted on the TCP connection established in step S904.

As described above, the client 202 receives the read reply 705.

In the example of FIG. 17, it is assumed that the time period from when the DB request processing unit 430 instructs the communication processing unit 420 to transmit the read request in step S302 in FIG. 11 to when the DB request processing unit 430 receives the read reply 705 in step S906 is shorter than or equal to the predetermined time period TO_db in step S303 in FIG. 11. Therefore, the process in FIG. 11 proceeds from step S303 to step S304. As a result, the DB request processing unit 430 of the client 202 returns the value "ABC", which is acquired from the read reply 705, to the application 440 in step S304.

Next, with reference to FIG. 18, an example case regarding a failure in a node and a takeover is described below. The operation sequence of FIG. 18 is based on the following assumptions (17-1) through (17-7).

(17-1) The MAC address of the network interface 320 of the node $N_{13}$ is "00-23-26-02-C6-D7".

(17-2) As a result of the execution of the process in FIG. 14 or 15, the node $N_{13}$ newly takes charge of the key region $K_3$, which is identified by the index "3", as the "first communication endpoint" at a certain time point (hereafter referred to as "time point $T_1$"). That is, at the time point $T_1$, the network interface 320 of the node $N_{13}$ is assigned the IP address "192.168.254.3".

(17-3) When the node $N_{13}$ takes charge of the key region $K_3$ as the "first communication endpoint", the node $N_{13}$ requests at least the node $N_{12}$ to monitor the communication endpoint identified by the communication endpoint information "192.168.254.3:7000".

(17-4) The time point $T_1$ may be the time before step S901 in FIG. 17, the time after step S906, or any time between step S901 and step S906. The time point $T_1$ precedes the starting time point of the operation sequence in FIG. 18.

(17-5) After the time point $T_1$, an ARP entry 706 in FIG. 18 is registered in the ARP table 331 of the node $N_{12}$ for any reason. The ARP entry 706 associates the IP address "192.168.254.3" and the MAC address "00-23-26-02-C6-D7" with each other.

(17-6) At the starting time point of the operation sequence in FIG. 18, the ARP entry 706 is not deleted, namely, the ARP entry 706 still remains on the ARP table 331 of the node $N_{12}$.

(17-7) Also at the starting time point of the operation sequence in FIG. 18, the node $N_{13}$ is still in charge of the key region $K_3$ as the "first communication endpoint".

With the assumptions (17-1) through (17-7), assume that a failure occurs in the node $N_{13}$ (i.e., the node $N_{13}$ becomes faulty) at a certain time point as indicated by step S1001.

Meanwhile, according to the assumption (17-3), the monitoring unit 360 of the node $N_{12}$ performs the process in FIG. 15. That is, the monitoring unit 360 of the node $N_{12}$ monitors the communication endpoint identified by the communication endpoint information "192.168.254.3:7000". Then, in step S1002 in FIG. 18, the monitoring unit 360 of the node $N_{12}$ performs the process in step S701 in FIG. 15. Thus, a keep-alive message 707 whose destination IP address is "192.168.254.3" and whose destination port number is "7000" is transmitted from the node $N_{12}$ in step S1002.

Described below are the details of the operation in step S1002. The monitoring unit 360 of the node $N_{12}$ instructs the communication processing unit 330 to transmit the keep-alive message 707 in step S701 in FIG. 15. Then, the communication processing unit 330 judges whether or not a TCP connection is established between the communication endpoint identified by the communication endpoint information "192.168.254.3:7000" and the communication endpoint identified by the fixed IP address of the node $N_{12}$ and a predetermined port number.

For simple explanation, assume that the TCP connection has already been established. In this case, the communication processing unit 330 tries to transmit the keep-alive message 707 on the established TCP connection. That is, the communication processing unit 330 starts the process in FIG. 9 to transmit the keep-alive message 707.

Then, in the search in step S102 of FIG. 9, the ARP entry 706 in FIG. 18 is found. As a result, in step S104 in FIG. 9, the keep-alive message 707 in FIG. 18 is transmitted.

If the node $N_{13}$ at the destination of the keep-alive message 707 normally operates, the node $N_{13}$ performs the process in FIG. 16, and is to transmit a reply to the keep-alive message 707 in step 805 in FIG. 16. However, the node $N_{13}$ has already become faulty in step S1001 as described above. Therefore, no reply to the keep-alive message 707 is transmitted from the node $N_{13}$.

Meanwhile, the monitoring unit 360 of the node $N_{12}$ waits for the reception of the reply to the keep-alive message 707 as indicated in step S702 in FIG. 15. The example in FIG. 18 is one of the specific examples of the timeout process in step S702.

In the example in FIG. 18, the communication processing unit 330 is implemented by, for example, the standard library of the TCP/IP protocol stack, and specifically includes a TCP module, an IP module, an ARP module, etc. When instructed to transmit a data segment by the monitoring unit 360 or any one of other modules (for example, the acquisition control unit 352 etc.), the TCP module of the communication processing unit 330 transmits the data segment. Afterwards, the TCP module of the communication processing unit 330 waits for the reception of an ACK segment to the transmitted data segment.

If no ACK segment is received within a predetermined time period, the TCP module of the communication processing unit 330 tries to retransmit the data segment. Specifically, the "predetermined time period" in this example may be shorter than any one of the time period TO_prop in FIG. 14, the time period TO_bulk in FIGS. 14 and 15, the time period TO_assign in FIG. 14, and the time period TO_keepalive in FIG. 15. The ACK segment may be the piggyback ACK segment obviously.

The TCP module of the communication processing unit 330 may try to retransmit the data segment as described above up to the predetermined number of retries (for example, three times). The monitoring unit 360 or any other module in the application layer does not have to be involved in the retransmission control performed in the transport layer as described above by the TCP module of the communication processing unit 330. Due to space limitations, the retransmission performed by the TCP module is omitted in FIG. 18.

If no ACK segment is received even after the TCP module of the communication processing unit 330 performs the retransmission for the above-mentioned predetermined number of retries, the TCP module of the communication processing unit 330 may operate as follows, and the operation described below is exemplified in FIG. 18.

That is, the TCP module recognizes that the TCP connection has been disconnected, and closes the TCP connection. In addition, the TCP module notifies the ARP module of the abnormality indirectly through the IP module or directly. The notification of the abnormality includes the destination IP address used in the disconnected TCP connection (that is, "192.168.254.3" in the example in FIG. 18).

Upon receipt of the notification of the abnormality, the ARP module forcibly deletes the entry corresponding to the notified destination IP address (that is, the ARP entry 706 in the example in FIG. 18) from the ARP table 331. On the other hand, the TCP module tries to re-establish the TCP connection.

In the example in FIG. 18, the TCP module of the communication processing unit 330 of the node $N_{12}$ tries to re-establish the TCP connection between the communication endpoints listed in the following items (18-1) and (18-2).

(18-1) The communication endpoint used by the monitoring unit 360 of the node $N_{12}$ in performing the monitoring (that is, the communication endpoint identified by the fixed IP address of the node $N_{12}$ and the predetermined port number).

(18-2) The communication endpoint identified by the communication endpoint information "192.168.254.3:7000".

Specifically, the TCP module first tries to transmit a SYN segment. The destination IP address of the SYN segment is "192.168.254.3" as described in item (18-2). In addition, as described above, the ARP entry 706 has already been forcibly deleted upon receipt of the notification of the abnormality.

Therefore, when the process in FIG. 9 is called to transmit the SYN segment, no entry is found as a result of the search in step S102. Therefore, an ARP request is broadcast in step S105.

This broadcasting in step S105 is indicated as step S1003 in FIG. 18. That is, the IP address "192.168.254.3" is specified as the TPA in an ARP request 708 that is broadcast in step S1003.

For example, when the "failure" in step S1001 is only a temporary state, such as a state in which communication is temporarily disabled due to replacement of the network interface 320, the IP address may be resolved by broadcasting the ARP request 708. This is because there may be a case in which the replacement of the network interface 320 of the node $N_{13}$ is completed before step S1003.

However, in the example in FIG. 18, it is assumed that the node $N_{13}$ has really become faulty in step S1001. It is also assumed that the node $N_{13}$ is unrecoverable, or the recovery is not completed before step S1003. The type of failure may be, for example, an abnormality in hardware (e.g., in a CPU), or may be a defect in software (e.g., in an OS or in an application). In any case, in the example in FIG. 18, the faulty node $N_{13}$ is unable to return an ARP reply to the ARP request 708.

Therefore, the ARP module of the communication processing unit 330 of the node $N_{12}$ is unable to receive the ARP reply within the predetermined time period TO_arp in step S106 in FIG. 9. As a result, the process in FIG. 9 abnormally terminates. That is, the communication processing unit 330 fails to transmit the SYN segment, and thus fails to re-establish the TCP connection.

Accordingly, the communication processing unit 330 reports the abnormal termination to the monitoring unit 360, which has issued an instruction to transmit the keep-alive message 707 in step S701 in FIG. 15. The predetermined time period TO_keepalive in step S702 in FIG. 15 is set to an appropriate value in advance depending on one or more parameters (such as the retransmission interval and the number of retries) used in the TCP module of the communication processing unit 330.

That is, it is assumed that the predetermined time period TO_keepalive is preset to be equal to or longer than the time taken from the time point (19-1) to the time point (19-2).

(19-1) The time point at which the monitoring unit 360 instructs the communication processing unit 330 to transmit the keep-alive message 707 in step S701 in FIG. 15.

(19-2) The time point at which the communication processing unit 330 reports the abnormal termination to the monitoring unit 360 in the series of processes described above.

Even if the predetermined time period TO_keepalive has not passed from the time point (19-1), the process in FIG. 15 proceeds from step S702 to step S706 when the monitoring unit 360 receives the report of the abnormal termination from the communication processing unit 330. This is because it is expected that when the abnormal termination is reported from the communication processing unit 330, the monitoring unit 360 is unable to receive a reply to the keep-alive message even if the monitoring unit 360 waits until the predetermined time period TO_keepalive has passed.

Then, the acquisition control unit 352 of the node $N_{12}$ searches the correspondence table 340 for the other two communication endpoints that correspond to the key region $K_3$, which corresponds to the communication endpoint identified by the communication endpoint information "192.168.254.3:7000", in step S706 in FIG. 15. According to the assumption (16-3), the correspondence table 340 is the same as the correspondence table 601 in FIG. 8. Therefore, as a result of the search, the communication endpoints identified by pieces of the communication endpoint information "192.168.254.19:7000" and "192.168.254.35:7000" are found.

In addition, in the example in FIG. 18, the descriptions in the following items (20-1) through (20-4) are assumed.

(20-1) In the node $N_{12}$, the key region management unit corresponding to the key region $K_3$ is the key region management unit 350c in FIG. 5. The acquisition control unit 352 of the key region management unit 350c of the node $N_{12}$ selects the communication endpoint identified by the communication endpoint information "192.168.254.19:7000" in step S708 in FIG. 15.

(20-2) When the selection described in item (20-1) is performed, the IP address "192.168.254.19" is assigned to the network interface 320 of the node $N_{14}$.

(20-3) When the selection described in item (20-1) is performed, there is no TCP connection between the selected communication endpoint and the communication endpoint (18-1) used for the monitoring performed by the monitoring unit 360 of the node $N_{12}$.

(20-4) When the selection described in item (20-1) is performed, there is no entry about the IP address "192.168.254.19" in the ARP table 331 of the node $N_{12}$.

According to the assumptions described in items (20-1) through (20-4) above, the acquisition control unit 352 of the key region management unit 350c of the node $N_{12}$ requests the communication endpoint selected as described in item (20-1) for all data of the key region $K_3$ in step S708 in FIG. 15. That is, in step S708, the acquisition control unit 352 generates a copy request, and instructs the communication processing unit 330 to transmit the generated copy request.

Then, the communication processing unit 330 tries to transmit a data segment of the copy request. However, according to the assumption in item (20-3), there is no TCP connection. Thus, the communication processing unit 330 first attempts to transmit a SYN segment to establish a TCP connection.

Then, the communication processing unit 330 starts the process in FIG. 9 to transmit the SYN segment. According to the assumption in item (20-4), no entry is found in step S102 in FIG. 9. Therefore, an ARP request is broadcast in step S105.

FIG. 18 illustrates the thus performed step S105 as step S1004. That is, the IP address "192.168.254.19", which is selected in the selection of item (20-1) by the acquisition control unit 352, is specified as the TPA in an ARP request 709 that is broadcast in step S1004.

Each device belonging to the broadcast domain 200 in FIG. 3 operates according to the flowchart in FIG. 10 upon receipt of the ARP request 709. Therefore, according to the assumption in item (20-2), an ARP reply is returned in step S204 in FIG. 10 from the node $N_{14}$.

FIG. 18 illustrates the thus performed step S204 as step S1005. That is, the MAC address "00-23-26-17-F3-B9" of the network interface 320 of the node $N_{14}$ is specified as the SHA in an ARP reply 710 that is transmitted in step S1005.

The time period from step S1004 to step S1005 is equal to or shorter than the predetermined time period TO_arp in FIG. 9. Therefore, the communication processing unit 330 of the node $N_{12}$, which has received the ARP reply 710, updates the ARP table 331 in step S107 in FIG. 9. That is, the communication processing unit 330 of the node $N_{12}$ adds an ARP entry 711 to the ARP table 331 as indicated by step S1006 in FIG. 18. The ARP entry 711 associates the IP address "192.168.254.19" and the MAC address "00-23-26-17-F3-B9" with each other.

Then, the communication processing unit 330 of the node $N_{12}$ searches again the ARP table 331 in step S102 in FIG. 9. As a result, the ARP entry 711 is found this time, and accordingly the SYN segment is transmitted in step S104.

For simple explanation, assume that the node $N_{14}$ normally operates. Under this assumption, the communication processing unit 330 of the node $N_{14}$, which has received the SYN segment, transmits a SYN/ACK segment. As a result, the communication processing unit 330 of the node $N_{12}$ receives the SYN/ACK segment, and transmits an ACK segment. Then, the communication processing unit 330 of the node $N_{14}$ receives the ACK segment.

According to the above-mentioned three-way handshake, a TCP connection is established between the selected communication endpoint identified by the communication endpoint information "192.168.254.19:7000" and the above-mentioned communication endpoint (18-1) on the node $N_{12}$. In FIG. 18, the above-mentioned three-way handshake is indicated as step S1007.

Afterwards, the communication processing unit 330 of the node $N_{12}$ transmits the data segment of the copy request, which the acquisition control unit 352 has instructed the communication processing unit 330 to transmit in step S708 in FIG. 15, on the established TCP connection. This transmission of the copy request corresponds to step S708 in FIG. 15, and is indicated as step S1008 in FIG. 18.

That is, as illustrated in FIG. 18, the index "3" is specified in a copy request 712 that is transmitted in step S1008. The index "3" identifies the key region $K_3$, data of which is requested by the node $N_{12}$. In the copy request, the destination IP address itself may be used instead of the index as the information for identification of the key region $K_3$ because the destination IP address "192.168.254.19" is statically associated with the key region $K_3$.

The acquisition control unit 352 of the key region management unit 350c, which corresponds to the key region $K_3$, namely, which corresponds to the communication endpoint information "192.168.254.19:7000", in the node $N_{12}$ waits for the reception of a reply to the copy request 712. In the example in FIG. 18, as indicated by step S1009, a copy reply 713 to the copy request 712 is transmitted. To be more specific, the acquisition control unit 352 of the key region management unit 350c of the node $N_{12}$ receives the copy reply 713 within the predetermined time period TO_bulk from the transmission instruction in step S708 in FIG. 15. The copy reply 713 includes the data of all entries whose keys belong to the key region $K_3$, which is specified in the copy request 712.

After the reception of the copy reply 713, the acquisition control unit 352 of the key region management unit 350c of the node $N_{12}$ stores the data of the copy reply 713 in the local store 310 in step S710 in FIG. 15.

Then, in the next step S711, the acquisition control unit 352 of the key region management unit 350c of the node $N_{12}$ instructs the association unit 354 to assign the IP address of the target communication endpoint to the network interface 320 of the node $N_{12}$. As a result, the IP address "192.168.254.3" that has been assigned up to now to the node $N_{13}$, whose failure has been detected by the monitoring unit 360 of the node $N_{12}$, is newly assigned to the network interface 320 of the node $N_{12}$. This assignment in step S711 is indicated as step S1010 in FIG. 18.

In step S712 in FIG. 15, the monitoring request unit 355 of the key region management unit 350c of the node $N_{12}$ requests one or more other nodes to monitor the target communication endpoint identified by the communication endpoint information "192.168.254.3:7000". Then, in step S713, the monitoring unit 360 of the node $N_{12}$ excludes the target communication endpoint from the target node list 361.

Therefore, even when the node $N_{13}$, which has been in charge of (i.e., responsible for) the key region $K_3$ as the "first communication endpoint", becomes faulty as in step S1001 in FIG. 18, the node $N_{12}$ takes over the function of the node $N_{13}$ about the key region $K_3$. That is, the node $N_{12}$ newly takes charge of the key region $K_3$ as the "first communication endpoint". Accordingly, the failover function is realized within the entire distributed DB system.

In addition, the faulty node $N_{13}$ may also have been responsible for one or more other key regions than the key region $K_3$. For example, when the failure occurs in step S1001, the node $N_{13}$ may be responsible for the key region $K_3$ as the "first communication endpoint", and may be also responsible for the key region $K_{15}$ as the "second communication endpoint".

In this case, the function of the node $N_{13}$ about the key region $K_{15}$ is taken over by another node that monitors the "second communication endpoint" of the key region $K_{15}$ (i.e., taken over by a node that monitors the communication endpoint identified by the communication endpoint information "192.168.254.31:7000"). Therefore, even if a node responsible for a plurality of key regions becomes faulty, the failover is successfully performed on each key region.

Next, the DB access performed after the takeover in FIG. 18 is described below with reference to FIGS. 19 and 20. Since FIGS. 19 and 20 adopt different suppositions, their operation sequences are also different. However, in any case, when the client 202 transmits a DB access request in which a key belonging to the key region $K_3$ is specified, the client 202 is able to receive a DB access reply from the node $N_{12}$, which has taken over the key region $K_3$.

Figure 19:
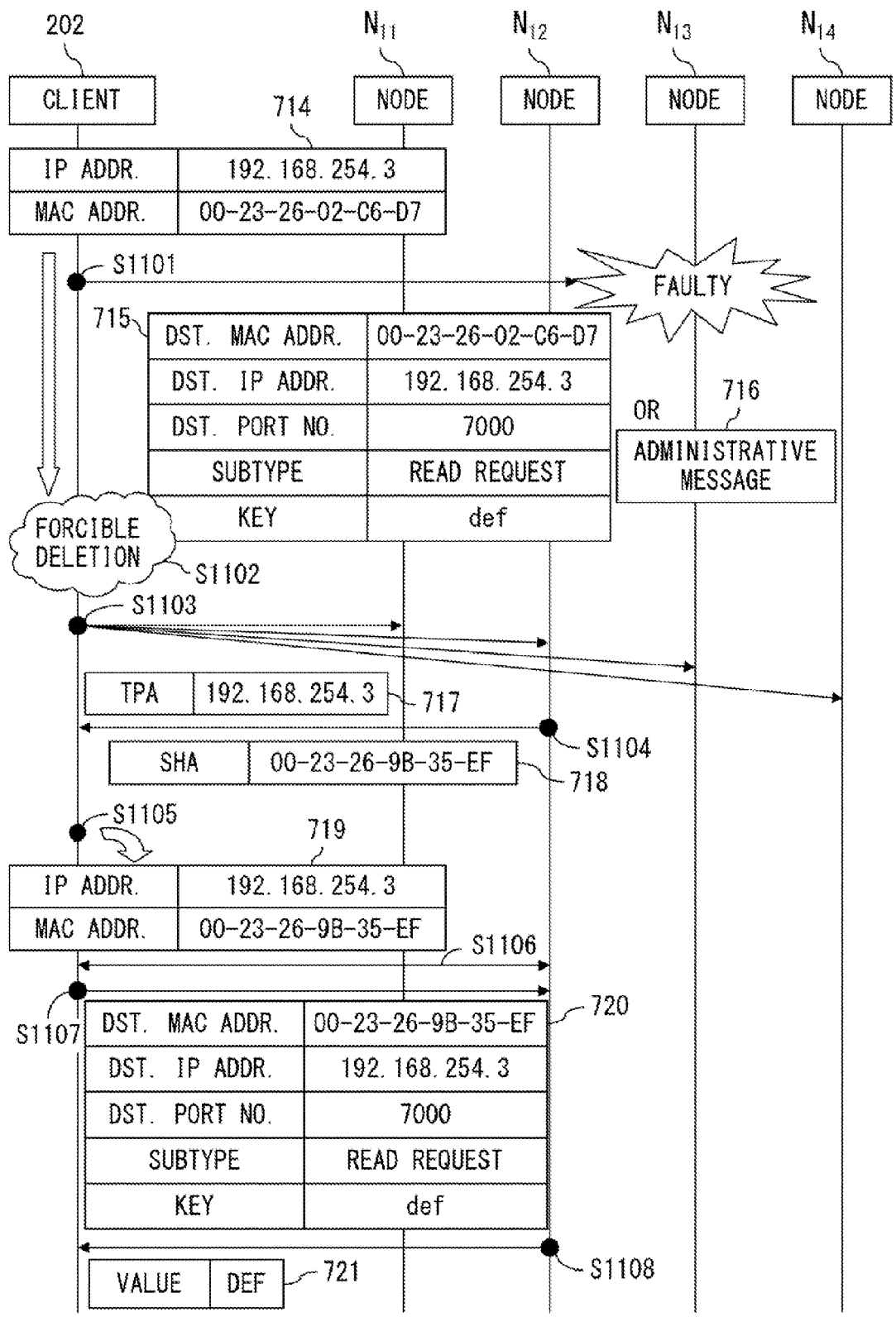
FIG. 19 is a sequence diagram that illustrates database access which is performed, with the ARP table of a client remaining in an old state, after takeover.

FIG. 19 is a sequence diagram that illustrates DB access which is performed, with the ARP table 421 of the client 202 remaining in an old state, after the takeover in FIG. 18. The suppositions for the operation sequence of FIG. 19 are described in the following items (21-1) through (21-5).

(21-1) Before the node $N_{13}$ becomes faulty in step S1001 in FIG. 18, the client 202 transmits a DB access request in which a key belonging to the key region $K_3$ is specified to the node $N_{13}$, and then the client 202 receives a DB access reply from the node $N_{13}$. In addition, the transmission and the reception of this DB access request and this DB access reply are performed on an established TCP connection.

(21-2) The TCP connection described in item (21-1) has not yet been disconnected (i.e., has not yet been shut down) in a normal procedure at the starting point of the operation sequence in FIG. 19. The normal procedure herein means the procedure in which a FIN/ACK segment and an ACK segment are transmitted and received for each of two pipes in opposite directions.

(21-3) Before the communication described in item (21-1), an ARP entry 714 in FIG. 19 is created on the ARP table 421 of the client 202. Note that the ARP entry 714 is the same as the ARP entry 706, which is held by the node $N_{12}$ in FIG. 18 before the node $N_{13}$ becomes faulty.

(21-4) At the starting point of the operation sequence of FIG. 19, the ARP entry 714 has not yet been deleted, namely, still remains on the ARP table 421 of the client 202.

(21-5) The key "def" belongs to the key region $K_3$.

Under the assumptions described in items (21-1) through (21-5), in step S1101, the client 202 transmits a DB access request such as a read request 715 or a certain administrative message 716 on the existing TCP connection described in item (21-2).

Assume that the key specified in the read request 715 is "def". In this case, according to the assumption in item (21-5), the "first communication endpoint" detected by the DB request processing unit 430 of the client 202 in step S301 in FIG. 11 is identified by the communication endpoint information "192.168.254.3:7000" according to the correspondence table 601 in FIG. 8. Therefore, in the read request 715, the destination IP address is "192.168.254.3", and the destination port number is "7000".

In addition, although the content of the administrative message 716 is arbitrary, the destination IP address of the administrative message 716 is also "192.168.254.3". According to the assumption in item (21-2), at the starting point of the process in FIG. 19, the communication processing unit 420 of the client 202 does not recognize that the TCP connection described in item (21-1) has been disconnected. Therefore, the communication processing unit 420 tries to transmit the data segment of the read request 715 or that of the administrative message 716 on the TCP connection described in item (21-1) without performing the process of transmitting a SYN segment again. As a result, the process in FIG. 9 is called.

Then, when the communication processing unit 420 of the client 202 searches the ARP table 421 in step S102 in FIG. 9, the ARP entry 714 is found because of the assumption in item (21-4). As a result, the MAC address "00-23-26-02-C6-D7" is specified as the destination MAC address in the read request 715 or the administrative message 716.

Thus, the frame of the read request 715 or that of the administrative message 716 is transmitted from the communication processing unit 420 of the client 202 in step S1101 in FIG. 19 corresponding to step S104 in FIG. 9. However, the node $N_{13}$ is faulty at the time point in step S1101. Therefore, no reply to the read request 715 or to the administrative message 716 is returned.

Even when someone (e.g., an administrator) restores the node $N_{13}$ from the failure, and the node $N_{13}$ thus restored to its normal state receives the read request 715 or the administrative message 716, no reply is returned for the following reason.

The communication processing unit 330 of the restored node $N_{13}$ may receive the frame in which the MAC address of the network interface 320 of the node $N_{13}$ is specified as the destination MAC address. However, as indicated in step S1010 in FIG. 18, the IP address "192.168.254.3" has already been assigned to the network interface 320 of the node $N_{12}$. In addition, no dynamic IP address appearing on the correspondence table 601 in FIG. 8 is assigned to the node $N_{13}$ when the node $N_{13}$ is just restored. Only after the node $N_{13}$ performs the process in FIG. 14 or 15, a dynamic IP address is assigned to the node $N_{13}$.

Therefore, the read request 715 or the administrative message 716 is discarded by the communication processing unit 330 of the node $N_{13}$ even if it is received by the network interface 320 of the restored node $N_{13}$. This is because the destination IP address of the read request 715 or the administrative message 716 is not assigned to the network interface 320 of the node $N_{13}$.

Therefore, regardless of whether the node $N_{13}$ still remains faulty or whether the node $N_{13}$ has already been restored, the client 202 is unable to receive the reply to the read request 715 or to the administrative message 716.

As described above with reference to FIG. 11, the TCP module of the communication processing unit 420 of the client 202 may transmit again the data segment if no ACK segment is received after the passage of a predetermined time period (note that the arrow indicating the retransmission is omitted in FIG. 19). However, in the example in FIG. 19, since the destination MAC address specified in the frame and the destination IP address specified in the frame correspond to the different network interfaces 320, the problem is not solved by the retransmission in the transport layer.

As a result, no ACK segment is received even if the TCP module of the communication processing unit 420 of the client 202 repeats the retransmission for a predetermined number of times (for example, three times). Therefore, the TCP module recognizes that the TCP connection, which has previously existed as described in item (21-2), has been disconnected. Then, the TCP module performs an appropriate process for shutting down the connection (for example, freeing an area on the RAM 503 used for the TCP connection, etc.).

Furthermore, the TCP module notifies the ARP module of an abnormality directly or indirectly through the IP module. Upon receipt of the notification of the abnormality, the ARP module forcibly deletes the ARP entry 714 from the ARP table 421 as indicated by step S1102 in FIG. 19.

Meanwhile, the TCP module attempts a re-establishment of the TCP connection. That is, the TCP module first tries to transmit a SYN segment for the re-establishment of the TCP connection. The destination IP address of the SYN segment is "192.168.254.3" as with the read request 715 and the administrative message 716.

Therefore, the process in FIG. 9 is started to transmit the SYN segment. Then, as a result of the deletion in step S1102 in FIG. 19, no entry is found in the search in step S102 of FIG. 9. Therefore, an ARP request is broadcast in step S105 in FIG. 9. The thus performed step S105 is indicated as step S1103 in FIG. 19. That is, the IP address "192.168.254.3" is specified as the TPA in an ARP request 717 that is transmitted in step S1103.

When each device in the broadcast domain 200 in FIG. 3 receives the ARP request 717, each device operates according to FIG. 10. As a result, as indicated in step S1104 in FIG. 19, an ARP reply 718 is transmitted from the node $N_{12}$ because the IP address "192.168.254.3" is currently assigned to the network interface 320 of the node $N_{12}$ as a result of step S1010 in FIG. 18.

The MAC address "00-23-26-9B-35-EF" of the network interface 320 of the node $N_{12}$ is specified as the SHA in the ARP reply 718. In addition, the ARP reply 718 is received by the client 202.

The reception of the ARP reply 718 corresponds to step S106 in FIG. 9. Therefore, as indicated by step S107 in FIG. 9, the ARP table 421 is updated in the client 202, which has received the ARP reply 718.

Specifically, as in step S1105 in FIG. 19, a new ARP entry 719 is added to the ARP table 421 of the client 202. The ARP entry 719 associates the IP address "192.168.254.3" and the MAC address "00-23-26-9B-35-EF" with each other.

When the ARP entry 719 is thus added in step S1105 in FIG. 19 corresponding to step S107 in FIG. 9, the client 202 searches again the ARP table 421 in step S102 in FIG. 9. As a result, the newly added ARP entry 719 is found.

Therefore, in step S104 in FIG. 9, the communication processing unit 420 of the client 202 generates a SYN segment whose destination IP address is "192.168.254.3" and whose destination port number is "7000". Then, the communication processing unit 420 transmits the generated SYN segment through the network interface 410.

The destination MAC address of the SYN segment is "00-23-26-9B-35-EF". Therefore, the SYN segment is received by the node $N_{12}$. Next, the node $N_{12}$ transmits a SYN/ACK segment. Then, the client 202 receives the SYN/ACK segment, and transmits an ACK segment.

As described above, a TCP connection is established by the three-way handshake between the communication endpoint on the node $N_{12}$ identified by the communication endpoint information "192.168.254.3:7000" and the communication endpoint on the client 202. This three-way handshake is indicated by the bidirectional arrow of step S1106 in FIG. 19.

Then, on the TCP connection established in step S1106, a read request or an administrative message is retransmitted. Due to space limitations in FIG. 19, FIG. 19 illustrates only the retransmission performed in the case where the data segment transmitted in step S1101 is the read request 715.

Specifically, the communication processing unit 420 of the client 202 starts the process in FIG. 9 in order to transmit a data segment of the read request, which has been specified by the DB request processing unit 430 and has triggered the transmission in step S1101. Then, as a result of the search in step S102 in FIG. 9, the added ARP entry 719 is found.

Therefore, a frame of a read request 720 is transmitted in step S104. The thus performed step S104 is indicated as step S1107 in FIG. 19.

The frame of the read request 720 is different from the frame of the read request 715 in its destination MAC address. That is, the destination MAC address of the read request 720 is "00-23-26-9B-35-EF". However, the destination IP address, the destination port number, the subtype, the key, etc. are the same between the read requests 715 and 720.

Next, the read request 720 is received by the node $N_{12}$. Then, the node $N_{12}$ operates according to FIG. 13. As a result, in step S1108 in FIG. 19 corresponding to step S504 in FIG. 13, a read reply 721 including the value "DEF" corresponding to the specified key "def" is transmitted from the node $N_{12}$ to the client 202.

The read reply 721 is received by the network interface 410 of the client 202, and outputted to the DB request processing unit 430. In addition, the predetermined time period TO_db in FIG. 11 is determined in advance so that the predetermined time period TO_db in FIG. 11 may be equal to or longer than the time taken from the following time point (22-1) to the following time point (22-2).

(22-1) The time point when the DB request processing unit 430 instructs the communication processing unit 420 to transmit the read request 715.

(22-2) The time point when the DB request processing unit 430 receives the read reply 721 through the communication processing unit 420.

That is, the time taken from the time point (22-1) to the time point (22-2) when the process as illustrated in FIG. 19 is performed is estimated in advance based on the following constants (23-1), (23-2), etc. The predetermined time period TO_db is appropriately determined based on the result of the estimate.

(23-1) Some constants (such as the retransmission interval, the number of retries, etc.) that are defined in the TCP module of the communication processing unit 420 for each of the SYN segment and the data segment.

(23-2) The predetermined time period TO_arp, which is illustrated in FIG. 9 and defined in the ARP module of the communication processing unit 420.

Therefore, when the DB request processing unit 430 of the client 202 receives the read reply 721 through the communication processing unit 420, the process in FIG. 11 proceeds from step S303 to step S304. Then, the DB request processing unit 430 returns the value "DEF" obtained from the read reply 721 to the application 440.

In addition, although the illustration is omitted in FIG. 19, the case in which an administrative message is retransmitted is similar to the case that is illustrated in steps S1107 and S1108. That is, the administrative message is transmitted from the client 202 to the node $N_{12}$, and a reply to the administrative message is transmitted from the node $N_{12}$ to the client 202.

Next, the operation sequence of the DB access performed after the takeover in FIG. 18 with the suppositions different from those adopted in FIG. 19 is described below with reference to FIG. 20. FIG. 20 is a sequence diagram that illustrates DB access performed after the ARP table 421 is updated in the client 202 after the takeover in FIG. 18.

Figure 20:
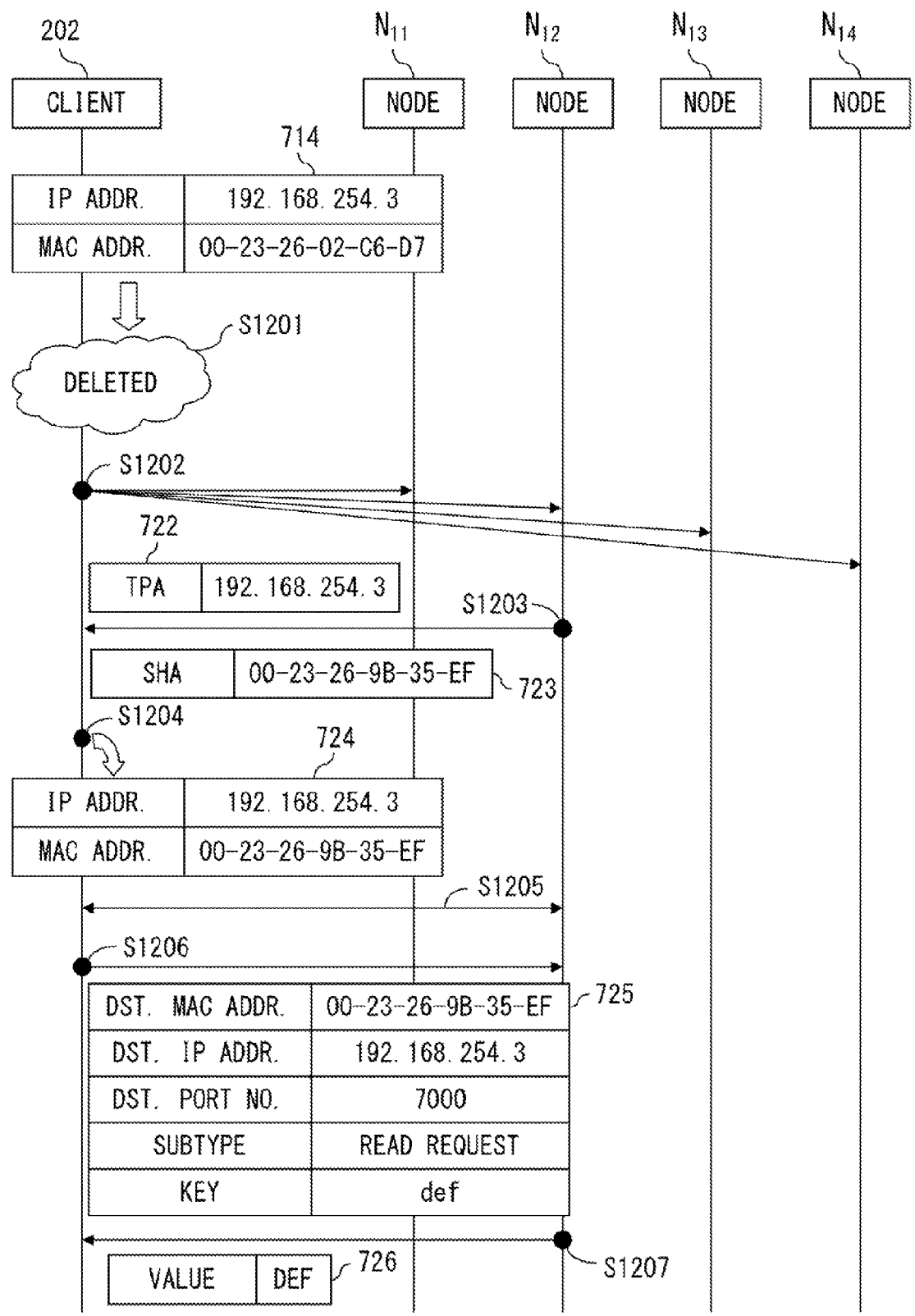
FIG. 20 is a sequence diagram that illustrates database access performed after the ARP table is updated by a client after takeover.

The suppositions for the operation sequence in FIG. 20 are described in the following items (24-1) through (24-5).

(24-1) Before the node $N_{13}$ becomes faulty in step S1001 in FIG. 18, the client 202 transmits a DB access request in which a key belonging to the key region $K_3$ is specified to the node $N_{13}$, and then the client 202 receives a DB access reply from the node $N_{13}$. In addition, the transmission and reception of this DB access request and this DB access reply are performed on an established TCP connection.

(24-2) However, for any reason, the TCP connection described in item (24-1) has been closed in the normal procedure before step S1001 in FIG. 18. For example, when the application 440 is once terminated, the DB request processing unit 430 may perform the process of closing the TCP connection which has been used for the application 440.

(24-3) Before the communication described in item (24-1), the ARP entry 714, which is the same as the ARP entry 714 in FIG. 19, is created in the ARP table 421 of the client 202.

(24-4) At the starting time point of the operation sequence in FIG. 20, the ARP entry 714 has not yet been deleted, namely, still remains on the ARP table 421 of the client 202.

(24-5) The key "def" belongs to the key region $K_3$.

As described in item (24-4) above, the ARP table 421 of the client 202 includes the ARP entry 714. However, if the ARP entry 714 is not used for some period of time for any reason such as the termination of the application 440, the ARP entry 714 is deleted as indicated in step S1201 in FIG. 20 because the communication processing unit 420 performs the aging process on each entry in the ARP table 421.

Then, after the deletion of the ARP entry 714, the application 440 of the client 202 may be activated (i.e., invoked) again. Furthermore, the application 440 may instruct the DB request processing unit 430 to perform the reading operation, while specifying the key "def". Then, the DB request processing unit 430 starts the process in FIG. 11.

The flow of the subsequent processes is similar to that in steps S901 through S906 in FIG. 17. That is, the differences between steps S901 through S906 in FIG. 17 and steps S1202 through S1207 in FIG. 20 lie only in the key specified by the application 440 and specific values of pieces of information that depend on the key.

Described simply below are steps S1202 through S1207. First, when the process in FIG. 11 starts, the "first communication endpoint" identified by the communication endpoint information "192.168.254.3:7000" is found out (i.e., identified) in step S301.

Then, in step S302, the DB request processing unit 430 instructs the communication processing unit 420 to transmit a read request. However, according to the assumption in item (24-2), there is no TCP connection. Therefore, the communication processing unit 420 first tries to transmit a SYN segment.

Then, the process in FIG. 9 is called to transmit the SYN segment. Since the ARP entry 714 has already been deleted in step S1201 in FIG. 20, no entry is found in the search in step S102 in FIG. 9. Therefore, an ARP request is broadcast in step S105.

The thus performed step S105 corresponds to step S1202 in FIG. 20. In addition, the IP address "192.168.254.3" is specified as the TPA in an ARP request 722 that is broadcast in step S1202.

Meanwhile, the IP address "192.168.254.3" is currently assigned to the network interface 320 of the node $N_{12}$ as a result of the process in FIG. 18. Therefore, as indicated in step S1203 in FIG. 20, an ARP reply 723 is returned from the node $N_{12}$. In the ARP reply 723, the MAC address "00-23-26-9B-35-EF" of the node $N_{12}$ is specified as the SHA.

Then, the client 202 receives the ARP reply 723, and updates the ARP table 421 as indicated by step S107 in FIG. 9. The thus performed step S107 is indicated as step S1204 in FIG. 20, and specifically an ARP entry 724 is added to the ARP table 421. The ARP entry 724 associates the IP address "192.168.254.3" and the MAC address "00-23-26-9B-35-EF" with each other.

The communication processing unit 420 refers to the ARP entry 724, and transmits a SYN segment through the network interface 410. Afterwards, the node $N_{12}$ transmits a SYN/ACK segment, and the client 202 transmits an ACK segment. The three-way handshake as described above is indicated by the bidirectional arrow of step S1205 in FIG. 20.

Then, as indicated in the next step S1206, the DB request processing unit 430 of the client 202 transmits a read request 725 on the TCP connection established in step S1205. The content of the read request 725 is the same as that of the read request 720 in FIG. 19.

The node $N_{12}$, which receives the read request 725, then operates according to FIG. 13, and returns a read reply 726 as indicated by step S1207 in FIG. 20. The read reply 726 includes the value "DEF" corresponding to the key "def" specified in the read request 725. The DB request processing unit 430, which receives the read reply 726, then returns the value "DEF" to the application 440 in step S304 in FIG. 11.

As described above with reference to FIGS. 19 and 20, even after the physical node corresponding to a certain communication endpoint has changed, the client 202 is still able to communicate with this certain communication endpoint regardless of whether or not there is an old (i.e., obsolete) ARP entry still remaining in the ARP table 421.

Next, the operations performed in the case where a new node $N_{19}$ is added to the broadcast domain 200 in FIG. 3 after the takeover in FIG. 18 are described below with reference to FIGS. 21 and 22.

Figure 21:
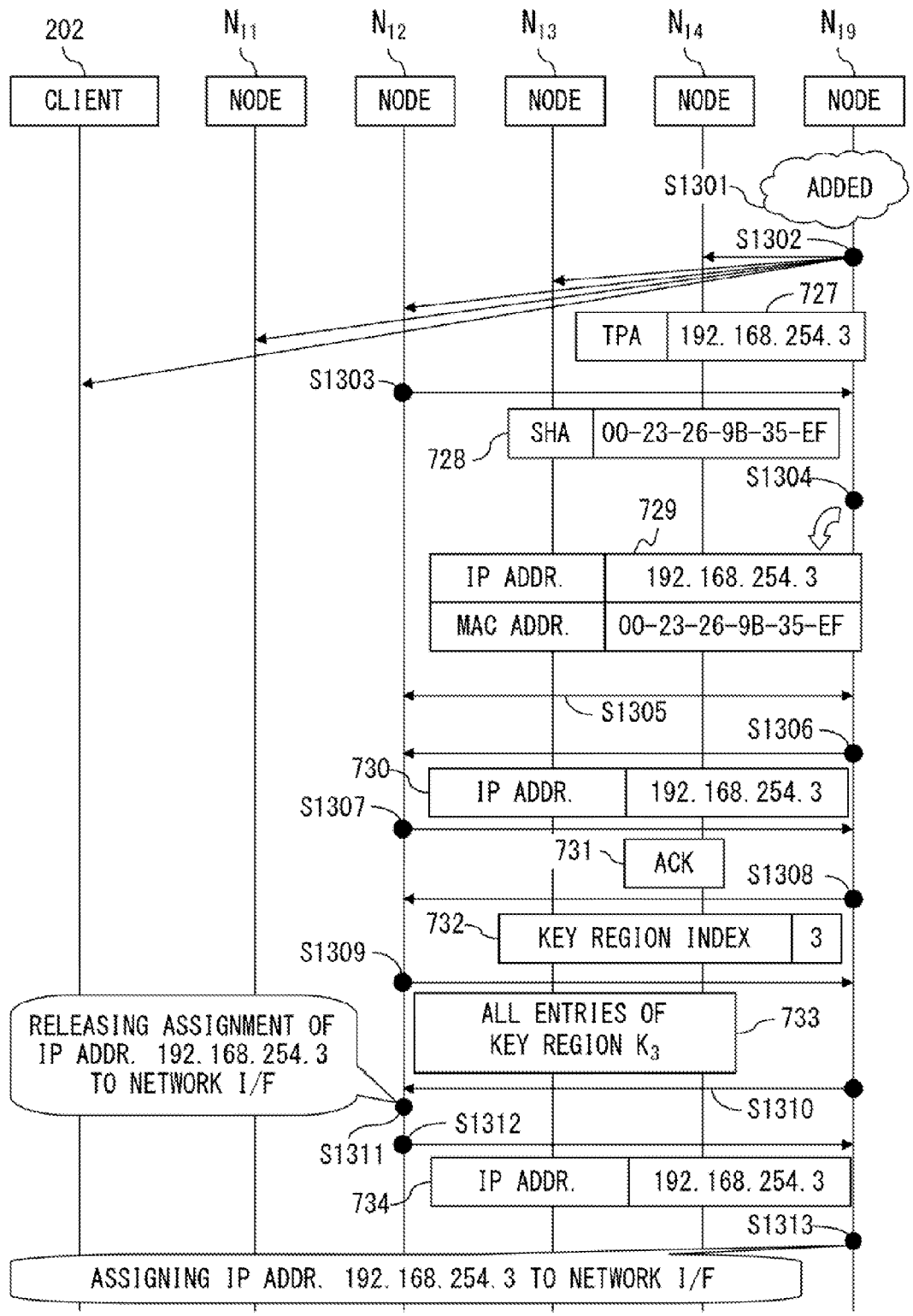
FIG. 21 is a sequence diagram of a takeover performed when a new node is added.

FIG. 21 is a sequence diagram of a takeover performed when a new node is added.

First in step S1301, a new node $N_{19}$ is added. The node $N_{19}$ may be specifically realized by, for example, the computer 500 in FIG. 7. In step S1301, not only the hardware of the node $N_{19}$ is added to the distributed DB system, but also the following operations (25-1) through (25-3) are performed.

(25-1) Installation of the OS.
(25-2) Installation of one or more programs and some pieces of data for enabling the computer 500 as hardware to serve as the node $N_{19}$, which is provided in the distributed DB system and configured as the node 300 in FIG. 5.
(25-3) Assignment of a fixed IP address for maintenance to the network interface 320 (hereafter this fixed IP address is referred to as "192.168.254.136" for convenience of explanation).

The OS installed in the operation (25-1) may include one or more program modules for enabling the CPU 501 to execute the processes in FIGS. 9 and 10, namely, to function as the communication processing unit 330. Not only the OS, but also one or more device drivers such as the Ethernet driver etc. are installed as necessary.

An example of the data to be installed in the operation (25-2) is the correspondence table 340 in FIG. 5. An example of the program to be installed in the operation (25-2) is a program for enabling the CPU 501 to execute the processes in FIGS. 13 through 16, namely, to function as the key region management units 350a through 350c and the monitoring unit 360.

The operations (25-1) through (25-3) may be manually performed by the system administrator, or may be automatically performed by the deployment server 201 in FIG. 3. Anyway, in step S1301, the node $N_{19}$ is responsible for no key region. Therefore, any IP address appearing on the correspondence table 601 in FIG. 8 has not been assigned to the network interface 320 of the node $N_{19}$.

The node $N_{19}$ added in step S1301 starts the process in FIG. 14. In the example in FIG. 21, assume that the node $N_{19}$ selects the communication endpoint identified by the communication endpoint information "192.168.254.3:7000" at random in step S601 in FIG. 14. Then, in step S602, the node $N_{19}$ tries to transmit a takeover proposition.

However, since the node $N_{19}$ has just been added, there are no TCP connections between the node $N_{19}$ and other devices.

In addition, in the ARP table 331 of the node $N_{19}$, there are no entries about the IP addresses appearing on the correspondence table 340.

Therefore, the communication processing unit 330 of the node $N_{19}$ first tries to establish a TCP connection between the following communication endpoints (26-1) and (26-2).

(26-1) The communication endpoint on the node $N_{19}$ identified by the communication endpoint information "192.168.254.136:7000" including the fixed IP address "192.168.254.136" described in relation to the operation (25-3).
(26-2) The selected communication endpoint identified by the communication endpoint information "192.168.254.3:7000".

The communication processing unit 330 of the node $N_{19}$ tries to transmit a SYN segment in order to establish a TCP connection; specifically, it starts the process in FIG. 9. However, as described above, there is no entry about the IP address "192.168.254.3" in the ARP table 331 of the node $N_{19}$. Therefore, no entry is found in the search in step S102 in FIG. 9.

Then, the communication processing unit 330 broadcasts an ARP request in step S105. The thus performed step S105 is indicated as step S1302 in FIG. 21. The IP address "192.168.254.3" is specified as the TPA in an ARP request 727 that is broadcast in step S1302.

When each device in the broadcast domain 200 in FIG. 3 receives the ARP request 727, each device operates according to FIG. 10. Meanwhile, the IP address "192.168.254.3" is being assigned to the network interface 320 of the node $N_{12}$ at the time point in step S1302 as a result of the takeover in FIG. 18.

Therefore, as indicated by step S1303 in FIG. 21, an ARP reply 728 is transmitted from the node $N_{12}$. In the ARP reply 728, the MAC address "00-23-26-9B-35-EF" of the network interface 320 of the node $N_{12}$ is specified as the SHA.

When the communication processing unit 330 of the node $N_{19}$ receives the ARP reply 728, the communication processing unit 330 of the node $N_{19}$ updates the ARP table 331 in step S107 in FIG. 9. Specifically, the communication processing unit 330 of the node $N_{19}$ adds an ARP entry 729 to the ARP table 331 as indicated by step S1304 in FIG. 21. The ARP entry 729 associates the IP address "192.168.254.3" and the MAC address "00-23-26-9B-35-EF" with each other.

Then, the communication processing unit 330 of the node $N_{19}$ searches again the ARP table 331 in step S102 in FIG. 9, and finds the added ARP entry 729. Therefore, a frame of a SYN segment is transmitted in step S104.

Then, the communication processing unit 330 of the node $N_{12}$ receives the SYN segment, and transmits a SYN/ACK segment. Then, the communication processing unit 330 of the node $N_{19}$ receives the SYN/ACK segment, and transmits an ACK segment. As a result of the three-way handshake above, a TCP connection is established between the communication endpoint (26-1) on the node $N_{19}$ and the communication endpoint (26-2) on the node $N_{12}$.

Then, the takeover proposition in step S602 in FIG. 14 is transmitted on the TCP connection established in step S1305. Specifically, as indicated by step S1306 in FIG. 21, a takeover proposition 730 is transmitted from the node $N_{19}$ to the node $N_{12}$. The node $N_{19}$ transmits the takeover proposition 730, thereby proposing to the node $N_{12}$ that the node $N_{19}$ take over from the node $N_{12}$ the communication endpoint identified by the destination IP address "192.168.254.3" and the destination port number "7000".

Then, in the example in FIG. 21, when the node $N_{12}$ receives the takeover proposition 730, the node $N_{12}$ returns an ACK reply 731 in step S1307 in response to the takeover proposition 730. For more details, in the node $N_{12}$, the supply control unit 353 in the key region management unit corresponding to the IP address "192.168.254.3", which is the IP address of the "first communication endpoint" for the key region $K_3$, returns the ACK reply 731.

Then, the communication processing unit 330 of the node $N_{19}$ receives the ACK reply 731. Thus, the node $N_{19}$ newly generates a key region management unit corresponding to the key region $K_3$ (for more details, corresponding to the IP address "192.168.254.3"). The process in FIG. 14 then proceeds to step S605.

In the description below, for convenience of explanation, it is assumed that the key region management unit 350a in FIG. 5 is newly generated in the node $N_{19}$ as described above. There is only one key region management unit 350a in the node $N_{19}$.

The acquisition control unit 352 of the key region management unit 350a generated in the node $N_{19}$ then transmits a takeover request to the communication endpoint (26-2) on the node $N_{12}$ in step S605 in FIG. 14. The thus performed step S605 is indicated as step S1308 in FIG. 21.

As illustrated in FIG. 21, a takeover request 732 transmitted in step S1308 may include, for example, the index "3" for identification of the key region $K_3$ to be taken over. Otherwise, since the key region $K_3$ is identifiable by the destination IP address "192.168.254.3" itself of the takeover request 732, it is not necessary for the takeover request 732 to include the index.

Anyway, upon receipt of the takeover request 732, the node $N_{12}$ returns a takeover reply 733 as indicated in step S1309 in FIG. 21. The takeover reply 733 includes data of all entries whose keys belong to the key region $K_3$ and which are read and copied from the local store 310 of the node $N_{12}$.

The above-mentioned takeover proposition 730, ACK reply 731, takeover request 732, and takeover reply 733 are all transmitted and received on the TCP connection established in step S1305.

Upon receipt of the takeover reply 733 through the communication processing unit 330, the acquisition control unit 352 of the key region management unit 350a of the node $N_{19}$ stores, into the local store 310, the data of all entries included in the takeover reply 733. This is done in step S607 in FIG. 14.

Meanwhile, upon completion of the transmission of the takeover reply 733, the node $N_{12}$ starts the process for closing the TCP connection. In the description below, as with the assumption in item (20-1) relating to FIG. 18, it is assumed for convenience that the key region management unit corresponding to the key region $K_3$ (that is, corresponding to the IP address "192.168.254.3") in the node $N_{12}$ is the key region management unit 350c in FIG. 5.

The supply control unit 353 of the key region management unit 350c of the node $N_{12}$ instructs the communication processing unit 330 to close the TCP connection used in the transmission of the takeover reply 733. Then, the communication processing unit 330 of the node $N_{12}$ transmits a FIN/ACK segment. Upon receipt of the FIN/ACK segment, the communication processing unit 330 of the node $N_{19}$ returns an ACK segment to the node $N_{12}$.

In addition, after the node $N_{19}$ has taken over the key region $K_3$ from the node $N_{12}$ (in more detail, after the node $N_{19}$ has taken over the "first communication endpoint" for the key region $K_3$ from the node $N_{12}$), there is no particular data to be transmitted from the node $N_{19}$ to the node $N_{12}$. Therefore, the communication processing unit 330 of the node $N_{19}$ also transmits a FIN/ACK segment. Then, upon receipt of the FIN/ACK segment, the communication processing unit 330 of the node $N_{12}$ returns an ACK segment to the node $N_{19}$. The TCP connection established in step S1305 is closed in step S1310 as described above.

In addition, in step S1311, the key region management unit 350c of the node $N_{12}$ performs the process for releasing the assignment of the IP address "192.168.254.3" to the network interface 320 of the node $N_{12}$ (i.e., the process for dissociating the IP address "192.168.254.3" from the network interface 320 of the node $N_{12}$).

Specifically, the supply control unit 353 of the key region management unit 350c instructs the association unit 354 to release the assignment. Then, the association unit 354 directly rewrites the interface configuration file 332, or invokes the function of the communication processing unit 330 by issuing a command such as the "ifconfig" command, thereby indirectly rewriting the interface configuration file 332.

In any case, the association between the following addresses (27-1) and (27-2) is deleted from the interface configuration file 332.

(27-1) The MAC address "00-23-26-9B-35-EF" of the network interface 320 of the node $N_{12}$.

(27-2) The IP address "192.168.254.3", which has been assigned to the network interface 320 of the node $N_{12}$.

When the assignment of the IP address "192.168.254.3" to the network interface 320 is released, the supply control unit 353 of the key region management unit 350c of the node $N_{12}$ then transmits an assignment instruction 734 in the next step S1312. Specifically, the assignment instruction 734 is also transmitted through the communication processing unit 330 and the network interface 320. In addition, although omitted due to space limitations in FIG. 21, the process in step S1312 may further include the establishment of a TCP connection between two communication endpoints identified by using two fixed IP addresses.

The source IP address of the assignment instruction 734 is the IP address "192.168.254.129", which is fixedly assigned to the node $N_{12}$. In addition, the destination IP address of the assignment instruction 734 is the IP address "192.168.254.136", which is fixedly assigned to the node $N_{19}$. Furthermore, the source port number is, for example, "7000", and the destination port number is, for example, "7000".

The TCP connection identified by the above-mentioned source IP address, source port number, destination IP address, and destination port number may be first established, and the assignment instruction 734 may be transmitted on this TCP connection.

The assignment instruction 734 includes the IP address "192.168.254.3" to be newly assigned to the node $N_{19}$, which is identified by the destination IP address of the assignment instruction 734. In the node $N_{19}$, the assignment instruction 734 is received by the acquisition control unit 352 of the key region management unit 350a through the communication processing unit 330.

Then, the acquisition control unit 352 performs the process for assigning the IP address "192.168.254.3" to the network interface 320 in step S609 in FIG. 14 according to the assignment instruction 734. That is, the acquisition control unit 352 instructs the association unit 354 to perform the assignment. Then, the association unit 354 directly rewrites the interface configuration file 332, or indirectly rewrites the interface configuration file 332 through the communication processing unit 330.

As a result, the MAC address of the network interface 320 of the node $N_{19}$ and the IP address "192.168.254.3" are associated with each other in the interface configuration file 332.

That is, the IP address "192.168.254.3" is assigned to the network interface 320 of the node $N_{19}$.

The above-described process in step S609 in FIG. 14 is indicated as step S1313 in FIG. 21. Although omitted in FIG. 21, the monitoring request unit 355 of the key region management unit 350a of the node $N_{19}$ then performs the process in step S610 in FIG. 14. In addition, if the termination condition is not satisfied in step S611, the node $N_{19}$ repeats again the processes in FIG. 14 from step S601.

On the other hand, in the node $N_{12}$, the key region management unit 350c corresponding to the key region $K_3$ deletes the entries corresponding to the key region $K_3$ from the local store 310 after the assignment of the IP address "192.168.254.3" is released in step S1311. Then, the key region management unit 350c deletes the key region management unit 350c itself by, for example, terminating the thread of the key region management unit 350c itself.

According to the operation sequence above illustrated in FIG. 21, the IP address "192.168.254.3" is not assigned to any node in a very short time period from step S1311 to step S1313. Therefore, if a packet whose destination IP address is "192.168.254.3" is transmitted during this time period, the packet is discarded and disappears.

However, for example, in the course of a certain process such as the timeout process with respect to a reply to this packet, the forcible deletion of an ARP entry, the broadcasting of an ARP request, etc. are performed. Since the time period from step S1311 to step S1313 is very short, it is expected that the assignment in step S1313 is completed by the time, for example, the ARP request is broadcast. That is, even if there is a time period in which the IP address "192.168.254.3" is not assigned to any node, the substantial availability of the distributed DB system is hardly degraded.

In addition, according to the procedure of steps S1311 through S1313 in FIG. 21, the conflict in which the IP address "192.168.254.3" is simultaneously assigned to two nodes $N_{12}$ and $N_{19}$ is avoided without fail. It is generally more undesired that a certain IP address is assigned simultaneously to a plurality of devices than that the certain IP address is not assigned to any device. Therefore, the procedure in steps S1311 through S1313 is preferable to avoid a problem.

Figure 22:
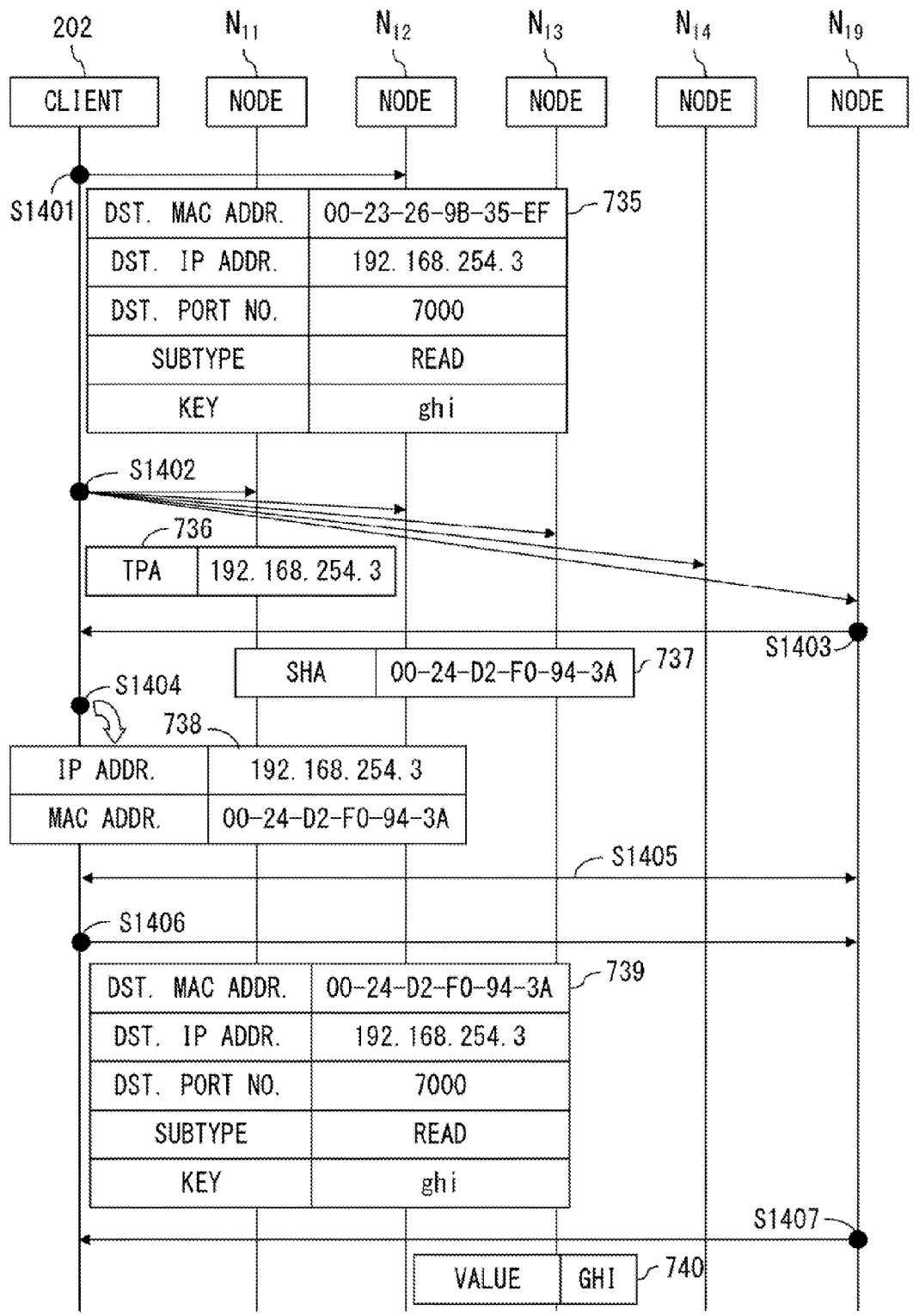
FIG. 22 is a sequence diagram that illustrates a request from a client and a reply from a newly added node.

Described below with reference to FIG. 22 is the operation sequence in which the new node $N_{19}$ replies to a DB access request from the client 202 after the IP address "192.168.254.3" is assigned to the new node $N_{19}$ as described above.

The operation sequence in FIG. 22 is based on the following assumptions (28-1) through (28-3).

(28-1) When the operation sequence in FIG. 22 is started, the ARP table 421 of the client 202 includes the ARP entry 719 created in step S1105 in FIG. 19 or the ARP entry 724 created in step S1204 in FIG. 20. As illustrated in FIGS. 19 and 20, the ARP entries 719 and 724 are the same in content.

(28-2) The TCP connection established in step S1106 in FIG. 19 or in step S1205 in FIG. 20 has actually been disconnected by releasing the assignment of the IP address in step S1311 in FIG. 21. Nevertheless, when the operation sequence in FIG. 22 is started, the communication processing unit 420 of the client 202 recognizes that the TCP connection established in step S1106 in FIG. 19 or in step S1205 in FIG. 20 is still being established. This is because neither the client 202 nor the node $N_{12}$ has transmitted a FIN/ACK segment, and the keep-alive operation at the TCP level is not performed in the present embodiment. Therefore, when the operation sequence in FIG. 22 is started, the communication processing unit 420 of the client 202 does not recognize the disconnection of the TCP connection.

(28-3) The key region to which the key "ghi" belongs is the key region $K_3$, which is identified by the index "3".

Under the assumptions (i.e., suppositions) (28-1) through (28-3), the application 440 of the client 202 first instructs the DB request processing unit 430 to perform the reading operation, while specifying the key "ghi". Then, the DB request processing unit 430 starts the process illustrated in FIG. 11. According to the assumption (28-3) and FIG. 8, the "first communication endpoint" specified in step S302 in FIG. 11 is specifically the communication endpoint identified by the communication endpoint information "192.168.254.3:7000".

The DB request processing unit 430 instructs the communication processing unit 420 to transmit a read request to the "first communication endpoint" in step S302 in FIG. 11. Then, the communication processing unit 420 confirms whether or not there is a TCP connection. According to the assumption (28-2), the communication processing unit 420 recognizes that there is a TCP connection, and tries to transmit a read request 735 on the established TCP connection. The transmission of the read request 735 is indicated as step S1401 in FIG. 22.

In the context of transmitting a data segment of the read request 735, the process in FIG. 9 is called. According to the assumption (28-1), an entry corresponding to the IP address "192.168.254.3" is found in the search in step S102 in FIG. 9. Therefore, in step S104, the MAC address "00-23-26-9B-35-EF" registered in the found entry is specified as the destination MAC address of the frame of the read request 735 as illustrated in FIG. 22.

The frame of the read request 735 is received by the network interface 320 of the node $N_{12}$ according to the destination MAC address, and outputted to the communication processing unit 330 of the node $N_{12}$. However, the assignment of the IP address "192.168.254.3" to the network interface 320 of the node $N_{12}$ identified by the MAC address "00-23-26-9B-35-EF" has already been released (i.e., cancelled) in step S1311 in FIG. 21.

Therefore, the communication processing unit 330 of the node $N_{12}$ judges that the destination IP address of the read request 735 is not an IP address of the node $N_{12}$, and thus discards the read request 735. Therefore, no reply to the read request 735 is returned to the client 202.

On the other hand, the DB request processing unit 430 of the client 202 waits for the reception of a reply to the read request 735 as indicated by step S303 in FIG. 11. Note that the situation in which no reply to the read request 735 is returned to the client 202 is similar to the situation in which no reply to the read request 715 transmitted in step S1101 in FIG. 19 is returned to the client 202.

Therefore, although the detailed explanation is omitted, an ARP request 736 is broadcast also in step S1402 in FIG. 22 as with the flow of the processes in steps S1101 through S1103 in FIG. 19. In FIG. 22, the retransmission performed by the TCP module of the communication processing unit 420 of the client 202 and the forcible deletion of the ARP entry 719 (or the ARP entry 724) are omitted.

The IP address "192.168.254.3" is specified as the TPA in the ARP request 736, which is transmitted in step S1402. Upon receipt of the ARP request 736, each device in the broadcast domain 200 in FIG. 3 operates according to FIG. 10.

As a result, as indicated by step S1403 in FIG. 22, an ARP reply 737 is transmitted from the node $N_{19}$ because the IP address "192.168.254.3" is currently assigned to the network interface 320 of the node $N_{19}$ as indicated in step S1313 in FIG. 21.

The MAC address "00-24-D2-F0-94-3A" of the network interface 320 of the node $N_{19}$ is specified as the SHA in the ARP reply 737. The ARP reply 737 is received by the client 202.

The reception of the ARP reply 737 corresponds to step S106 in FIG. 9. Therefore, as indicated by step S107 in FIG. 9, the ARP table 421 is updated in the client 202, which has received the ARP reply 737.

Specifically, as indicated by step S1404 in FIG. 22, a new ARP entry 738 is added to the ARP table 421 of the client 202. The ARP entry 738 associates the IP address "192.168.254.3" and the MAC address "00-24-D2-F0-94-3A" with each other. As described above, the old ARP entry 719 or 724 is replaced with the new ARP entry 738.

When the ARP entry 738 is added in step S1404 in FIG. 22 corresponding to step S107 in FIG. 9 as described above, the client 202 then searches the ARP table 421 in step S102 in FIG. 9 again. As a result, the newly added ARP entry 738 is found.

The details of the course from step S1401 to step S1402 are omitted above, but they are similar to those of the flow of the processes in steps S1101 through S1103 in FIG. 19. Therefore, as well as the TCP connection is established in step S1106 after the ARP entry 719 is added in step S1105 in FIG. 19, a TCP connection is established also in step S1405 in FIG. 22.

Specifically, after the ARP entry 738 is added in step S1404, the TCP module of the communication processing unit 420 of the client 202 transmits a SYN segment whose destination IP address is the IP address "192.168.254.3". Then, the SYN segment is received by the node $N_{19}$, and the node $N_{19}$ transmits a SYN/ACK segment. The client 202 receives the SYN/ACK segment, and transmits an ACK segment.

As described above, the TCP connection is established by the three-way handshake between the communication endpoint on the client 202 and the communication endpoint that is on the node $N_{19}$ and is identified by the communication endpoint information "192.168.254.3:7000". Then, a read request is retransmitted on the TCP connection thus established in step S1405.

Specifically, the communication processing unit 420 of the client 202 starts the process in FIG. 9 in order to transmit a data segment of the read request, which has been specified by the DB request processing unit 430 and has triggered the transmission in step S1401. Then, as a result of the search in step S102 in FIG. 9, the added ARP entry 738 is found.

Therefore, a frame of a read request 739 is transmitted in step S104. The thus performed step S104 is indicated as step S1406 in FIG. 22.

The frame of the read request 739 is different in its destination MAC address from the frame of the read request 735. That is, the destination MAC address of the read request 739 is "00-24-D2-F0-94-3A". However, the destination IP address, destination port number, subtype, key, etc. are the same between the read requests 735 and 739.

Then, the read request 739 is received by the node $N_{19}$. Then, the node $N_{19}$ operates according to FIG. 13. As a result, in step S1407 in FIG. 22 corresponding to step S504 in FIG. 13, a read reply 740 including the value "GHI" corresponding to the specified key "ghi" is transmitted from the node $N_{19}$ to the client 202.

The read reply 740 is received by the network interface 410 of the client 202, and outputted to the DB request processing unit 430 through the communication processing unit 420. In addition, the length of the predetermined time period TO_db in FIG. 11 is appropriately determined in advance based on some constants such as the constants (23-1) and (23-2) as described above relating to FIG. 19. Therefore, the DB request processing unit 430 of the client 202 is able to receive the read reply 740 within the predetermined time period TO_db. Therefore, the process in FIG. 11 performed by the client 202 proceeds from step S303 to step S304. Then, the DB request processing unit 430 returns the value "GHI" obtained from the read reply 740 to the application 440.

The behavior of the entire distributed DB system under some specific conditions has been described above with reference to FIGS. 17 through 22. According to the flowcharts in FIGS. 9 through 16, it is obvious that the distributed DB system also works well under other conditions.

For example, when the client 202 transmits a write request, not a read request, the distributed DB system also works well. In addition, not the node $N_{19}$ newly added as illustrated in FIG. 21, but the existing node (for example, the node $N_{15}$) may take over the key region $K_3$ (to be more specific, the communication endpoint identified by the IP address "192.168.254.3") from the node $N_{12}$. Also in this case, the takeover is successfully performed as in FIG. 21.

The flowcharts in FIGS. 14 and 15 include the processes of judging whether or not a reply is received within a predetermined time period. The length of the predetermined time period may be arbitrarily defined depending on the embodiments. In addition, it also depends on the embodiments whether the transport layer or the application layer is responsible for controlling the retransmission and the forcible deletion of an ARP entry and thereby triggering the re-establishment of a TCP connection. The explanation of FIGS. 18 and 21 indicates a mere example of the implementation.

How to use the TCP connection also depends on the embodiments.

Specifically, for example, transmission and reception of a request and a reply to it may be repeated plural times on a once established TCP connection. By so doing, the influence of the overhead due to the establishment of a TCP connection is reduced, for example, when the client 202 transmits many DB access requests.

However, depending on the embodiments, a TCP connection between two communication endpoints may be established only for one request and the reply to the request, and may be closed in the normal procedure after the transmission of the reply.

Furthermore, in the example in FIG. 21, the TCP connection between the node $N_{12}$ and the node $N_{19}$ is closed in step S1310 before the assignment of the IP address is released (i.e., cancelled) in step S1311. However, depending on the embodiments, one or more other TCP connections may also be closed before step S1311. That is, the node $N_{12}$ may close every TCP connection between the communication endpoint on another device and the communication endpoint that is on the node $N_{12}$ and that is identified by the communication endpoint information including the IP address "192.168.254.3" to be taken over by the node $N_{19}$.

The process (i.e., the transition) from step S1 to step S2 in FIG. 1 corresponds to the takeover according to the flowchart in FIG. 14 or 15. That is, the operation sequence sequentially illustrated in FIGS. 18 and 19, the operation sequence sequentially illustrated in FIGS. 18 and 20, and the operation sequence sequentially illustrated in FIGS. 21 and 22 are examples of the change from step S1 to step S2 in FIG. 1. Described below is the relationship between FIG. 1 and FIGS. 14 through 22.

The target communication endpoint in FIG. 15 is a communication endpoint identified by one of two or more pieces of the communication endpoint information that are associated with a target subset which is one of the mutually disjoint plural subsets $K_0$ to $K_{M-1}$ of the domain K of the keys. In addition, the process in FIG. 15 includes transmitting a keep-alive message in which the communication endpoint information that identifies the target communication endpoint is specified as the destination, and monitoring the reply to the keep-alive message. Furthermore, the process in FIG. 15 includes recognizing the occurrence of a failure in a first other computer when no reply is returned within the predetermined time period TO_keepalive. The "first other computer" is specifically a computer provided with a network interface associated with the communication endpoint information specified as the destination of the keep-alive message.

Assume that the process in FIG. 15 is executed by the computer 100b in FIG. 1. Under this assumption, the change from step S1 to step S2 in FIG. 1 corresponds to the takeover that is in accordance with the flowchart in FIG. 15 and that is performed in the case where the above-mentioned "target subset" is the particular subset Ka illustrated in FIG. 1, and the computer 100b recognizes the occurrence of the failure.

That is, the destination of the keep-alive message is the communication endpoint information Pa in FIG. 1. Therefore, the above-mentioned "first other computer" is the computer 100a in FIG. 1 as a monitoring target. In the following description, let a "second other computer" be a computer provided with a network interface that is associated with a certain piece of the communication endpoint information, where the certain piece of the communication endpoint information is one of two or more pieces of the communication endpoint information that are associated with the subset Ka, and the certain piece of the communication endpoint information is not specified as the destination of the keep-alive message.

Upon recognition of the occurrence of a failure in the computer 100a, the computer 100b in FIG. 1 acquires the entries 102 in FIG. 1 whose keys belong to the subset Ka as in steps S706 through S710 in FIG. 15. That is, the computer 100b requests the "second other computer" to read and transmit the entries 102, and receives the entries 102 from the "second other computer". For example, in the example in FIG. 18, the node $N_{13}$ corresponds to the "first other computer" (that is, the computer 100a in FIG. 1), the node $N_{12}$ corresponds to the computer 100b in FIG. 1, and the node $N_{14}$ corresponds to the "second other computer".

Meanwhile, FIG. 14 indicates an example of the case in which the computer 100b does not exist at the time point of step S1 in FIG. 1. That is, when the computer 100b is newly added and performs the process in FIG. 14, the situation changes from step S1 to step S2 in FIG. 1.

Step S601 in FIG. 14 corresponds to a step in which the computer 100b determines the particular communication endpoint information Pa by selecting one of a predetermined number of pieces of the communication endpoint information as the particular communication endpoint information Pa, which is associated with the particular subset Ka in FIG. 1. However, depending on some embodiments, the computer 100b that performs the process in FIG. 14 may receive an instruction that specifies the communication endpoint information Pa, thereby determining the communication endpoint information Pa.

For example, the deployment server 201 in FIG. 3 may further collect the information about the load of each node from each node in the distributed DB system. Then, the deployment server 201 may issue, to the computer 100b in FIG. 1, an instruction that specifies the communication endpoint information Pa according to the collected information. For example, if the load of the computer 100a is heavy, the deployment server 201 may specify the communication endpoint information Pa, which is being associated with the network interface Ia of the computer 100a by the dynamic association information 112 at the time of step S1 in FIG. 1.

In any case, in FIG. 14 as an example of FIG. 1, the computer 100b not existing in step S1 in FIG. 1 is first newly added, and then the computer 100b in FIG. 1 determines the communication endpoint information Pa in step S601 in FIG. 14. Then, the computer 100b acquires the entries 102 by receiving the entries 102 from a "third other computer" provided with the network interface Ia associated with the communication endpoint information Pa.

That is, the above-mentioned "third other computer" corresponds to the computer 100a in FIG. 1. Specifically, the computer 100b requests the computer 100a to read the entries 102 from the memory 101a included in the computer 100a and to transmit the entries 102. As a result, the computer 100b receives the entries 102 as described above.

In the example in FIG. 21, the node $N_{19}$ corresponds to the computer 100b in FIG. 1 that performs the process in FIG. 14, and the node $N_{12}$ corresponds to the computer 100a in FIG. 1 as the above-described "third other computer".

After step S2 in FIG. 1, the computer 100b may transmit the entries 102 to a "fourth other computer" in response to a request from the "fourth other computer". The "fourth other computer" is specifically a computer provided with one of the plurality of memories that store the DB in a distributed manner. Then, the computer 100b may further release (i.e., cancel) the association between the communication endpoint information Pa and the network interface Ib of the computer 100b.

For example, in the example in FIG. 18, the node $N_{12}$ corresponds to the computer 100b in FIG. 1 as described above. In this context, also in FIG. 21, let's regard the node $N_{12}$ as corresponding to the computer 100b in FIG. 1. Thus, the "fourth other computer" in the example in FIG. 21 is the node $N_{19}$. In addition, the process in step S1309 in FIG. 21 corresponds to the transmission of the entries 102, and step S1311 corresponds to the release of the association between the communication endpoint information Pa and the network interface Ib.

Furthermore, the computer 100b may notify the "fourth other computer" that the association is released. The transmission of the assignment instruction 734 in step S1312 in FIG. 21 also serves as a notification that the association is released. This is because the assignment of the IP address "192.168.254.3" to the network interface 320 of the node $N_{19}$ is allowed only after the association between the IP address "192.168.254.3" and the network interface 320 of the node $N_{12}$ is released in the node $N_{12}$. Accordingly, the assignment instruction 734 implies that the association has been released in the node $N_{12}$.

The present invention is not limited to the embodiments above. Some modifications have been described above, but the embodiments above may be further modified from the following viewpoints, for example. In addition, each of the modifications described above and below may be arbitrarily combined with another of them unless they are inconsistent with one another.

Some processes in the embodiments above include the comparison with a threshold. For example, in step S606 in FIG. 14, the time period in which the node 300 performing the process of FIG. 14 waits for a reply is compared with the predetermined time period TO_bulk. Depending on the embodiments, the comparison with the threshold may be the process of judging whether or not the value to be compared exceeds the threshold, or may be the process of judging whether or not the value to be compared is equal to or exceeds the threshold.

In addition, in the explanation above, some specific values are exemplified relating to the thresholds, the IP addresses, the port numbers, the MAC addresses, etc., but these specific values are provided only for convenience of explanation.

Furthermore, the value of M, which appears in formula (1) etc. and means the number of key regions, is also arbitrary depending on the embodiments. In the correspondence table 601 in FIG. 8, for convenience of illustration, a relatively small value of M, namely 16, is exemplified. However, there may be a case where M=128 as indicated by formula (8), for example. A further larger value may also be used as M.

However, it is preferable that the number M of the key regions is about three through ten times larger than the number of physical nodes. This is because the load may possibly be too unbalanced among the nodes if the number M of the key regions is too small.

For example, assume that the number of nodes is 16, and that each key region is associated with three communication endpoints as in the correspondence table 601 in FIG. 8. In addition, for simple explanation, it is assumed that the number of entries and the access frequency are well balanced among the key regions. Under the assumptions above, the comparison between the case where M=16 and the case where M=128 is described below.

For example, when M=16, a total of 48 (=3M) communication endpoints are dynamically assigned to 16 nodes. Therefore, each node is responsible for 3 (=48/16) key regions on average.

Assume that a certain node becomes faulty, and that another node which has been responsible for three key regions takes over one communication endpoint from the faulty node. In this case, the load of the latter node, which is responsible for four communication endpoints as a result of the takeover, is 4/3 times (that is, about 1.33 times) larger than the load of any one of other nodes which are each responsible for three communication endpoints on average.

On the other hand, when M=128, a total of 384 (=3M) communication endpoints are dynamically assigned to 16 nodes. Therefore, each node is responsible for 24 (=384/16) key regions on average.

Assume that a certain node becomes faulty, and that another node which has been responsible for 24 key regions takes over one communication endpoint from the faulty node. In this case, the load of the latter node, which is responsible for 25 communication endpoints as a result of the takeover, is 25/24 times (that is, about 1.04 times) larger than the load of any one of other nodes which are each responsible for 24 communication endpoints on average.

As well understood from the examples above, the smaller the number M of the key regions is, at the coarser granularity the loads are distributed to the nodes. Therefore, the smaller the number M of the key regions is, the larger the load imbalance among the nodes tends to be. Therefore, to reduce the load imbalance, it is preferable that the number M of the key regions is, for example, about three through ten times larger than the number of physical nodes.

In the embodiments above, the keep-alive message is a control message that is different from the DB access request. However, there may be an embodiment in which a DB access request is used as a keep-alive message.

For example, when the node $N_{12}$ monitors the node $N_{13}$ as in FIG. 18, the node $N_{12}$ may transmit, to the node $N_{13}$, a write request in which a pair of appropriately selected key and value is specified. The node $N_{12}$ may then monitor a reply from the node $N_{13}$. Then, the node $N_{12}$ may recognize that the node $N_{13}$ is faulty if no reply is received from the node $N_{13}$ within a predetermined time period.

Upon receipt of a reply from the node $N_{13}$ within the predetermined time period, the node $N_{12}$ may further transmit, to the node $N_{13}$, a read request in which the same key as that specified in the write request above. The node $N_{12}$ may then monitor a reply from the node $N_{13}$. If no reply is received within the predetermined time period from the node $N_{13}$, the node $N_{12}$ may recognize that the node $N_{13}$ is faulty.

When the node $N_{12}$ receives a reply from the node $N_{13}$ within the predetermined time period, the node $N_{12}$ may compare the value included in the reply to the read request with the value specified in the write request. Then, the node $N_{12}$ may recognize that the node $N_{13}$ is normal if the two values are equal to each other, and may recognize that the node $N_{13}$ is faulty if the two values are different.

A failure that occurs, for example, only within the read/write processing unit 351 is also detectable according to the embodiment in which the write request and the read request, in both of which the same key is specified, are used instead of the keep-alive message as described above.

Furthermore, in the process in FIG. 14, two types of control messages, that is, the takeover proposition and the takeover request, are used. However, according to some embodiments, one type of control message serving as both a takeover proposition and a takeover request may be used. In this case, the following reply (29-1) or (29-2) is returned.

(29-1) A reply serving as an ACK reply to a takeover proposition and also serving as a takeover reply to a takeover request.

(29-2) A reply similar to a NACK reply to a takeover proposition.

Incidentally, the correspondence table 601 is exemplified in FIG. 8 as a specific example of the correspondence table 340 in FIG. 5 and also as a specific example of the correspondence table 431 in FIG. 6. The IP addresses exemplified in the correspondence table 601 are all private IP addresses. However, global IP addresses are also available.

For example, when a plurality of nodes are distributed to different network segments as illustrated in FIG. 4, global IP addresses may be used. For example, for convenience of explanation, the following assumptions (30-1) through (30-4) are used.

(30-1) The range of global IP addresses to be assigned to the devices in the broadcast domain 230 in FIG. 4 is "200.1.2.0/24".

(30-2) In this range, 24 IP addresses "200.1.2.1" through "200.1.2.24" are available as the IP addresses used for the communication endpoint information appearing in the correspondence tables 340 and 431.

(30-3) The range of global IP addresses to be assigned to the devices in the broadcast domain 240 is "200.1.3.0/24".

(30-4) In this range, 24 IP addresses "200.1.3.1" through "200.1.3.24" are available as the IP addresses used for the communication endpoint information appearing in the correspondence tables 340 and 431.

Under the assumptions (30-2) and (30-4), 48 communication endpoints are defined using a total of 48 IP addresses. Therefore, according to the assumptions (30-2) and (30-4), it is possible to associate three communication endpoints with each of the 16 key regions as with the correspondence table 601.

It is only a coincidence that the same number of IP addresses are defined in the assumptions (30-2) and (30-4).

Depending on the environment, for example, 30 IP addresses in the range "200.1.2.0/24" and 18 IP addresses in the range "200.1.3.0/24" may be used.

In the example in FIG. 3 where the correspondence table 601 is used, the 48 IP addresses appearing in the correspondence table 601 are assignable to any of the nodes $N_{11}$ through $N_{28}$ in the broadcast domain 200 in FIG. 3. However, under the assumptions (30-1) through (30-4), the assignment of the IP addresses is restricted.

Specifically, under the assumptions (30-1) and (30-3), the 24 IP addresses described in the assumption (30-2) are assignable to the nodes $N_{22}$ through $N_{23}$ in FIG. 4, but are not allowed to be assigned to the nodes $N_{24}$ and $N_{25}$. In addition, under the assumptions (30-1) and (30-3), the 24 IP addresses described in the assumption (30-4) are assignable to the nodes $N_{24}$ and $N_{25}$, but are not allowed to be assigned to the nodes $N_{21}$ through $N_{23}$.

In the embodiment in which the assignment of the IP addresses is thus restricted, the processes in FIGS. 14 through 16 are modified to satisfy the restriction.

Specifically, step S601 in FIG. 14 is modified so as to select one of the communication endpoints each identified by an IP address assignable to the node 300 that performs the process in FIG. 14. For example, when the node $N_{22}$ performs the process in FIG. 14, a communication endpoint identified by one of the IP addresses described in the assumption (30-2) is selected in step S601.

In addition, the processes in FIGS. 14 through 16 may be modified so as to satisfy the condition that the IP address of the target communication endpoint in FIG. 15 is an IP address assignable to the node 300 that performs the process in FIG. 15.

Specifically, the processes in FIGS. 14 through 16 may be modified as indicated in the following items (31-1) through (31-3).

(31-1) Step S610 in FIG. 14 is modified so as to select the destination of a monitoring request from among other nodes to which an IP address assignable to the node 300 that performs the process in FIG. 14 is also assignable. For example, when the node $N_{22}$ performs the process in FIG. 14, the destination of the monitoring request is selected from between the node $N_{21}$ and the node $N_{23}$.

(31-2) Step S712 in FIG. 15 is modified so as to select the destination of a monitoring request from among other nodes to which an IP address assignable to the node 300 that performs the process in FIG. 15 is also assignable. For example, when the node $N_{22}$ performs the process in FIG. 15, the destination of the monitoring request is selected from between the node $N_{21}$ and the node $N_{23}$.

(31-3) Step S809 in FIG. 16 is modified so as to select the destination of a monitoring request from among other nodes to which an IP address assignable to the node 300 that performs the process in FIG. 16 is also assignable. For example, when the node $N_{22}$ performs the process in FIG. 16, the destination of the monitoring request is selected from between the node $N_{21}$ and the node $N_{23}$.

Otherwise, instead of the modifications as described in the above items (31-1) through (31-3), the processes in and after step S706 in FIG. 15 may be modified as indicated in the following items (32-1) through (32-3) below.

(32-1) The step of judging whether or not the IP address of the target communication endpoint is assignable to the node 300 that performs the process in FIG. 15 is added before step S706.

(32-2) When it is judged, in the added step described in the item (32-1), that the IP address of the target communication endpoint is assignable to the node 300 that performs the process in FIG. 15, the processes in and after step S706 are performed.

(32-3) If it is judged, in the added step described in the item (32-1), that the IP address of the target communication endpoint is not allowed to be assigned to the node 300 that performs the process in FIG. 15, the processes in and after step S706 are not performed. Instead, the node 300 selects another node to which the IP address of the target communication endpoint is assignable, and notifies the selected node that a failure has occurred in the target communication endpoint. Then, instead of the node 300, the notified node performs the processes in steps S706 through S713.

Provided below is further detailed description about access to the node 300 from the client 400 (such as the client 220 in FIG. 3 and the client PC 260 in FIG. 4) that belongs to a broadcast domain different from the broadcast domain to which the node 300 belongs.

In the embodiment in which there may occur access from the client 400 that belongs to a broadcast domain different from the broadcast domain to which the node 300 belongs, global IP addresses are used as IP addresses included in pieces of the communication endpoint information dynamically assigned to the nodes. That is, the IP addresses appearing in the correspondence table 340 in the node 300 as well as appearing in the correspondence table 431 in the client 400 are global IP addresses. Therefore, the destination IP address of a DB access request transmitted by the client 400 is a global IP address.

For example, assume that the assumptions (30-1) through (30-4) hold true, and also assume that the global IP address "200.1.2.10" is assigned to the network interface 320 of the node $N_{21}$ in FIG. 4 at a certain time point. In addition, assume that the client PC 260 in FIG. 4 transmit a DB access request in which a key belonging to the key region corresponding to this global IP address "200.1.2.10" is specified. Then, the DB access request is transmitted to the node $N_{21}$ through the Internet 250 and the router 231.

Specifically, the DB access request is transmitted to the router 231 through the Internet 250 based on the network address part of the IP address "200.1.2.10". Then, unless there is still an obsolete entry, which is inconsistent with the current situation, in the ARP table of the router 231, the DB access request is transmitted from the router 231 to the node $N_{21}$ correctly.

The router 231 may update its ARP table by transmitting an ARP request from the router 231 itself and receiving an ARP reply to the ARP request. In addition, the router 231 may also update its ARP table by receiving an ARP request transmitted by another device in the broadcast domain 230.

Therefore, in many cases, the ARP table of the router 231 reflects the situation how the IP addresses described in the assumption (30-2), namely the IP addresses to be dynamically assigned, are currently assigned to the nodes $N_{21}$ through $N_{23}$ in the broadcast domain 230.

However, there may occasionally be a case in which an obsolete entry inconsistent with the current situation remains in the ARP table of the router 231. In this case, the DB access request is discarded in the broadcast domain 230, and thus the client PC 260 is unable to receive a DB access reply. However, the obsolete entry disappears some time from the ARP table of the router 231. Therefore, the client PC 260 may time out, may then wait for an appropriate time period, and may retransmit the DB access request.

As another example, each of the nodes $N_{21}$ through $N_{23}$ (that is, the node 300 in FIG. 5) may operate as follows in order to enable the ARP table of the router 231 to be surely updated each time the assignment of the IP addresses to the nodes $N_{21}$ through $N_{23}$ changes. That is, each time the association unit 354 performs the process of associating a new IP address with the network interface 320, the communication processing unit 330 may transmit an ARP request.

Specifically, the communication processing unit 330 may set the new IP address in both the TPA (target protocol address) and the SPA (sender protocol address), set the MAC address of the network interface 320 in both the THA (target hardware address) and the SHA (sender hardware address), and transmit the ARP request. For example, the association unit 354 may instruct the communication processing unit 330 to transmit the above-mentioned ARP request. For more details, the association unit 354 may instruct the communication processing unit 330 to transmit the above-mentioned ARP request each time the association unit 354 performs the process in step S609 in FIG. 14 or the process in step S711 in FIG. 15.

If a device (for example, the router 231) which has received the above-mentioned ARP request has an entry corresponding to the IP address specified in the SPA in its ARP table, the device update the entry. Therefore, by each of the nodes $N_{21}$ through $N_{23}$ operating as described above, an obsolete entry in the ARP table of the router 231 is surely updated each time the assignment of the IP addresses to the nodes $N_{21}$ through $N_{23}$ changes.

As a result, the DB access request transmitted by the client PC 260 is correctly forwarded to the destination node 300 (for example, the node $N_{21}$ in the example above) by the router 231. Consequently, the destination node 300 replies to the DB access request, and therefore the client PC 260 is able to receive a DB access reply.

Obviously, the ARP request in which the same new IP address is specified in both the TPA and the SPA as described above may be similarly transmitted also in the embodiment of the network environment illustrated in FIG. 3. The above-mentioned ARP request enables the change in the association between the network interface and the communication endpoint to be quickly reflected in the ARP table. Therefore, the transmission of the above-mentioned ARP request has the effect of shortening the average latency of the DB access.

In addition, in the embodiment above, it is mainly assumed that the Ethernet is used in the link layer, the IP is used in the Internet layer, and the TCP is used in the transport layer. However, a communication protocol(s) may be changed according to an embodiment.

For example, the UDP may be used in the transport layer. In this case, the modules operating in the application layer (for example, the key region management units 350a through 350c and the monitoring unit 360 in FIG. 5, the DB request processing unit 430 in FIG. 6, etc.) may be modified as described in the following items (33-1) and (33-2).

(33-1) The modules may be modified so as to realize a connection-based session management function similar to that provided by the TCP.

(33-2) The modules may be modified so as to be responsible for clearing the ARP cache when an IP address is dynamically re-assigned.

In addition, the standards other than the Ethernet standard are also available. For example, InfiniBand, the VI architecture (virtual interface architecture), etc., which are used as the interconnect between servers in a server cluster, may be used in the communications between the nodes and the communications between the node and the client. That is, any protocol (or any protocol suite) other than those exemplified above is available so far as it provides a mechanism to associate a physical network interface and a logical communication endpoint with each other. The communication processing unit 330 of the node 300 and the communication processing unit 420 of the client 400 may be appropriately implemented depending on the actually used protocol (or protocol suite).

Various embodiments are described above; each of them has the effect of simplifying the mechanism in the application layer for tracking (i.e., following) the change in state that may arise when a DB is distributed to and stored in memories, each of which is included in each of a plurality of nodes.

The reason for such an effect is that not direct and dynamic association, but indirect association is used to manage which of the subsets $K_0$ to $K_{M-1}$ in the domain K of the keys each node (that is, the memory of each node) corresponds to. To be more specific, the explanation is given as follows.

In the embodiments above, a subset and communication endpoint information are statically associated with each other. Furthermore, the communication endpoint information thus statically associated with the subset is further dynamically associated with a network interface (that is, the network interface of a node) for providing access to a memory storing entries of a DB. As a result, the subset and the memory are indirectly associated with each other.

A change in state that may arise in the distributed DB system is a change in node configuration, that is, a change in the above-mentioned indirect association between the memory of an individual node and a subset in the domain of keys. In addition, the association between the subset and the communication endpoint information is used in indirectly associating the memory and the subset with each other, but does not have to be tracked because it is static, as indicated by the static association information 111, regardless of the change in state. Accordingly, so far as tracking the change of the association between the communication endpoint information and the network interface is realized (n.b., this association is used in the indirect association between the memory and the subset), tracking the change in state in the distributed DB system is also realized.

In addition, the use of a certain communication protocol (for example, the ARP) implemented in the layer lower than the application layer makes it possible to track the change of the association between the communication endpoint information and the network interface. For example, the dynamic association information 112 in FIG. 1 may be realized by the ARP table, and tracking the change of the dynamic association information 112 may be realized by the ARP.

Thus, according to the embodiments above, the process for tracking (i.e., following) the dynamic change in the node configuration is mostly encapsulated (i.e., hidden) in the layer(s) lower than the application layer. That is, according to the embodiments above, a complicated protocol etc. in the application layer for exchange of control information among the nodes is not required.

Therefore, according to the embodiments above, the use of a certain communication protocol such as the ARP etc. implemented in the layer lower than the application layer makes it possible to track the change in state in the distributed DB system. In addition, according to the embodiments above, the use of the existing communication protocol in the lower layer such as the ARP etc. makes it possible to greatly simplify the mechanism in the application layer for tracking the change in state in the distributed DB system.

Furthermore, the various embodiments above each have the effect of reducing the cost for tracking the change in state that may arise when a DB is distributed to a plurality of memories. There are various types of costs for tracking the change of the node configuration in the distributed DB system due to the addition, deletion, etc. of the node. For example, there are various types of costs such as the processing load in each node, the communication load between the nodes, the communication load between the node and the client, the complexity of the communication protocol, the amount of pieces of information that are held by individual nodes and the clients for administrative purposes, etc. According to the embodiments above, these various costs are reduced for the following reasons.

First, the range of entries that a node stores in its memory (i.e., the key region for which the node is responsible) and a communication endpoint are statically associated with each other by the static association information 111 in FIG. 1 (to be more specific, by the correspondence tables 340 and 431). The cost of the static association is very low because it costs very little to once store the static association information 111 (for example, to copy the correspondence table 601 in FIG. 8 from the deployment server 201 in FIG. 3 to the node 300 in FIG. 5), and no maintenance cost is required.

In addition, as understood from the example of the correspondence table 601 in FIG. 8, the data amount of the static association information 111 is of linear order with respect to the number M of the key regions, and the number M of the key regions is a constant which is not very large. Therefore, relating to the static association information 111, the cost in the sense of the data amount is also low.

Second, since the consistent hashing is realized, the processing load due to the change in node configuration is also reduced.

Generally, in a large distributed DB system including a large number of nodes, it is not rare that at least one node is faulty. This is because the number of nodes is large. In addition, one of the great merits of the distributed DB system is the scalability that increasing the number of nodes (i.e., scaling out) makes it possible to cope with the increase in the data amount. Therefore, in the distributed DB system, a change in node configuration due to the increase or decrease in the number of nodes may frequently arise.

On the other hand, the processing load for changing a key region for which a node is responsible (that is, the processing load for the redistribution of data among the nodes) is not light if the data amount is large. This is because there arises the process of reading a large amount of data from a memory and transmitting the read data, and there also arises the process of receiving such a large amount of data and writing the received data to a memory.

Therefore, the performance of the entire distributed DB system may be largely degraded if each change in node configuration always causes multiple nodes which are not directly involved in this change to alter the key regions in their charge. Therefore, it is preferable to provide a mechanism to prevent most nodes from altering the key regions in their charge even if the node configuration changes. Specifically, it is preferable to realize the consistent hashing.

In the distributed DB system according to the present embodiment, the consistent hashing is realized as clearly illustrated particularly in FIGS. 14 through 16, 18, and 21. That is, even if the number of nodes changes (e.g., even if a new node is added or an existing node is isolated from the distributed DB system for any reason such as a failure etc.), it is sufficient that only a few of all the nodes in the distributed DB system change the key regions in their charge. In addition, when the correspondence between nodes and key regions changes for any purpose such as the correction of the load imbalance among the nodes etc., only a few of all the nodes in the distributed DB system change the key regions in their charge.

Thus, according to the embodiments above, a preferable condition for the distributed DB system, that is, the consistent hashing, is satisfied. Therefore, the processing load for the redistribution of the data among the nodes is low.

Third, since tracking a change in node configuration is realized by using a relatively simple protocol such as the ARP etc., the cost in the sense of the complexity of the protocol is also low.

Without a complicated and dedicated protocol which requires the exchange of a large number of control messages, a change in node configuration is trackable (i.e., followable) according to the embodiments above. That is, the use of the ARP tables 331 and 421 as the dynamic association information 112 in FIG. 1 to realize tracking the change in node configuration makes it possible to reduce the cost in the sense of the complexity of the protocol.

Since no complicated protocol is required in the application layer, the embodiments above each have the effect of reducing the burden of programming and debugging imposed on a programmer who develops a distributed DB system. That is, according to the embodiments above, part of the mechanism to realize tracking the change in node configuration in the distributed DB system is encapsulated (i.e., hidden) in the layer lower than the application layer. As a result, a burden imposed on the programmer to develop the application of the distributed DB system according to any embodiment above is lighter than that imposed on him/her to develop a system in which a complicated protocol is used in the application layer.

Fourth, relating to the dynamic association information 112, the cost in the sense of the data amount is also low.

The number of entries held in each of the ARP tables 331 and 421 only for the distributed DB system according to the embodiments above is at most the number of IP addresses dynamically assigned depending on the correspondence between the key regions and the nodes. Specifically, the data amount increased in each of the ARP tables 331 and 421 only for the distributed DB system according to the embodiments above is of linear order with respect to the number M of the key regions, and the number M of the key regions is the constant not exceedingly large. Therefore, relating to the dynamic association information 112, the cost in the sense of the data amount is also low.

Fifth, part of the cost for tracking (i.e., following) the change in node configuration is absorbed by a process performed regardless of whether the node configuration changes or not. Therefore, the cost reduction for the absorbed cost is realized. The details are described as follows.

In the embodiments above, the change in node configuration is tracked by dynamically associating a node (for more details, the network interface of the node) and a communication endpoint with each other. In addition, the dynamic association between the node and the communication endpoint is performed by any computer with the network communication function regardless of whether the node configuration changes or not. That is, the correspondence between the network interface of the node and the communication endpoint is repeatedly confirmed and memorized regardless of whether the node configuration changes or not.

For example, since a lifetime is set for each ARP entry, an ARP request is transmitted again and again regardless of whether the node configuration changes or not. As a result, the correspondence between the MAC address and the IP address is repeatedly confirmed and stored in the ARP table again.

That is, according to the embodiments above, the process routinely performed even if the node configuration is not changed is also used as the mechanism for making it possible to track (i.e., to follow) the change in node configuration.

Therefore, the processing load newly caused only for making it possible to track the change in node configuration is relatively light. To be more specific, refer to the following description.

According to the embodiments above, there is obviously a case where a load of the transmission of an ARP request is caused directly by the change in node configuration. However, an ARP request may also be transmitted when there is no change in node configuration.

For example, there is a case where an old ARP entry is deleted and consequently an ARP request is transmitted. Such a case may arise due to the mere passage of time, namely, may arise even if the node configuration is not changed. To be more specific, for example, when keep-alive messages and/or other administrative messages are periodically transmitted between the nodes, an ARP request is transmitted in response to the deletion of an ARP entry due to the lapse of time. As another example, when there is a long interval between instances of DB access, an ARP request may be transmitted in response to the deletion of an ARP entry due to the lapse of time.

Therefore, when the ARP tables 331 and 421 are updated in response to an ARP request which is transmitted due to the cause other than the change in node configuration (for example, a cause such as the lapse of time etc.), the change in node configuration may be reflected in the ARP tables 331 and 421 in this opportunity. That is, the process performed regardless of whether the node configuration changes or not may sometimes realize tracking the change in node configuration. The thus realized tracking is exemplified in the transmission of the ARP request 722 in step S1202 in FIG. 20 and the resultant addition of the ARP entry 724 in step S1204.

That is, the process performed regardless of whether the node configuration changes or not also serves as part of the process to realize tracking the change in node configuration, namely, substitutes for part of the process to realize tracking the change in node configuration. For the substituted part of the process, the cost to realize tracking the change in node configuration is reduced.

For the first through fifth reasons described above, various costs are able to be reduced according to the embodiments above. In addition, since a device (such as a gateway server) which may be a SPoF and also may be the bottleneck of the performance is not required according to the embodiments above, the embodiments above are excellent in fault tolerance and performance.

In the embodiments above, a pair of an IP address and a port number is used as the communication endpoint information, or an IP address is used as the communication endpoint information. Such communication endpoint information is more excellent than an FQDN, which is more logical than such communication endpoint information, in the following points.

A DNS server is required to resolve an FQDN to an IP address. Therefore, the DNS server may be a SPoF, and also may be the bottleneck of the performance of the entire distributed DB system. On the other hand, no central managing server, which may be a SPoF and also may be a bottleneck, is required to resolve an IP address to a MAC address by using an ARP request and an ARP reply to it.

In addition, when a computer performs a communication, an FQDN is resolved to an IP address. Therefore, if an FQDN which is statically associated with an individual key region is used as communication endpoint information, it is necessary to re-register the association between the FQDN and the IP address in the DNS server each time the correspondence between the key region and the node changes. In addition, each time the FQDN of a certain key region is taken over from one node to another node, a device (i.e., a client or some node) which attempts to perform the communication using this FQDN is forced to issue an inquiry to the DNS server. Unlike the broadcasting of an ARP request, the above-mentioned re-registration in the DNS server and the above-mentioned inquiry to the DNS server are not absorbed by the process performed regardless of whether the node configuration changes or not. Therefore, the use of the FQDN does not lead to a reduction in the cost.

Accordingly, the communication endpoint information expressed by a pair of an IP address and a port number (or that expressed by an IP address) is more preferable as the communication endpoint information according to the embodiments above than more logical information such as an FQDN.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-readable recording medium having stored therein a distribution controlling program for causing a computer to execute a process comprising:

receiving an assignment instruction for assigning data which corresponds to a first key region and is part of a database, the first key region being defined by one or a plurality of keys and being one of a plurality of key regions of the database, the database being partitioned statically by a plurality of keys and being distributed to a plurality of information processing devices on a key-region-by-key-region basis;

setting an address that is a network address identifying a communication endpoint in a communication network and that is statically associated with the first key region to configuration information of a network interface included in the computer, according to association information that is static information and that indicates statically determined association of each of the plurality of key regions of the database with a plurality of network addresses identifying a plurality of communication endpoints in the communication network, the setting being dynamically performed in response to the assignment instruction, the plurality of communication endpoints being located at the plurality of information processing devices in the communication network;

transmitting a message in which one of the plurality of network addresses of the plurality of communication endpoints associated with a target key region which is one of the plurality of key regions is specified as a destination;

monitoring a reply to the message; and recognizing occurrence of a failure in a first other computer which is one of the plurality of information processing devices and to which the network address specified as the destination is set, when the reply is not returned within a predetermined time period.

2. The computer-readable recording medium according to claim 1, wherein when the target key region is the first key region and the occurrence of the failure is recognized, the assignment instruction is received upon recognition of the occurrence of the failure, when the target key region is the first key region and the occurrence of the failure is recognized, the process further comprises:
  requesting a second other computer to transmit the data which is of the database and corresponds to the first key region;
  receiving the requested data from the second other computer; and
  storing the requested data, wherein
    the second other computer is a computer to which an address that is one of the network addresses of the plurality of communication endpoints associated with the first key region and that is not specified as the destination of the message is set, and
    the second other computer is one of the plurality of information processing devices.

3. The computer-readable recording medium according to claim 1, wherein the assignment instruction is issued upon selection performed by the computer to select one of network addresses of the plurality of communication endpoints corresponding to the plurality of key regions, or the assignment instruction is given from outside the computer;
  the process further comprises:
    requesting a third other computer to transmit the data which is of the database and corresponds to the first key region;
    receiving the requested data from the third other computer; and
    storing the requested data, wherein
      the third other computer is a computer to which the address associated with the first key region is set, and
      the third other computer is one of the plurality of information processing devices.

4. The computer-readable recording medium according to claim 1, the process further comprising:
  transmitting the data which is of the database and corresponds to the first key region, to a fourth other computer which is one of the plurality of information processing devices, in response to a request from the fourth other computer; and
  dissociating the address associated with the first key region from the computer.

5. The computer-readable recording medium according to claim 4, the process further comprising notifying the fourth other computer that the address associated with the first key region is dissociated from the computer.

6. The computer-readable recording medium according to claim 1, wherein the plurality of key regions are defined according to an image of a key under a particular mapping that uses at least one of a cryptographic hash function, a modulo function, and a function to extract bits at a plurality of particular positions from an input bit string.

7. The computer-readable recording medium according to claim 1, the process further comprising:
  receiving a request
    in which the address associated with the first key region is specified as a destination,
    in which a certain key belonging to the first key region is specified, and
    which requests an operation of reading or writing an entry of the database corresponding to the certain key;
  accessing the entry corresponding to the certain key; and
  replying to the request.

8. The computer-readable recording medium according to claim 1, wherein a network address of each communication endpoint is indicated by using an Internet Protocol address.

9. The computer-readable recording medium according to claim 8, wherein each communication endpoint is identified by information which includes the network address and a port number defined in a transport layer.

10. The computer-readable recording medium according to claim 1, wherein the address associated with the first key region is set to the configuration information by associating the address, which is associated with the first key region, with the network interface which is included in the computer and identified by a media access control address.

11. The computer-readable recording medium according to claim 1, wherein the database is a key-value store, or the database is a relational database and the key is data of a predetermined field in an entry.

12. A distribution controlling method comprising:
  receiving an assignment instruction for assigning data which corresponds to a first key region and is part of a database, the first key region being defined by one or a plurality of keys and being one of a plurality of key regions of the database, the database being partitioned statically by a plurality of keys and being distributed to a plurality of information processing devices on a key-region-by-key-region basis;
  setting an address that is a network address identifying a communication endpoint in a communication network and that is statically associated with the first key region to configuration information of a network interface included in a computer that executes the distribution controlling method, according to association information that is static information and that indicates a statically determined association of each of the plurality of key regions of the database with a plurality of network addresses identifying a plurality of communication endpoints in the communication network, the setting being dynamically performed in response to the assignment instruction, the plurality of communication endpoints being located at the plurality of information processing devices in the communication network;
  transmitting a message in which one of the plurality of network addresses of the plurality of communication endpoints associated with a target key region which is one of the plurality of key regions is specified as a destination;
  monitoring a reply to the message; and
  recognizing occurrence of a failure in another computer which is one of the plurality of information processing devices and to which the network address specified as the destination is set, when the reply is not returned within a predetermined time period.

13. An information processing device comprising:
  a network interface;
  a memory configured to store at least part of a database which is partitioned statically by a plurality of keys and distributed to a plurality of information processing devices on a key-region-by-key-region basis; and
  a processor that dynamically associates an address that is a network address identifying a communication endpoint in a communication network and that is statically associated with a first key region with the network interface by using configuration information of the network interface, according to association information that is static information and that indicates statically determined association of each of a plurality of key regions of the database with a plurality of network addresses identifying a plurality of communication endpoints in the communication network, in response to an assignment instruction for assigning data which is of the database and corresponds to the first key region, the first key region being defined by one or a plurality of keys and being one of the plurality of key regions of the database, the plurality of communication endpoints being located at the plurality of information processing devices in the communication network, wherein the processor transmits a message in which one of the plurality of network addresses of the plurality of communication endpoints associated with a target key region which is one of the plurality of key regions is specified as a destination, monitors a reply to the message, and recognizes occurrence of a failure in one of the plurality of information processing devices and to which the network address specified as the destination is set, when the reply is not returned within a predetermined time period.

14. A distributed system comprising:

a plurality of information processing devices, wherein a database is partitioned statically by a plurality of keys and distributed to the plurality of information processing devices on a key-region-by-key-region basis, the plurality of information processing devices each store association information that is static information and that indicates statically determined association of each of a plurality of key regions of the database with a plurality of network addresses identifying a plurality of communication endpoints in a communication network, the plurality of communication endpoints being located at the plurality of information processing devices in the communication network, and when assignment of at least one key region of the database to at least one of the plurality of information processing devices is to be changed, a network address of a certain communication endpoint for which the association information indicates association with a certain key region whose assignment is to be changed is dynamically assigned to a network interface included in an information processing device to be in charge of the certain key region by using configuration information of the network interface, and wherein a first information processing device of the plurality of information processing devices transmits a message in which one of the plurality of network addresses of the plurality of communication endpoints associated with a target key region which is one of the plurality of key regions is specified as a destination, monitors a reply to the message, and recognizes occurrence of a failure in a second information processing device of the plurality of information processing devices and to which the network address specified as the destination is set, when the reply is not returned within a predetermined time period.

* * * * *